United States Patent
Yang et al.

(10) Patent No.: US 10,281,987 B1
(45) Date of Patent: May 7, 2019

(54) SYSTEMS AND METHODS OF FREE-SPACE GESTURAL INTERACTION

(71) Applicant: Leap Motion, Inc., San Francisco, CA (US)

(72) Inventors: Hua Yang, Millbrae, CA (US); Leonid Kontsevich, San Francsico, CA (US); James Donald, San Francisco, CA (US); David S Holz, San Francisco, CA (US); Jonathan Marsden, San Francisco, CA (US); Paul Durdik, Foster City, CA (US)

(73) Assignee: Leap Motion, Inc., San Francisco, CA (US)

( * ) Notice: Subject to any disclaimer, the term of this patent is extended or adjusted under 35 U.S.C. 154(b) by 402 days.

(21) Appl. No.: 14/476,694

(22) Filed: Sep. 3, 2014

Related U.S. Application Data

(63) Continuation of application No. 14/457,015, filed on Aug. 11, 2014, now abandoned.

(60) Provisional application No. 61/864,097, filed on Aug. 9, 2013.

(51) Int. Cl.
| | |
|---|---|
| *G06F 3/01* | (2006.01) |
| *G06T 19/00* | (2011.01) |
| *G06F 3/0346* | (2013.01) |
| *G06F 3/0354* | (2013.01) |
| *G06F 3/042* | (2006.01) |

(52) U.S. Cl.
CPC ............ *G06F 3/017* (2013.01); *G06T 19/006* (2013.01); *G06F 3/0346* (2013.01); *G06F 3/03545* (2013.01); *G06F 3/0426* (2013.01)

(58) Field of Classification Search
CPC ... G06T 19/006; G06F 3/017; G06F 3/03545; G06F 3/0346; G06F 3/0426
See application file for complete search history.

(56) References Cited

U.S. PATENT DOCUMENTS

| | | | |
|---|---|---|---|
| 4,175,862 | A | 11/1979 | DiMatteo et al. |
| 4,879,659 | A | 11/1989 | Bowlin et al. |
| 5,134,661 | A | 7/1992 | Reinsch |
| 5,282,067 | A | 1/1994 | Liu |
| 5,454,043 | A | 9/1995 | Freeman |
| 5,574,511 | A | 11/1996 | Yang et al. |
| 5,581,276 | A | 12/1996 | Cipolla et al. |
| 5,594,469 | A | 1/1997 | Freeman et al. |
| 5,742,263 | A | 4/1998 | Wang et al. |
| 5,900,863 | A | 5/1999 | Numazaki |
| 6,002,808 | A | 12/1999 | Freeman |

(Continued)

OTHER PUBLICATIONS

U.S. Appl. No. 14/154,730—Office Action dated Nov. 6, 2015, 9 pages.

(Continued)

*Primary Examiner* — Kieu D Vu
*Assistant Examiner* — Roberto Borja
(74) *Attorney, Agent, or Firm* — Haynes Beffel & Wolfeld LLP; Ernest J. Beffel, Jr.; Andrew L. Dunlap

(57) ABSTRACT

During control of a user interface via free-space motions of a hand or other suitable control object, switching between control modes can be facilitated by tracking the control object's movements relative to, and its contact with a "virtual touch plane or surface" (i.e., a plane, portion of a plane, and/or surface computationally defined in space, or corresponding to any physical surface).

10 Claims, 29 Drawing Sheets

(56) References Cited

U.S. PATENT DOCUMENTS

| | | | |
|---|---|---|---|
| 6,031,661 A | 2/2000 | Tanaami | |
| 6,072,494 A | 6/2000 | Nguyen | |
| 6,147,678 A | 11/2000 | Kumar et al. | |
| 6,154,558 A | 11/2000 | Hsieh | |
| 6,181,343 B1 | 1/2001 | Lyons | |
| 6,184,926 B1 | 2/2001 | Khosravi et al. | |
| 6,195,104 B1 | 2/2001 | Lyons | |
| 6,204,852 B1 | 3/2001 | Kumar et al. | |
| 6,252,598 B1 | 6/2001 | Segen | |
| 6,263,091 B1 | 7/2001 | Jain et al. | |
| 6,493,041 B1 | 12/2002 | Hanko et al. | |
| 6,498,628 B2 | 12/2002 | Iwamura | |
| 6,603,867 B1 | 8/2003 | Sugino et al. | |
| 6,629,065 B1* | 9/2003 | Gadh | G06T 17/10 345/420 |
| 6,661,918 B1 | 12/2003 | Gordon et al. | |
| 6,804,656 B1 | 10/2004 | Rosenfeld et al. | |
| 6,819,796 B2 | 11/2004 | Hong et al. | |
| 6,901,170 B1 | 5/2005 | Terada et al. | |
| 6,919,880 B2 | 7/2005 | Morrison et al. | |
| 6,950,534 B2 | 9/2005 | Cohen et al. | |
| 6,993,157 B1 | 1/2006 | Oue et al. | |
| 7,215,828 B2 | 5/2007 | Luo | |
| 7,259,873 B2 | 8/2007 | Sikora et al. | |
| 7,308,112 B2 | 12/2007 | Fujimura et al. | |
| 7,340,077 B2 | 3/2008 | Gokturk et al. | |
| 7,519,223 B2 | 4/2009 | Dehlin et al. | |
| 7,532,206 B2 | 5/2009 | Morrison et al. | |
| 7,536,032 B2 | 5/2009 | Bell | |
| 7,542,586 B2 | 6/2009 | Johnson | |
| 7,598,942 B2 | 10/2009 | Underkoffler et al. | |
| 7,606,417 B2 | 10/2009 | Steinberg et al. | |
| 7,646,372 B2 | 1/2010 | Marks et al. | |
| 7,665,041 B2 | 2/2010 | Wilson et al. | |
| 7,692,625 B2 | 4/2010 | Morrison et al. | |
| 7,831,932 B2 | 11/2010 | Josephsoon et al. | |
| 7,840,031 B2 | 11/2010 | Albertson et al. | |
| 7,861,188 B2 | 12/2010 | Josephsoon et al. | |
| 7,940,885 B2 | 5/2011 | Stanton et al. | |
| 7,948,493 B2 | 5/2011 | Klefenz et al. | |
| 7,971,156 B2 | 6/2011 | Albertson et al. | |
| 8,064,704 B2 | 11/2011 | Kim et al. | |
| 8,085,339 B2 | 12/2011 | Marks | |
| 8,086,971 B2 | 12/2011 | Radivojevic et al. | |
| 8,111,239 B2 | 2/2012 | Pryor et al. | |
| 8,112,719 B2 | 2/2012 | Hsu et al. | |
| 8,213,707 B2 | 7/2012 | Li et al. | |
| 8,235,529 B1 | 8/2012 | Raffle et al. | |
| 8,244,233 B2 | 8/2012 | Chang et al. | |
| 8,514,221 B2 | 8/2013 | King et al. | |
| 8,638,989 B2 | 1/2014 | Holz | |
| 8,693,731 B2 | 4/2014 | Holz et al. | |
| 8,930,852 B2 | 1/2015 | Chen et al. | |
| 9,056,396 B1 | 6/2015 | Linnell | |
| 9,182,812 B2 | 11/2015 | Ybanez Zepeda | |
| 9,389,779 B2* | 7/2016 | Anderson | G06F 3/04883 |
| 9,459,697 B2 | 10/2016 | Bedikian et al. | |
| 9,501,152 B2 | 11/2016 | Bedikian et al. | |
| 2002/0008211 A1 | 1/2002 | Kask | |
| 2002/0021287 A1* | 2/2002 | Tomasi | G06F 1/1613 345/168 |
| 2002/0041327 A1 | 4/2002 | Hildreth et al. | |
| 2002/0105484 A1 | 8/2002 | Navab et al. | |
| 2003/0053658 A1 | 3/2003 | Pavlidis | |
| 2003/0053659 A1 | 3/2003 | Pavlidis et al. | |
| 2003/0081141 A1 | 5/2003 | Mazzapica | |
| 2003/0123703 A1 | 7/2003 | Pavlidis et al. | |
| 2003/0152289 A1 | 8/2003 | Luo | |
| 2003/0202697 A1 | 10/2003 | Simard et al. | |
| 2004/0125228 A1 | 7/2004 | Dougherty | |
| 2004/0145809 A1 | 7/2004 | Brenner | |
| 2004/0212725 A1 | 10/2004 | Raskar | |
| 2005/0131607 A1 | 6/2005 | Breed | |
| 2005/0168578 A1 | 8/2005 | Gobush | |
| 2005/0236558 A1 | 10/2005 | Nabeshima et al. | |
| 2006/0017807 A1 | 1/2006 | Lee et al. | |
| 2006/0072105 A1 | 4/2006 | Wagner | |
| 2006/0210112 A1 | 9/2006 | Cohen et al. | |
| 2006/0290950 A1 | 12/2006 | Platt et al. | |
| 2007/0042346 A1 | 2/2007 | Weller | |
| 2007/0130547 A1 | 6/2007 | Boillot | |
| 2007/0206719 A1 | 9/2007 | Suryanarayanan et al. | |
| 2007/0211023 A1 | 9/2007 | Boillot | |
| 2007/0238956 A1 | 10/2007 | Haras et al. | |
| 2008/0056752 A1 | 3/2008 | Denton et al. | |
| 2008/0064954 A1 | 3/2008 | Adams et al. | |
| 2008/0106746 A1 | 5/2008 | Shpunt et al. | |
| 2008/0111710 A1* | 5/2008 | Boillot | G06F 3/0346 341/22 |
| 2008/0273764 A1 | 11/2008 | Scholl | |
| 2008/0278589 A1 | 11/2008 | Thorn | |
| 2008/0304740 A1 | 12/2008 | Sun et al. | |
| 2008/0319356 A1 | 12/2008 | Cain et al. | |
| 2009/0102840 A1 | 4/2009 | Li | |
| 2009/0103780 A1 | 4/2009 | Nishihara et al. | |
| 2009/0122146 A1 | 5/2009 | Zalewski et al. | |
| 2009/0128564 A1 | 5/2009 | Okuno | |
| 2009/0217211 A1 | 8/2009 | Hildreth et al. | |
| 2009/0257623 A1 | 10/2009 | Tang et al. | |
| 2009/0274339 A9 | 11/2009 | Cohen et al. | |
| 2009/0309710 A1 | 12/2009 | Kakinami | |
| 2010/0001998 A1* | 1/2010 | Mandella | G01B 11/002 345/419 |
| 2010/0013662 A1 | 1/2010 | Stude | |
| 2010/0023015 A1 | 1/2010 | Park | |
| 2010/0027845 A1 | 2/2010 | Kim et al. | |
| 2010/0046842 A1 | 2/2010 | Conwell | |
| 2010/0053164 A1 | 3/2010 | Imai et al. | |
| 2010/0058252 A1 | 3/2010 | Ko | |
| 2010/0095206 A1* | 4/2010 | Kim | G06F 3/017 715/702 |
| 2010/0118123 A1 | 5/2010 | Freedman et al. | |
| 2010/0125815 A1 | 5/2010 | Wang et al. | |
| 2010/0158372 A1 | 6/2010 | Kim et al. | |
| 2010/0162165 A1 | 6/2010 | Addala et al. | |
| 2010/0199221 A1* | 8/2010 | Yeung | G06F 3/017 715/850 |
| 2010/0201880 A1 | 8/2010 | Iwamura | |
| 2010/0219934 A1 | 9/2010 | Matsumoto | |
| 2010/0222102 A1 | 9/2010 | Rodriguez | |
| 2010/0248836 A1* | 9/2010 | Suzuki | A63F 13/02 463/36 |
| 2010/0275159 A1 | 10/2010 | Matsubara et al. | |
| 2010/0277411 A1 | 11/2010 | Yee et al. | |
| 2010/0296698 A1 | 11/2010 | Lien et al. | |
| 2010/0302357 A1 | 12/2010 | Hsu et al. | |
| 2010/0306712 A1 | 12/2010 | Snook et al. | |
| 2010/0309097 A1 | 12/2010 | Raviv et al. | |
| 2010/0321377 A1 | 12/2010 | Gay et al. | |
| 2011/0007072 A1 | 1/2011 | Khan et al. | |
| 2011/0026765 A1 | 2/2011 | Ivanich et al. | |
| 2011/0057875 A1 | 3/2011 | Shigeta et al. | |
| 2011/0066984 A1 | 3/2011 | Li | |
| 2011/0080470 A1 | 4/2011 | Kuno et al. | |
| 2011/0093820 A1 | 4/2011 | Zhang et al. | |
| 2011/0107216 A1 | 5/2011 | Bi | |
| 2011/0115486 A1 | 5/2011 | Frohlich et al. | |
| 2011/0119640 A1 | 5/2011 | Berkes et al. | |
| 2011/0134112 A1 | 6/2011 | Koh et al. | |
| 2011/0148875 A1 | 6/2011 | Kim et al. | |
| 2011/0169726 A1 | 7/2011 | Holmdahl et al. | |
| 2011/0173574 A1 | 7/2011 | Glavin et al. | |
| 2011/0181509 A1 | 7/2011 | Rautiainen et al. | |
| 2011/0205151 A1 | 8/2011 | Newton et al. | |
| 2011/0213664 A1 | 9/2011 | Osterhout et al. | |
| 2011/0228978 A1 | 9/2011 | Chen et al. | |
| 2011/0234840 A1 | 9/2011 | Klefenz et al. | |
| 2011/0251896 A1 | 10/2011 | Impollonia et al. | |
| 2011/0267259 A1 | 11/2011 | Tidemand et al. | |
| 2011/0286676 A1 | 11/2011 | El Dokor | |
| 2011/0289455 A1 | 11/2011 | Reville et al. | |
| 2011/0289456 A1 | 11/2011 | Reville et al. | |
| 2011/0291925 A1 | 12/2011 | Israel et al. | |
| 2011/0291988 A1 | 12/2011 | Bamji et al. | |

(56) References Cited

U.S. PATENT DOCUMENTS

| | | | |
|---|---|---|---|
| 2011/0296353 A1 | 12/2011 | Ahmed et al. | |
| 2011/0299737 A1 | 12/2011 | Wang et al. | |
| 2011/0304650 A1 | 12/2011 | Campillo et al. | |
| 2011/0310007 A1 | 12/2011 | Margolis et al. | |
| 2012/0038637 A1 | 2/2012 | Marks | |
| 2012/0050157 A1 | 3/2012 | Latta et al. | |
| 2012/0065499 A1 | 3/2012 | Chono | |
| 2012/0068914 A1 | 3/2012 | Jacobsen et al. | |
| 2012/0098744 A1* | 4/2012 | Stinson, III | G06F 3/0304 345/158 |
| 2012/0113223 A1 | 5/2012 | Hilliges et al. | |
| 2012/0204133 A1 | 8/2012 | Guendelman et al. | |
| 2012/0218263 A1 | 8/2012 | Meier et al. | |
| 2012/0250936 A1 | 10/2012 | Holmgren | |
| 2012/0320080 A1 | 12/2012 | Giese et al. | |
| 2013/0033483 A1 | 2/2013 | Im et al. | |
| 2013/0191911 A1 | 7/2013 | Dellinger et al. | |
| 2013/0222233 A1* | 8/2013 | Park | G06F 3/03 345/156 |
| 2013/0222640 A1 | 8/2013 | Baek et al. | |
| 2013/0239059 A1 | 9/2013 | Chen et al. | |
| 2013/0257736 A1* | 10/2013 | Hou | G06F 3/017 345/168 |
| 2013/0283213 A1* | 10/2013 | Guendelman | G06F 3/017 715/848 |
| 2013/0307935 A1 | 11/2013 | Rappel et al. | |
| 2013/0321265 A1 | 12/2013 | Bychkov et al. | |
| 2014/0015831 A1* | 1/2014 | Kim | G06F 3/04815 345/419 |
| 2014/0055385 A1* | 2/2014 | Duheille | G06F 3/0488 345/173 |
| 2014/0055396 A1* | 2/2014 | Aubauer | G06F 3/017 345/173 |
| 2014/0063055 A1 | 3/2014 | Osterhout et al. | |
| 2014/0063060 A1* | 3/2014 | MacIocci | G06F 3/011 345/633 |
| 2014/0095119 A1 | 4/2014 | Lee et al. | |
| 2014/0098018 A1 | 4/2014 | Kim et al. | |
| 2014/0125813 A1 | 5/2014 | Holz | |
| 2014/0134733 A1 | 5/2014 | Wu et al. | |
| 2014/0139641 A1 | 5/2014 | Holz | |
| 2014/0157135 A1 | 6/2014 | Lee et al. | |
| 2014/0177913 A1 | 6/2014 | Holz | |
| 2014/0201666 A1 | 7/2014 | Bedikian et al. | |
| 2014/0201689 A1 | 7/2014 | Bedikian et al. | |
| 2014/0223385 A1 | 8/2014 | Ton et al. | |
| 2014/0225918 A1 | 8/2014 | Mittal et al. | |
| 2014/0240215 A1 | 8/2014 | Tremblay et al. | |
| 2014/0249961 A1 | 9/2014 | Zagel et al. | |
| 2014/0307920 A1 | 10/2014 | Holz | |
| 2014/0320408 A1 | 10/2014 | Zagorsek et al. | |
| 2014/0344762 A1 | 11/2014 | Grasset et al. | |
| 2014/0369558 A1 | 12/2014 | Holz | |
| 2015/0003673 A1 | 1/2015 | Fletcher | |
| 2015/0054729 A1 | 2/2015 | Minnen et al. | |
| 2015/0084864 A1 | 3/2015 | Geiss et al. | |
| 2015/0103004 A1 | 4/2015 | Cohen et al. | |
| 2015/0227795 A1 | 8/2015 | Starner et al. | |
| 2015/0293597 A1* | 10/2015 | Mishra | G06F 1/163 715/810 |
| 2015/0309629 A1 | 10/2015 | Amariutei et al. | |
| 2015/0363070 A1* | 12/2015 | Katz | G06F 3/017 715/852 |

OTHER PUBLICATIONS

U.S. Appl. No. 14/155,722—Office Action dated Nov. 20, 2015, 14 pages.
U.S. Appl. No. 14/281,817—Office Action dated Sep. 28, 2015, 5 pages.
U.S. Appl. No. 14/262,691—Office Action dated Dec. 11, 2015, 31 pages.
U.S. Appl. No. 14/154,730—Response to Nov. 6 Office Action filed Feb. 4, 2016, 9 pages.
U.S. Appl. No. 14/154,730—Notice of Allowance dated May 3, 2016, 5 pages.
U.S. Appl. No. 14/154,730—Notice of Allowance dated Jul. 14, 2016, 5 pages.
U.S. Appl. No. 14/262,691—Office Action dated Aug. 19, 2016, 36 pages.
U.S. Appl. No. 14/262,691—Response to Dec. 11 Office Action filed May 11, 2016, 15 pages.
U.S. Appl. No. 14/516,493—Office Action dated May 9, 2016, 21 pages.
U.S. Appl. No. 14/516,493—Response to May 9 Office Action filed Aug. 9, 2016, 18 pages.
U.S. Appl. No. 14/516,493—Office Action dated Nov. 17, 2016, 30 pages.
Pavlovic, V., et al., "Visual Interpretation of Hand Gestures for Human-Computer Interaction: A Review," IEEE Transactions on Pattern Analysis and Machine Intelligence, vol. 19, No. 7, Jul. 1997, pp. 677-695.
Wu, Y., et al., "Vision-Based Gesture Recognition: A Review," Beckman Institute, Copyright 1999, pp. 103-115.
U.S. Appl. No. 14/280,018—Office Action dated Feb. 12, 2016, 38 pages.
PCT/US2013/021713—International Preliminary Report on Patentability dated Jul. 22, 2014, 13 pages (WO 2013/109609).
PCT/US2013/021713—International Search Report and Written Opinion dated Sep. 11, 2013, 18 pages.
Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.
Barat et al., "Feature Correspondences From Multiple Views of Coplanar Ellipses", 2nd International Symposium on Visual Computing, Author Manuscript, 2006, 10 pages.
Bardinet, et al., "Filling of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-191.
Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.
Cheikh et al., "Multipeople Tracking Across Multiple Cameras", International Journal on New Computer Architectures and Their Applications (IJNCAA), vol. 2, No. 1, 2012, pp. 23-33.
Chung, et al., "Recovering LSHGCs and SHGCs from Stereo," International Journal of Computer Vision, vol. 20, No. 1/2, 1996, pp. 43-58.
Cumani, A., et al., "Recovering the 3D Structure of Tubular Objects from Stereo Silhouettes," Pattern Recognition, Elsevier, GB, vol. 30, No. 7, Jul. 1, 1997, 9 pages.
Davis et al., "Toward 3-D Gesture Recognition", International Journal of Pattern Recognition and Artificial Intelligence, vol. 13, No. 03, 1999, pp. 381-393.
Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.
Forbes, K., et al., "Using Silhouette Consistency Constraints to Build 3D Models," University of Cape Town, Copyright De Beers 2003, Retrieved from the internet: <http://www.dip.ee.uct.ac.za/~kforbes/Publications/Forbes2003Prasa.pdf> on Jun. 17, 2013, 6 pages.
Heikkila, J., "Accurate Camera Calibration and Feature Based 3-D Reconstruction from Monocular Image Sequences", Infotech Oulu and Department of Electrical Engineering, University of Oulu, 1997, 126 pages.
Kanhangad, V., et al., "A Unified Framework for Contactless Hand Verification," IEEE Transactions on Information Forensics and Security, IEEE, Piscataway, NJ, US., vol. 6, No. 3, Sep. 1, 2011, pp. 1014-1027.

(56) References Cited

OTHER PUBLICATIONS

Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.

Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-171.

May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.

Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.

Pedersini, et al., Accurate Surface Reconstruction from Apparent Contours, Sep. 5-8, 2000 European Signal Processing Conference EUSPICO 2000, vol. 4, Retrieved from the Internet: http://home.deib.polimi.it/sarti/CV_and_publications.html, pp. 1-4.

Rasmussen, Matihew K., "An Analytical Framework for the Preparation and Animation of a Virtual Mannequin forthe Purpose of Mannequin-Clothing Interaction Modeling", A Thesis Submitted in Partial Fulfillment of the Requirements for the Master of Science Degree in Civil and Environmental Engineering in the Graduate College of the University of Iowa, Dec. 2008, 98 pages.

U.S. Appl. No. 14/280,018—Replacement Response to Feb. 12 Office Action filed Jun. 8, 2016, 16 pages.

U.S. Appl. No. 14/280,018—Notice of Allowance dated Sep. 7, 2016, 7 pages.

U.S. Appl. No. 14/280,018—Response to Feb. 12 Office Action filed May 12, 2016 , 15 pages.

U.S. Appl. No. 14/262,691—Office Action dated Jan. 31, 2017, 27 pages.

U.S. Appl. No. 14/262,691—Respinse to Office Action dated Aug. 19, 2016, filed Nov. 21, 2016, 13 pages.

Non-Final Office Action for U.S. Appl. No. 14/155,722 dated Nov. 20, 2015.

U.S. Appl. No. 141281,817—Office Action, dated Sep. 28, 2015, 5 pages.

U.S. Appl. No. 14/262,691—Notice of Allowance dated Oct. 30, 2017, 35 pages.

U.S. Appl. No. 14/155,722—Response to Office Action dated Nov. 20, 2015, filed Feb. 2, 2016, 15 pages.

U.S. Appl. No. 14/155,722—Notice of Allowance dated May 27, 2016, 10 pages.

U.S. Appl. No. 15/358,104—Office Action dated Nov. 2, 2017, 9 pages.

U.S. Appl. No. 14/154,730—Notice of Allowance dated May 24, 2016, 9 pages.

U.S. Appl. No. 14/262,691—Response to Office Action dated Jan. 31, 2017, filed Jun. 30, 2017, 20 pages.

U.S. Appl. No. 15/279,363—Office Action dated Jan. 25, 2018, 29 pages.

U.S. Appl. No. 15/279,363—Response to Office Action dated Jan. 25, 2018, filed May 24, 2018, 11 pages.

U.S. Appl. No. 15/279,363—Notice of Allowance dated Jul. 10, 2018, 10 pages.

U.S. Appl. No. 15/358,104—Response to Office Action dated Nov. 2, 2017, filed Mar. 2, 2018, 9 pages.

U.S. Appl. No. 15/358,104—Notice of Allowance dated Apr. 11, 2018, 41 pages.

PCT/US2016/017632—International Search Report and Written Opinion dated Jul. 27, 2016, 13 pages.

PCT/US2016/017632—International Preliminary Report on Patentability dated Aug. 24, 2017, 12 pages.

\* cited by examiner

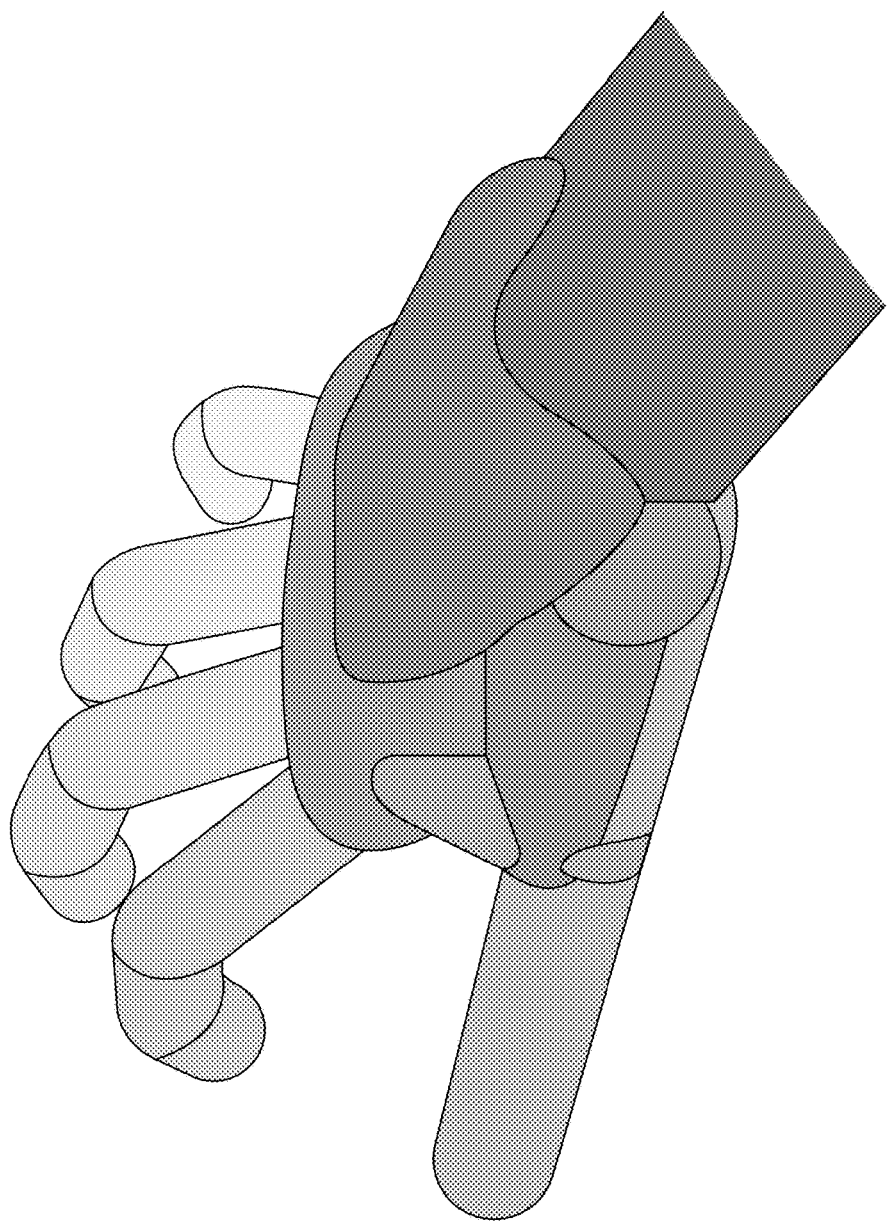

802 — setting a context for gesture interpretation by detecting a virtual contact between a first control object and a virtual plane defined in a three-dimensional (3D) sensory space 812 — responsive to a position of the virtual contact with the virtual plane, tentatively selecting a proximate interface control and visually indicating the tentative selection 822 — detecting a free-space confirmatory gesture of a second control object while the proximate interface control remains tentatively selected and initiating actuation of the proximate interface control based on the confirmatory gesture

*FIG. 8A*

SYSTEMS AND METHODS OF FREE-SPACE GESTURAL INTERACTION

PRIORITY AND RELATED STATEMENT

This application is a continuation of U.S. patent application Ser. No. 14/457,015, titled "SYSTEMS AND METHODS OF FREE-SPACE GESTURAL INTERACTION," filed 11 Aug. 2014, which claims the benefit of U.S. Provisional Patent Application No. 61/864,097, entitled, "USER INTERACTIONS FOR CONTACTLESS DISPLAY CONTROL," filed on Aug. 9, 2013. The provisional application is hereby incorporated by reference for all purposes.

FIELD OF THE TECHNOLOGY DISCLOSED

The technology disclosed relates generally to display control, and in particular to display control based on user interactions without touching the display and facilitating free-space gestural interactions in augmented reality environment.

INCORPORATIONS

Materials incorporated by reference in this filing include the following:

"FREE-SPACE USER INTERFACE AND CONTROL USING VIRTUAL CONSTRUCTS," U.S. Non. Prov. application Ser. No. 14/154,730, filed 20 Feb. 2014, "DYNAMIC USER INTERACTIONS FOR DISPLAY CONTROL," U.S. Prov. App. No. 61/752,725, filed 15 Jan. 2013, "SYSTEMS AND METHODS OF INTERACTING WITH A VIRTUAL GRID IN A THREE-DIMENSIONAL (3D) SENSORY SPACE," U.S. Prov. App. No. 62/007,885, filed 4 Jun. 2014, "PREDICTIVE INFORMATION FOR FREE-SPACE GESTURE CONTROL AND COMMUNICATION," U.S. Prov. App. No. 61/873,758, filed 4 Sep. 2013, "VELOCITY FIELD INTERACTION FOR FREE-SPACE GESTURE INTERFACE AND CONTROL," U.S. Prov. App. No. 61/891,880, filed 16 Oct. 2013, "INTERACTIVE TRAINING RECOGNITION OF FREE-SPACE GESTURES FOR INTERFACE AND CONTROL," U.S. Prov. App. No. 61/872,538, filed 30 Aug. 2013, "METHODS AND SYSTEMS FOR IDENTIFYING POSITION AND SHAPE OF OBJECTS IN THREE-DIMENSIONAL SPACE," US Prov. App. No. 61/587,554, filed 17 Jan. 2012, "SYSTEMS AND METHODS FOR CAPTURING MOTION IN THREE-DIMENSIONAL SPACE," U.S. Prov. App. No. 61/724,091, filed 8 Nov. 2012, "VEHICLE MOTION SENSORY CONTROL," U.S. Prov. App. No. 62/005,981, filed 30 May 2014, "MOTION CAPTURE USING CROSS-SECTIONS OF AN OBJECT," U.S. application Ser. No. 13/414,485, filed 7 Mar. 2012, and "SYSTEM AND METHODS FOR CAPTURING MOTION IN THREE-DIMENSIONAL SPACE," U.S. application Ser. No. 13/742,953, filed 16 Jan. 2013.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Traditionally, users have interacted with electronic devices (such as a computer or a television) or computing applications (such as computer games, multimedia applications, or office applications) via indirect input devices, including, for example, keyboards, joysticks, or remote controllers. The user manipulates the input devices to perform a particular operation, such as selecting a specific entry from a menu of operations. Modern input devices, however, include multiple buttons, often in a complex configuration, to facilitate communication of user commands to the electronic devices or computing applications; correct operation of these input devices is often challenging to the user. Additionally, actions performed on an input device generally do not correspond in any intuitive sense to the resulting changes on, for example, a screen display controlled by the device. Input devices can also be lost, and the frequent experience of searching for misplaced devices has become a frustrating staple of modern life.

Touch screens implemented directly on user-controlled devices have obviated the need for separate input devices. A touch screen detects the presence and location of a "touch" performed by a user's finger or other object on the display screen, enabling the user to enter a desired input by simply touching the proper area of a screen. While suitable for small display devices such as tablets and wireless phones, touch screens are impractical for large entertainment devices that the user views from a distance. Particularly for games implemented on such devices, electronics manufacturers have developed systems that detect a user's movements or gestures and cause the display to respond in a contextually relevant manner. The user's gestures can be detected using an optical imaging system, and characterized and interpreted by suitable computational resources. For example, a user near a TV can perform a sliding hand gesture, which is detected by the gesture-recognition system; in response to the detected gesture, the TV can activate and display a control panel on the screen, allowing the user to make selections thereon using subsequent gestures; for example, the user can move her hand in an "up" or "down" direction, which, again, is detected and interpreted to facilitate channel selection.

Existing systems, however, rely on additional input elements (e.g., computer mice and keyboards) to supplement any gesture-recognition they can perform. These systems lack the user-interface elements required for anything more than simple commands, and often, recognize these commands only after the user has set up a gesture-recognition environment via a keyboard and mouse. Consequently, there is a need for a gesture-recognition system that allows users to interact with a wider variety of applications and games in a more sophisticated manner.

Further, augmented Reality (AR) technology refers to the real time registration of 2D or 3D computer generated imagery onto a live view of a real world physical space. A user is able to view and interact with the augmented imagery in such a way as to manipulate the virtual objects in their view.

However, existing human-AR systems interactions are very limited and unfeasible. Current AR systems are complex as they force the user to interact with AR environment using a keyboard and mouse, or a vocabulary of simply hand gestures. Further, despite strong academic and commercial interest in AR systems, AR systems continue to be costly and requiring expensive equipment, and thus stand unsuitable for general use by the average consumer.

An opportunity arises to provide an economical approach that provides advantages of AR for enhanced and sub-millimeter precision interaction with virtual objects without the draw backs of attaching or deploying specialized hardware.

SUMMARY

Aspects of the systems and methods described herein facilitate user interactions with a user-interface of an electronic device and/or a computing application via free-space gestures or other motions performed by one or more objects (e.g., a user's finger, a suitable hand-held pointing device, or other pointer), and in some implementations, can even obviate the need for contact-based input devices such as a mouse or a touch screen. In various implementations, the position and/or orientation of a first object is tracked, and a relative distance between the first object and an engagement target such as a "virtual touch plane or surface" (i.e., a plane, portion of a plane, and/or surface computationally defined in space, or corresponding to any physical surface) is identified. When the first object's forward motion reaches a spatial location corresponding to this virtual touch surface (hereinafter also referred to as a "virtual surface")—i.e., when the first object touches or pierces the virtual surface—the first object interacts with a display screen of the electronic device in an engaged mode, e.g., by so as to select a control displayed on the screen. In one implementation, the selection of the control by the first object is tentative, i.e., the selection can change with the movement of the first object relative to the displayed screen until it is "locked in," or "activated," by the presence and/or the motion of a second object. Alternatively, the selection can be locked in upon detection of a particular recognizable motion of the first object. The displayed control can then be manipulated by the first object, the second object, and/or a combination thereof.

Reference throughout this specification to "one example," "an example," "one implementation," or "an implementation" means that a particular feature, structure, or characteristic described in connection with the example is included in at least one example of the present technology. Thus, the occurrences of the phrases "in one example," "in an example," "one implementation," or "an implementation" in various places throughout this specification are not necessarily all referring to the same example. Furthermore, the particular features, structures, routines, steps, or characteristics can be combined in any suitable manner in one or more examples of the technology. The headings provided herein are for convenience only and are not intended to limit or interpret the scope or meaning of the claimed technology.

Advantageously, some implementations can provide for improved interface with computing and/or other machinery than would be possible with heretofore known techniques. In some implementations, a richer human-machine interface experience can be provided. The following detailed description together with the accompanying drawings will provide a better understanding of the nature and advantages provided for by implementations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 1C and 1D illustrate different views of a 3D capsule hand according to one implementation of the technology disclosed.

FIG. 1K shows one implementation of gestural data of one or more free-form gestures performed using a hand.

FIGS. 8A-8B shows one implementation of preventing false selections during free-space gestural interactions in a three-dimensional (3D) sensory space.

DETAILED DESCRIPTION

Introduction

Figure 1A:
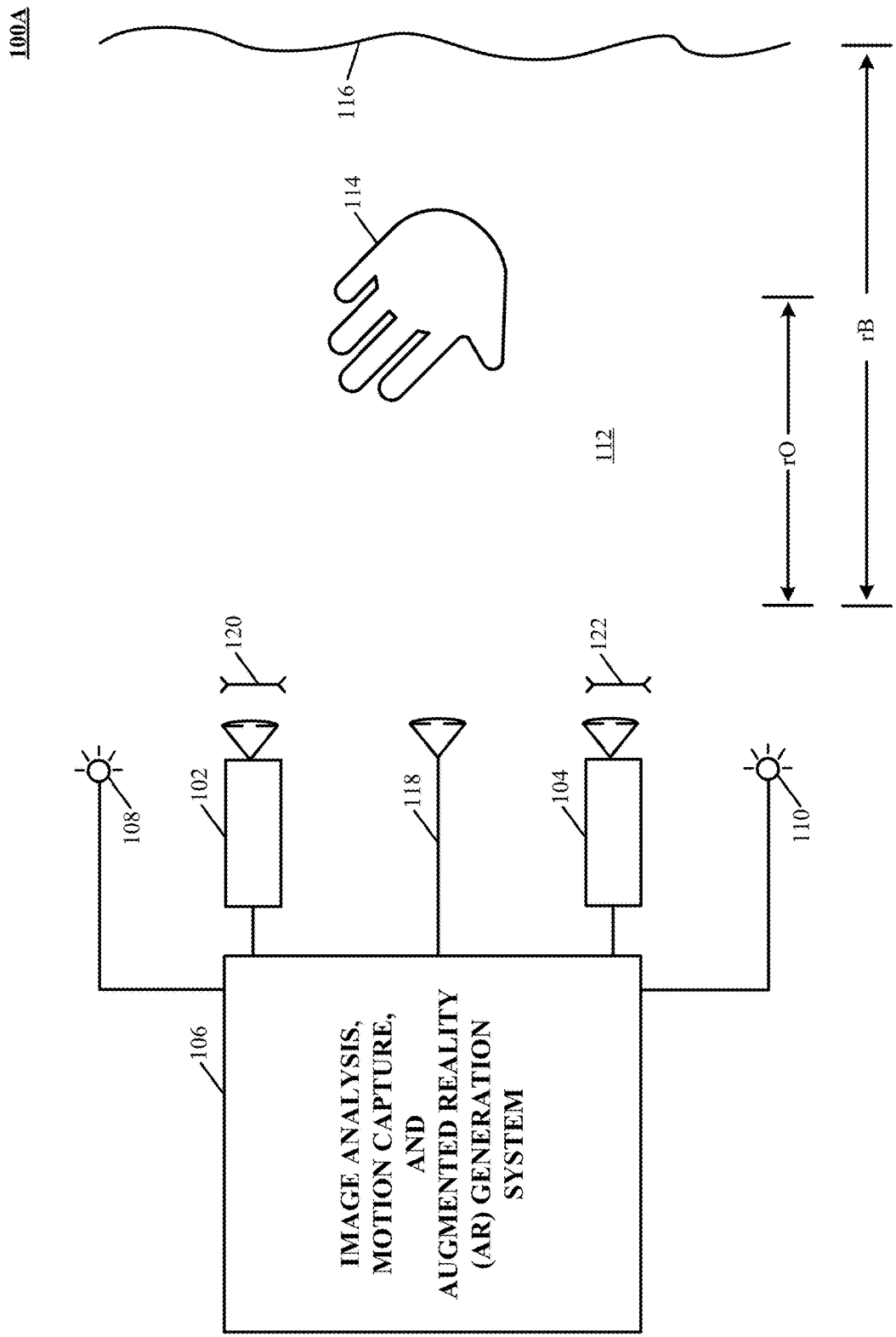
FIG. 1A is a simplified block diagram of an exemplary gesture-recognition environment to which select implementations of the technology disclosed can be directed.

Current computer systems typically include a graphic user interface that can be navigated by a cursor, i.e., a graphic element displayed on the screen and movable relative to other screen content, and which serves to indicate a position on the screen. The cursor is usually controlled by the user via a computer mouse or touch pad. In some systems, the screen itself doubles as an input device, allowing the user to select and manipulate graphic user interface components by touching the screen where they are located. While touch can be convenient and relatively intuitive for many users, touch is not that accurate. Fingers are fat. The user's fingers can easily cover multiple links on a crowded display leading to erroneous selection. Touch is also unforgiving—it requires the user's motions to be confined to specific areas of space. For example, move one's hand merely one key-width to the right or left and type. Nonsense appears on the screen.

Mice, touch pads, and touch screens can be cumbersome and inconvenient to use. Touch pads and touch screens require the user to be in close physical proximity to the pad (which is often integrated into a keyboard) or screen so as to be able to reach them, which significantly restricts users' range of motion while providing input to the system. Touch is, moreover, not always reliably detected, sometimes necessitating repeated motions across the pad or screen to effect the input. Mice facilitate user input at some distance from the computer and screen (determined by the length of the connection cable or the range of the wireless connection between computer and mouse), but require a flat surface with suitable surface properties, or even a special mouse pad, to function properly. Furthermore, prolonged use of a mouse, in particular if it is positioned sub-optimally relative to the user, can result in discomfort or even pain.

Accordingly, alternative input mechanisms that provide users with the advantages of touch based controls but free the user from the many disadvantages of touch based control are highly desirable.

System and methods in accordance herewith generally utilize information about the motion of a control object, such as a user's finger or a stylus, in three-dimensional space to operate a user interface and/or components thereof based on the motion information. Various implementations take advantage of motion-capture technology to track the motions of the control object in real time (or near real time, i.e., sufficiently fast that any residual lag between the control object and the system's response is unnoticeable or practically insignificant). Other implementations can use synthetic motion data (e.g., generated by a computer game) or stored motion data (e.g., previously captured or generated). References to motions in "free-space" or "touchless" motions or gestures are used herein with reference to an implementation to distinguish motions tied to and/or requiring physical contact of the moving object with a physical surface to effect input; however, in some applications, the control object can contact a physical surface ancillary to providing input, in such case the motion is still considered a "free-space" motion.

Examples of "free-space" gestures include raising an arm, or making different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact. In other implementations, a point and grasp gesture can be used to move a cursor on a display of a device. In yet other implementations, "free-form" gestures can be a grip-and-extend-again motion of two fingers of a hand, grip-and-extend-again motion of a finger of a hand, holding a first finger down and extending a second finger, a flick of a whole hand, flick of one of individual fingers or thumb of a hand, flick of a set of bunched fingers or bunched fingers and thumb of a hand, horizontal sweep, vertical sweep, diagonal sweep, a flat hand with thumb parallel to fingers, closed, half-open, pinched, curled, fisted, mime gun, okay sign, thumbs-up, ILY sign, one-finger point, two-finger point, thumb point, pinkie point, flat-hand hovering (supine/prone), bunged-fingers hovering, or swirling or circular sweep of one or more fingers and/or thumb and/arm.

Further, in some implementations, the virtual surface can be defined to co-reside at or near a physical surface. For example, a virtual touch screen can be created by defining a (substantially planar) virtual surface at or near the screen of a display, such as television, monitor, or the like. A virtual active table top can be created by defining a (substantially planar) virtual surface at or near a table top convenient to the machine receiving the input.

Among other aspects, implementations can enable quicker, crisper gesture based or "free-space" (i.e., not requiring physical contact) interfacing with a variety of machines (e.g., a computing systems, including desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof), obviating or reducing the need for contact-based input devices such as a mouse, joystick, touch pad, or touch screen.

Implementations of the technology disclosed also relate to methods and systems that facilitate free-space gestural interactions in an augmented reality (AR) environment. The technology disclosed can be applied to solve the technical problem of how the user interacts with the virtual screens, elements, or controls displayed in the AR environment. Existing AR systems restrict the user experience and prevent complete immersion into the real world by limiting the degrees of freedom to control virtual objects. Where interaction is enabled, it is coarse, imprecise, and cumbersome and interferes with the user's natural movement. Such considerations of cost, complexity and convenience have limited the deployment and use of AR technology.

The systems and methods described herein can find application in a variety of computer-user-interface contexts, and can replace mouse operation or other traditional means of user input as well as provide new user-input modalities. Free-space control object motions and virtual-touch recognition can be used, for example, to provide input to commercial and industrial legacy applications (such as, e.g., business applications, including Microsoft Outlook™; office software, including Microsoft Office™, Windows™, Excel™, etc.; graphic design programs; including Microsoft Visio™ etc.), operating systems such as Microsoft Windows™; web applications (e.g., browsers, such as Internet Explorer™); other applications (such as e.g., audio, video, graphics programs, etc.), to navigate virtual worlds (e.g., in video games) or computer representations of the real world (e.g., Google street View™), or to interact with three-dimensional virtual objects (e.g., Google Earth™)

A "control object" as used herein with reference to an implementation is generally any three-dimensionally movable object or appendage with an associated position and/or orientation (e.g., the orientation of its longest axis) suitable for pointing at a certain location and/or in a certain direction. Control objects include, e.g., hands, fingers, feet, or other anatomical parts, as well as inanimate objects such as pens, styluses, handheld controls, portions thereof, and/or combinations thereof. Where a specific type of control object, such as the user's finger, is used hereinafter for ease of illustration, it is to be understood that, unless otherwise indicated or clear from context, any other type of control object can be used as well.

A "virtual control construct," also referred to as a "virtual construct," "virtual touch plane," or "virtual plane," as used herein with reference to an implementation denotes a geometric locus defined (e.g., programmatically) in space and useful in conjunction with a control object, but not corresponding to a physical object; its purpose is to discriminate between different operational modes of the control object (and/or a user-interface element controlled therewith, such as a cursor) based on whether the control object intersects the virtual control construct. The virtual control construct, in turn, can be, e.g., a virtual surface construct (a plane oriented relative to a tracked orientation of the control object or an orientation of a screen displaying the user interface) or a point along a line or line segment extending from the tip of the control object.

The term "intersect" is herein used broadly with reference to an implementation to denote any instance in which the control object, which is an extended object, has at least one point in common with the virtual control construct and, in the case of an extended virtual control construct such as a line or two-dimensional surface, is not parallel thereto. This includes "touching" as an extreme case, but typically involves that portions of the control object fall on both sides of the virtual control construct.

Using the output of a suitable motion-capture system or motion information received from another source, various implementations facilitate user input via gestures and motions performed by the user's hand or a (typically handheld) pointing device. For example, in some implementations, the user can control the position of a cursor and/or other object on the screen by pointing at the desired screen location, e.g., with his index finger, without the need to touch the screen. The position and orientation of the finger relative to the screen, as determined by the motion-capture system, can be used to compute the intersection of a straight line through the axis of the finger with the screen, and a cursor symbol (e.g., an arrow, circle, cross hair, or hand symbol) can be displayed at the point of intersection. If the range of motion causes the intersection point to move outside the boundaries of the screen, the intersection with a (virtual) plane through the screen can be used, and the cursor motions can be re-scaled, relative to the finger motions, to remain within the screen boundaries. Alternatively to extrapolating the finger towards the screen, the position of the finger (or control object) tip can be projected perpendicularly onto the screen; in this implementation, the control object orientation can be disregarded. As will be readily apparent to one of skill in the art, many other ways of mapping the control object position and/or orientation onto a screen location can, in principle, be used; a particular mapping can be selected based on considerations such as, without limitation, the requisite amount of information about the control object, the intuitiveness of the mapping to the user, and the complexity of the computation. For example, in some implementations, the mapping is based on intersections with or projections onto a (virtual) plane defined relative to the camera, under the assumption that the screen is located within that plane (which is correct, at least approximately, if the camera is correctly aligned relative to the screen), whereas, in other implementations, the screen location relative to the camera is established via explicit calibration (e.g., based on camera images including the screen).

In some implementations, an interface element or control such as a widget, toggle, cursor, sliders, scroll bars, virtual joysticks, and oppositional buttons (up/down, left/right, plus/minus, next/previous, etc.) can be operated in at least two modes: a tentative selection mode in which it merely indicates a position on the screen, typically without otherwise affecting the screen content; and one or more actuation modes, which allow the user to manipulate and/or activate the screen content. In the actuation mode, the user can, for example, drag graphical user-interface elements (such as icons representing files or applications, controls such as scroll bars, or displayed objects) across the screen, or draw or write on a virtual canvas. Further, transient operation in the actuation mode can be interpreted as a click event. Thus, operation in the actuation mode generally corresponds to, or emulates, touching a touch screen or touch pad, or controlling a mouse with a mouse button held down.

The term "cursor," as used in this discussion, refers generally to the cursor functionality rather than the visual element; in other words, the cursor is a control element operable to select a screen position—whether or not the control element is actually displayed—and manipulate screen content via movement across the screen, i.e., changes in the selected position. The cursor need not always be visible in the actuation mode. In some instances, a cursor symbol still appears, e.g., overlaid onto another graphical element that is moved across the screen, whereas in other instances, cursor motion is implicit in the motion of other screen elements or in newly created screen content (such as a line that appears on the screen as the control object moves), obviating the need for a special symbol. In the tentatively selected mode, a cursor symbol is typically used to visualize the current cursor location. Alternatively or additionally, a screen element or portion presently co-located with the cursor (and thus the selected screen location) can change brightness, color, or some other property to indicate that it is being pointed at. However, in certain implementations, the symbol or other visual indication of the cursor location can be omitted so that the user has to rely on his own observation of the control object relative to the screen to estimate the screen location pointed at. (For example, in a shooter game, the player can have the option to shoot with or without a "virtual sight" indicating a pointed-to screen location.)

Aspects of the system and methods, described herein provide for improved machine interface and/or control by interpreting the motions (and/or position, configuration) of one or more control objects or portions thereof relative to one or more virtual control constructs defined (e.g., programmatically) in free-space disposed at least partially within a field of view of an image-capture device. In implementations, the position, orientation, and/or motion of control object(s) (e.g., a user's finger(s), thumb, etc.; a suitable hand-held pointing device such as a stylus, wand, or some other control object; portions and/or combinations thereof) are tracked relative to virtual control surface(s) to facilitate determining whether an intended free-space gesture has occurred. Free-space gestures can include engaging with a control (e.g., selecting a button or switch), disengaging with a control (e.g., releasing a button or switch), motions that do not involve engagement with any control (e.g., motion that is tracked by the system, possibly followed by a cursor, and/or a single object in an application or the like), environmental interactions (i.e., gestures to direct an environment rather than a specific control, such as scroll up/down), special-purpose gestures (e.g., brighten/darken screen, volume control, etc.), as well as others or combinations thereof.

Free-space gestures can be mapped to one or more controls, or a control-less screen location, of a display device associated with the machine under control. Implementations provide for mapping of movements in three-dimensional (3D) space conveying control and/or other information to zero, one, or more controls. Controls can include imbedded controls (e.g., sliders, buttons, and other control objects in an application), or environmental-level controls (e.g., windowing controls, scrolls within a window, and other controls affecting the control environment). In implementations, controls can be displayable using two-dimensional (2D) presentations (e.g., a traditional cursor symbol, cross-hairs, icon, graphical representation of the control object, or other displayable object) on, e.g., one or more display screens, and/or 3D presentations using holography, projectors, or other mechanisms for creating 3D presentations. Presentations can also be audible (e.g., mapped to sounds, or other mechanisms for conveying audible information) and/or haptic.

In an implementation, determining whether motion information defines an engagement gesture can include finding an intersection (also referred to as a contact, pierce, or a "virtual touch") of motion of a control object with a virtual control surface, whether actually detected or determined to be imminent; dis-intersection (also referred to as a "pull back" or "withdrawal") of the control object with a virtual control surface; a non-intersection—i.e., motion relative to a virtual control surface (e.g., wave of a hand approximately parallel to the virtual surface to "erase" a virtual chalk board); or other types of identified motions relative to the virtual control surface suited to defining gestures conveying information to the machine. In an implementation and by way of example, one or more virtual control constructs can be defined computationally (e.g., programmatically using a computer or other intelligent machinery) based upon one or more geometric constructs to facilitate determining occurrence of engagement gestures from information about one or more control objects (e.g., hand, tool, combinations thereof) captured using imaging systems, scanning systems, or combinations thereof. Virtual control constructs in an implementation can include virtual surface constructs, virtual linear or curvilinear constructs, virtual point constructs, virtual solid constructs, and complex virtual constructs comprising combinations thereof. Virtual surface constructs can comprise one or more surfaces, e.g., a plane, curved open surface, closed surface, bounded open surface, or generally any multi-dimensional virtual surface definable in two or three dimensions. Virtual linear or curvilinear constructs can comprise any one-dimensional virtual line, curve, line segment or curve segment definable in one, two, or three dimensions. Virtual point constructs can comprise any zero-dimensional virtual point definable in one, two, or three dimensions. Virtual solids can comprise one or more solids, e.g., spheres, cylinders, cubes, or generally any three-dimensional virtual solid definable in three dimensions.

In implementations, the virtual surface construct can be fixed in space, e.g., relative to the screen; for example, it can be defined as a plane (or portion of a plane) parallel to and located several inches in front of the screen in one application, or as a curved surface defined in free-space convenient to one or more users and optionally proximately to display(s) associated with one or more machines under control. The user can engage this plane while remaining at a comfortable distance from the screen (e.g., without needing to lean forward to reach the screen). The position of the plane can be adjusted by the user from time to time. In implementations, however, the user is relieved of the need to explicitly change the plane's position; instead, the plane (or other virtual surface construct) automatically moves along with, as if tethered to, the user's control object. For example, a virtual plane can be computationally defined as perpendicular to the orientation of the control object and located a certain distance, e.g., 3-4 millimeters, in front of its tip when the control object is at rest or moving with constant velocity. As the control object moves, the plane follows it, but with a certain time lag (e.g., 0.2 second). As a result, as the control object accelerates, the distance between its tip and the virtual touch plane changes, allowing the control object, when moving towards the plane, to eventually "catch" the plane—that is, the tip of the control object to touch or pierce the plane. Alternatively, instead of being based on a fixed time lag, updates to the position of the virtual plane can be computed based on a virtual energy potential defined to accelerate the plane towards (or away from) the control object tip depending on the plane-to-tip distance, likewise allowing the control object to touch or pierce the plane. Either way, such virtual touching or piercing can be interpreted as engagement events. Further, in some implementations, the degree of piercing (i.e., the distance beyond the plane that the control object reaches) is interpreted as an intensity level. To guide the user as she engages with or disengages from the virtual plane (or other virtual surface construct), the cursor symbol can encode the distance from the virtual surface visually, e.g., by changing in size with varying distance.

Discrimination between the tentatively selected and actuation modes can be achieved by tracking the control object relative to a virtual control construct such as a virtual plane (or, more generally, a virtual surface construct). In an implementation and by way of example, a virtual control construct implemented by a virtual plane can be defined in front of and substantially parallel to the screen. When the control object "touches" or "pierces" or "intersects" comes in "contact" with the virtual plane (i.e., when its spatial location coincides with, intersects, or moves beyond the virtual plane's computationally defined spatial location), an interface element or control such as a cursor and/or machine interface operates in the tentatively selected mode. Following this, when the control object or a portion of it or another control object performs a subsequent motion or a context specific gestures, the cursor operates in an actuation mode. To implement two or more distinct modes, multiple virtual planes can be defined. For instance, a drawing application can define two substantially parallel virtual planes at different distances from the screen. When the user, moving his finger towards the screen, pierces the first virtual plane, the user can be able to operate menus and controls within the application; when his finger pierces the second virtual plane, the finger's further (e.g., lateral) motions can be converted to line drawings on the screen. Two parallel virtual planes can also be used to, effectively, define a virtual control construct with a certain associated thickness (i.e., a "virtual slab"). Control object movements within that virtual slab can operate the cursor in the actuation mode, while movements on either side of the virtual slab correspond to the tentatively selected mode. A planar virtual control construct with a non-zero thickness can serve to avoid unintended or false actuation and selecting resulting from inevitable small motions in and out of the virtual plane (e.g., due to the inherent instability of the user's hand and/or the user's perception of depth). The thickness can vary depending on one or more sensed parameters (e.g., the overall speed of the control object's motion; the faster the movements, the thicker the slice can be chosen to be).

Transitions between the different operational modes can, but need not, be visually indicated by a change in the shape, color, or other visual property of the cursor or other displayable object and/or audio feedback. In some implementations, the cursor symbol indicates not only the operational mode, but also the control object's distance from the virtual control construct. For instance, the cursor symbol can take the form of a circle, centered at the cursor location, whose radius is proportional to (or otherwise monotonically increasing with) the distance between control object and virtual control construct, and which, optionally, changes color when switching from the tentatively selected mode into the actuation mode.

The virtual plane can be oriented horizontally or vertically to the ground. The location and/or orientation of the virtual surface construct (or other virtual control construct) can be defined relative to the room and/or stationary objects (e.g., a screen) therein, relative to the user, relative to the cameras 102, 104 or relative to some combination. For example, a planar virtual surface construct can be oriented parallel to the screen, perpendicular to the direction of the control object, or at some angle in between. The location of the virtual surface construct can, in some implementations, be set by the user, e.g., by means of a particular gesture recognized by the motion-capture system. To give just one example, the user can, with her index finger stretched out, have her thumb and middle finger touch so as to pin the virtual surface construct at a certain location relative to the current position of the index-finger-tip. Once set in this manner, the virtual surface construct can be stationary until reset by the user via performance of the same gesture in a different location.

In some implementations, the virtual surface construct is tied to and moves along with the control object, i.e., the position and/or orientation of the virtual surface construct are updated based on the tracked control object motion. This affords the user maximum freedom of motion by allowing the user to control the user interface from anywhere (or almost anywhere) within the space monitored by the motion-capture system. To enable the relative motion between the control object and virtual surface construct that is necessary for piercing the surface, the virtual surface construct follows the control object's movements with some delay The position and/or orientation of the virtual surface construct (or other virtual control construct) are typically updated continuously or quasi-continuously, i.e., as often as the motion-capture system determines the control object location and/or direction (which, in visual systems, corresponds to the frame rate of image acquisition and/or image processing). However, implementations in which the virtual surface construct is updated less frequently (e.g., only every other frame, to save computational resources) or more frequently (e.g., based on interpolations between the measured control object positions) can be provided for in implementations.

In some implementations, the virtual surface construct follows the control object with a fixed time lag, e.g., between 0.1 and 1.0 second. In other words, the location of the virtual surface construct is updated, for each frame, based on where the control object tip was a certain amount of time (e.g., 0.2 second) in the past. In some implementations, the plane can be computationally defined as substantially perpendicular to the orientation of the control object (meaning that its normal is angled relative to the control object orientation by less than a certain small amount, e.g., less than 5°, and preferably smaller than 1°). Of course, the virtual plane need not necessarily be perpendicular to the orientation of the control object. In some implementations, it is, instead, substantially parallel to the screen, but still dynamically positioned relative to the control object (e.g., so as to remain at a certain distance from the control object tip, where distance can be measured, e.g., in a direction perpendicular to the screen or, alternatively, in the direction of the control object).

The virtual plane need not be planar, but can be curved in space, e.g., to conform to the user's range of movements. For example, a cylindrical virtual surface construct in front of an arrangement of three monitors, which can all be connected to the same computer. The user's finger motions can control screen content on any one of the screens, depending on the direction in which the finger points and/or the portion of the virtual surface construct that it pierces. Of course, other types of curved virtual surfaces constructs of regular (e.g., spherical) or irregular shape, or virtual surface constructs composed of multiple (planar or curved) segments, can also be used in combination with one or more screens. Further, in some implementations, the virtual control construct is a virtual solid construct or a virtual closed surface (such as, e.g., a sphere, box, oriented ellipsoid, etc.) or portion thereof, having an interior (or, alternatively, exterior) that defines a three-dimensional engagement target. For instance, in an application that allows the user to manipulate a globe depicted on the screen, the virtual control construct can be a virtual sphere located at some distance in front of the screen. The user can be able to rotate the on-screen globe by moving his fingertips while they are touching or piercing the spherical virtual surface construct (from outside). To allow the user to manipulate the globe from inside, the spherical virtual surface construct can be defined as surrounding the user (or at least his hand), with its exterior serving as the engagement target. Engagement and disengagement of the control object need not necessarily be defined relative to a two-dimensional surface. Rather, in some implementations, the virtual control construct can be a virtual point construct along a virtual line (or line segment) extending from the control object, or a line within a plane extending from the control object.

In various implementations, the position of the virtual plane (or other virtual surface construct) is updated not based on a time lag, but based on its current distance from the control object tip. That is, for any image frame, the distance between the current control object tip position and the virtual plane is computed (e.g., with the virtual-plane position being taken from the previous frame), and, based thereon, a displacement or shift to be applied to the virtual plane is determined.

As will be readily apparent to those of skill in the art, the methods described above can be readily extended to the control of a user interface with multiple simultaneously tracked control objects. For instance, both left and right index fingers of a user can be tracked, each relative to its own associated virtual touch surface, to operate two cursors simultaneously and independently. As another example, the user's hand can be tracked to determine the positions and orientations of all fingers; each finger can have its own associated virtual surface construct (or other virtual control construct) or, alternatively, all fingers can share the same virtual surface construct, which can follow the overall hand motions. A joint virtual plane can serve, e.g., as a virtual drawing canvas on which multiple lines can be drawn by the fingers at once.

In an implementation and by way of example, one or more control parameter(s) and the control object are applied to some control mechanism to determine the distance of the virtual control construct to a portion of the control object (e.g., tool tip(s), point(s) of interest on a user's hand or other points of interest). In some implementations, a lag (e.g., filter or filtering function) is introduced to delay, or modify, application of the control mechanism according to a variable or a fixed increment of time, for example. Accordingly, implementations can provide enhanced verisimilitude to the human-machine interaction, and/or increased fidelity of tracking control object(s) and/or control object portion(s).

In one example, the control object portion is a user's finger-tip. A control parameter is also the user's finger-tip. A control mechanism includes equating a plane-distance between virtual control construct and finger-tip to a distance between finger-tip and an arbitrary coordinate (e.g., center (or origin) of an interaction zone of the controller). Accordingly, the closer the finger-tip approaches to the arbitrary coordinate, the closer the virtual control construct approaches the finger-tip.

In another example, the control object is a hand, which includes a control object portion, e.g., a palm, determined by a "palm-point" or center of mass of the entire hand. A control parameter includes a velocity of the hand, as measured at the control object portion, i.e., the center of mass of the hand. A control mechanism includes filtering forward velocity over the last one (1) second. Accordingly, the faster the palm has recently been travelling forward, the closer the virtual control construct approaches to the control object (i.e., the hand).

In a further example, a control object includes a control object portion (e.g., a finger-tip). A control mechanism includes determining a distance between a thumb-tip (e.g., a first control object portion) and an index finger (e.g., a second control object portion). This distance can be used as a control parameter. Accordingly, the closer the thumb-tip and index-finger, the closer the virtual control construct is determined to be to the index finger. When the thumb-tip and index finger touch one another, the virtual control construct is determined to be partially pierced by the index finger.

User-interface control via free-space motions relies generally on a suitable motion-capture device or system for tracking the positions, orientations, and motions of one or more control objects. For a description of tracking positions, orientations, and motions of control objects, reference can be had to U.S. patent application Ser. No. 13/414,485, filed on Mar. 7, 2012, the entire enclosure of which is incorporated herein by reference. In various implementations, motion capture can be accomplished visually, based on a temporal sequence of images of the control object (or a larger object of interest including the control object, such as the user's hand) captured by one or more cameras. In one implementation, images acquired from two (or more) vantage points are used to define tangent lines to the surface of the object and approximate the location and shape of the object based thereon, as explained in more detail below. Other vision-based approaches that can be used in implementations include, without limitation, stereo imaging, detection of patterned light projected onto the object, or the use of sensors and markers attached to or worn by the object (such as, e.g., markers integrated into a glove) and/or combinations thereof. Alternatively or additionally, the control object can be tracked acoustically or ultrasonically, or using inertial sensors such as accelerometers, gyroscopes, and/or magnetometers (e.g., MEMS sensors) attached to or embedded within the control object. Implementations can be built employing one or more of particular motion-tracking approaches that provide control object position and/or orientation (and/or derivatives thereof) tracking with sufficient accuracy, precision, and responsiveness for the particular application.

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" the predecessor signal, event or value. "Responsiveness" or "dependency" or "basis" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Gesture-Recognition System

FIG. 1 illustrates an exemplary system for capturing images and controlling a machine based on motions relative to a virtual control construct according to various implementations. Motion-capture systems generally include (i) a camera for acquiring images of an object; (ii) a computer for processing the images to identify and characterize the object; and (iii) a computer display for displaying information related to the identified/characterized object. As shown in FIG. 1, which illustrates an exemplary motion-capture system 100 including any number of cameras 102, 104 coupled to an image analysis, motion capture, and control system 106 (The system 106 is hereinafter variably referred to as the "image analysis and motion capture system," the "image analysis system," the "motion capture system," "augmented reality (AR) generation system," "the gesture recognition system," the "control and image-processing system," the "control system," or the "image-processing system," depending on which functionality of the system is being discussed.).

Cameras 102, 104 provide digital image data to the image analysis, motion capture, and control system 106, which analyzes the image data to determine the three-dimensional (3D) position, orientation, and/or motion of the object 114 the field of view of the cameras 102, 104. Cameras 102, 104 can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. Further, the term "light" is used generally to connote any electromagnetic radiation, which may or may not be within the visible spectrum, and can be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side. To capture motion of a running person, the volume of interest might have dimensions of tens of meters in order to observe several strides.

Cameras 102, 104 can be oriented in any convenient manner. In one implementation, the optical axes of the cameras 102, 104 are parallel, but this is not required. As described below, each of the 102, 104 can be used to define a "vantage point" from which the object 114 is seen; if the location and view direction associated with each vantage point are known, the locus of points in space that project onto a particular position in the cameras' image plane can be determined. In some implementations, motion capture is reliable only for objects in an area where the fields of view of cameras 102, 104; the cameras 102, 104 can be arranged to provide overlapping fields of view throughout the area where motion of interest is expected to occur.

In some implementations, the illustrated system 100 includes one or more sources 108, 110, which can be disposed to either side of cameras 102, 104, and are controlled by image analysis and motion capture system 106. In one implementation, the sources 108, 110 are light sources. For example, the light sources can be infrared light sources, e.g., infrared light emitting diodes (LEDs), and cameras 102, 104 can be sensitive to infrared light. Use of infrared light can allow the motion-capture system 100 to operate under a broad range of lighting conditions and can avoid various inconveniences or distractions that can be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1 for clarity sake) used in conjunction with, or instead of, cameras 102, 104. The sonic sources transmit sound waves to the user; with the user either blocking ("sonic shadowing") or altering the sound waves ("sonic deflections") that impinge upon her. Such sonic shadows and/or deflections can also be used to detect the user's gestures and/or provide presence information and/or distance information using ranging techniques. In some implementations, the sound waves are, for example, ultrasound, which are not audible to humans.

It should be stressed that the arrangement shown in FIG. 1 is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short-angle and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes an entire control object or its portion 114 (in this example, a hand) that can optionally hold a tool or other object of interest. Cameras 102, 104 are oriented toward the region 112 to capture video images of the hand 114. In some implementations, the operation of light sources 108, 110 and cameras 102, 104 is controlled by the image analysis and motion capture system 106, which can be, e.g., a computer system, control logic implemented in hardware and/or software or combinations thereof. Based on the captured images, image analysis and motion capture system 106 determines the position and/or motion of hand 114.

Motion capture can be improved by enhancing contrast between the object of interest 114 and background surfaces like surface 116 visible in an image, for example, by means of controlled lighting directed at the object. For instance, in motion capture system 106 where an object of interest 114, such as a person's hand, is significantly closer to the cameras 102 and 104 than the background surface 116, the falloff of light intensity with distance ($1/r^2$ for point like light sources) can be exploited by positioning a light source (or multiple light sources) near the camera(s) or other image-capture device(s) and shining that light onto the object 114. Source light reflected by the nearby object of interest 114 can be expected to be much brighter than light reflected from more distant background surface 116, and the more distant the background (relative to the object), the more pronounced the effect will be. Accordingly, a threshold cut off on pixel brightness in the captured images can be used to distinguish "object" pixels from "background" pixels. While broadband ambient light sources can be employed, various implementations use light having a confined wavelength range and a camera matched to detect such light; for example, an infrared source light can be used with one or more cameras sensitive to infrared frequencies.

In operation, cameras 102, 104 are oriented toward a region of interest 112 in which an object of interest 114 (in this example, a hand) and one or more background objects 116 can be present. Light sources 108, 110 are arranged to illuminate region 112. In some implementations, one or more of the light sources 108, 110 and one or more of the cameras 102, 104 are disposed below the motion to be detected, e.g., in the case of hand motion, on a table or other surface beneath the spatial region where hand motion occurs. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Further, if the cameras 102, 104 are looking up, there is little likelihood of confusion with background objects (clutter on the user's desk, for example) and other people within the cameras' field of view.

Control and image-processing system 106, which can be, e.g., a computer system, can control the operation of light sources 108, 110 and cameras 102, 104 to capture images of region 112. Based on the captured images, the image-processing system 106 determines the position and/or motion of object 114. For example, as a step in determining the position of object 114, image-analysis system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. With the use of light sources 108, 110, classification of pixels as object or background pixels can be based on the brightness of the pixel. For example, the distance ($r_O$) between an object of interest 114 and cameras 102, 104 is expected to be smaller than the distance ($r_B$) between background object(s) 116 and cameras 102, 104. Because the intensity of light from sources 108, 110 decreases as $1/r^2$, object 114 will be more brightly lit than background 116, and pixels containing portions of object 114 (i.e., object pixels) will be correspondingly brighter than pixels containing portions of background 116 (i.e., background pixels). For example, if $r_B/r_O=2$, then object pixels will be approximately four times brighter than background pixels, assuming object 114 and background 116 are similarly reflective of the light from sources 108, 110, and further assuming that the overall illumination of region 112 (at least within the frequency band captured by cameras 102, 104) is dominated by light sources 108, 110. These conditions generally hold for suitable choices of cameras 102, 104, light sources 108, 110, filters 120, 122, and objects commonly encountered. For example, light sources 108, 110 can be infrared LEDs capable of strongly emitting radiation in a narrow frequency band, and filters 120, 122 can be matched to the frequency band of light sources 108, 110. Thus, although a human hand or body, or a heat source or other object in the background, can emit some infrared radiation, the response of cameras 102, 104 can still be dominated by light originating from sources 108, 110 and reflected by object 114 and/or background 116.

In this arrangement, image-analysis system 106 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some implementations, light sources 108, 110 are bright enough that reflected light from an object at distance $r_O$ produces a brightness level of 1.0 while an object at distance $r_B=2r_O$ produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 102, 104 allows image-analysis system 106 to determine the location in 3D space of object 114, and analyzing sequences of images allows image-analysis system 106 to reconstruct 3D motion of object 114 using motion algorithms.

In accordance with various implementations of the technology disclosed, the cameras 102, 104 (and typically also the associated image-analysis functionality of control and image-processing system 106) are operated in a low-power mode until an object of interest 114 is detected in the region of interest 112. For purposes of detecting the entrance of an object of interest 114 into this region, the system 100 further includes one or more light sensors 118 (e.g., a CCD or CMOS sensor) and/or an associated imaging optic (e.g., a lens) that monitor the brightness in the region of interest 112 and detect any change in brightness. For example, a single light sensor including, e.g., a photodiode that provides an output voltage indicative of (and over a large range proportional to) a measured light intensity can be disposed between the two cameras 102, 104 and oriented toward the region of interest 112. The one or more sensors 118 continuously measure one or more environmental illumination parameters such as the brightness of light received from the environment. Under static conditions—which implies the absence of any motion in the region of interest 112—the brightness will be constant. If an object enters the region of interest 112, however, the brightness can abruptly change. For example, a person walking in front of the sensor(s) 118 can block light coming from an opposing end of the room, resulting in a sudden decrease in brightness. In other situations, the person can reflect light from a light source in the room onto the sensor, resulting in a sudden increase in measured brightness.

The aperture of the sensor(s) 118 can be sized such that its (or their collective) field of view overlaps with that of the cameras 102, 104. In some implementations, the field of view of the sensor(s) 118 is substantially co-existent with that of the cameras 102, 104 such that substantially all objects entering the camera field of view are detected. In other implementations, the sensor field of view encompasses and exceeds that of the cameras. This enables the sensor(s) 118 to provide an early warning if an object of interest approaches the camera field of view. In yet other implementations, the sensor(s) capture(s) light from only a portion of the camera field of view, such as a smaller area of interest located in the center of the camera field of view.

The control and image-processing system 106 monitors the output of the sensor(s) 118, and if the measured brightness changes by a set amount (e.g., by 10% or a certain number of candela), it recognizes the presence of an object of interest in the region of interest 112. The threshold change can be set based on the geometric configuration of the region of interest and the motion-capture system, the general lighting conditions in the area, the sensor noise level, and the expected size, proximity, and reflectivity of the object of interest so as to minimize both false positives and false negatives. In some implementations, suitable settings are determined empirically, e.g., by having a person repeatedly walk into and out of the region of interest 112 and tracking the sensor output to establish a minimum change in brightness associated with the person's entrance into and exit from the region of interest 112. Of course, theoretical and empirical threshold-setting methods can also be used in conjunction. For example, a range of thresholds can be determined based on theoretical considerations (e.g., by physical modelling, which can include ray tracing, noise estimation, etc.), and the threshold thereafter fine-tuned within that range based on experimental observations.

In implementations where the area of interest 112 is illuminated, the sensor(s) 118 will generally, in the absence of an object in this area, only measure scattered light amounting to a small fraction of the illumination light. Once an object enters the illuminated area, however, this object can reflect substantial portions of the light toward the sensor(s) 118, causing an increase in the measured brightness. In some implementations, the sensor(s) 118 is (or are) used in conjunction with the light sources 108, 110 to deliberately measure changes in one or more environmental illumination parameters such as the reflectivity of the environment within the wavelength range of the light sources. The light sources can blink, and a brightness differential be measured between dark and light periods of the blinking cycle. If no object is present in the illuminated region, this yields a baseline reflectivity of the environment. Once an object is in the area of interest 112, the brightness differential will increase substantially, indicating increased reflectivity. (Typically, the signal measured during dark periods of the blinking cycle, if any, will be largely unaffected, whereas the reflection signal measured during the light period will experience a significant boost.) Accordingly, the control system 106 monitoring the output of the sensor(s) 118 can detect an object in the region of interest 112 based on a change in one or more environmental illumination parameters such as environmental reflectivity that exceeds a predetermined threshold (e.g., by 10% or some other relative or absolute amount). As with changes in brightness, the threshold change can be set theoretically based on the configuration of the image-capture system and the monitored space as well as the expected objects of interest, and/or experimentally based on observed changes in reflectivity.

3D Solid Hand Model

Gesture-recognition system 278 can not only recognize gestures for purposes of providing input to the electronic device, but can also capture the position and shape of the user's hand 114 in consecutive video images in order to characterize a hand gesture in 3D space and reproduce it on the display screen 202. A 3D model of the user's hand is determined from a solid hand model covering one or more capsule elements built from the images using techniques described below with reference to FIGS. 1B-1F.

Figure 1B:
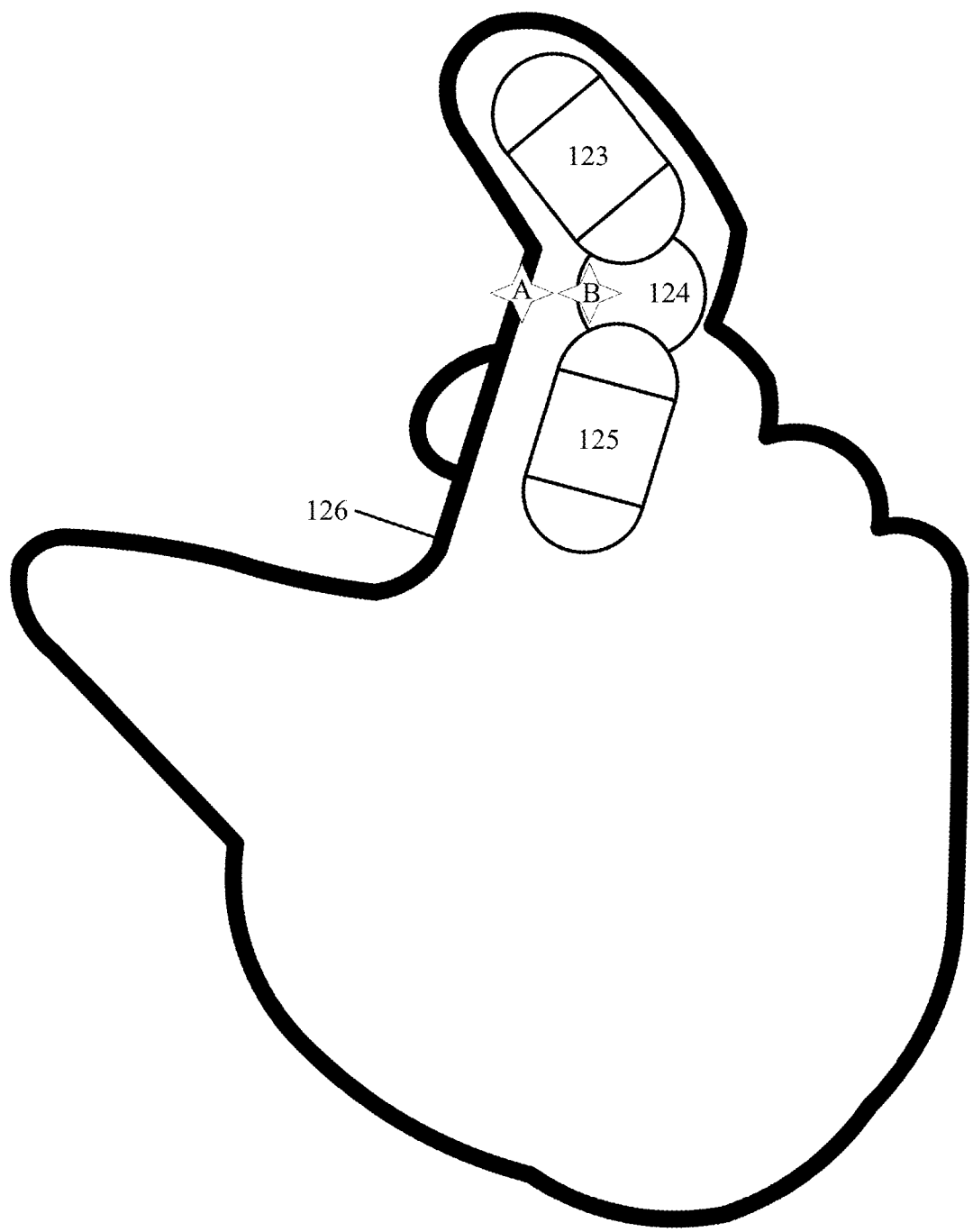
FIG. 1B shows one implementation of a 3D solid model hand with capsule representation of predictive information of a hand.

FIG. 1B shows one implementation of a 3D solid hand model 100B with capsule representation of predictive information of the hand 114. Examples of predictive information of the hand include finger segment length, distance between finger tips, joint angles between fingers, and finger segment orientation. As illustrated by FIG. 1B, the prediction information can be constructed from one or more model subcomponents referred to as capsules 124, 123, and 125, which are selected and/or configured to represent at least a portion of a surface of the hand 114 and virtual surface portion 126. In some implementations, the model subcomponents can be selected from a set of radial solids, which can reflect at least a portion of the hand 114 in terms of one or more of structure, motion characteristics, conformational characteristics, other types of characteristics of hand 114, and/or combinations thereof. In one implementation, radial solids are objects made up of a 1D or 2D primitive (e.g., line, curve, plane) and a surface having a constant radial distance to the 1D or 2D primitive. A closest point to the radial solid can be computed relatively quickly. As used herein, three or greater capsules are referred to as a "capsoodle."

One radial solid implementation includes a contour and a surface defined by a set of points having a fixed distance from the closest corresponding point on the contour. Another radial solid implementation includes a set of points normal to points on a contour and a fixed distance therefrom. In one implementation, computational technique(s) for defining the radial solid include finding a closest point on the contour and the arbitrary point, then projecting outward the length of the radius of the solid. In another implementation, such projection can be a vector normal to the contour at the closest point. An example radial solid (e.g., 123, 125) includes a "capsuloid," i.e., a capsule shaped solid including a cylindrical body and semi-spherical ends. Another type of radial solid (e.g., 124) includes a sphere. Different types of radial solids can be identified based on the foregoing teaching in other implementations.

One or more attributes can define characteristics of a model subcomponent or capsule. Attributes can include e.g., sizes, rigidity, flexibility, torsion, ranges of motion with respect to one or more defined points that can include endpoints in some examples. In one implementation, predictive information about the hand 114 can be formed to include a 3D solid model 100B of the hand 114 together with attributes defining the model and values of those attributes.

In some implementations, when the hand 114 morphs, conforms, and/or translates, motion information reflecting such motion(s) is included as observed information about the motion of the hand 114. Points in space can be recomputed based on the new observation information. The model subcomponents can be scaled, sized, selected, rotated, translated, moved, or otherwise re-ordered to enable portions of the model corresponding to the virtual surface(s) to conform within the set of points in space.

Figure 1D:
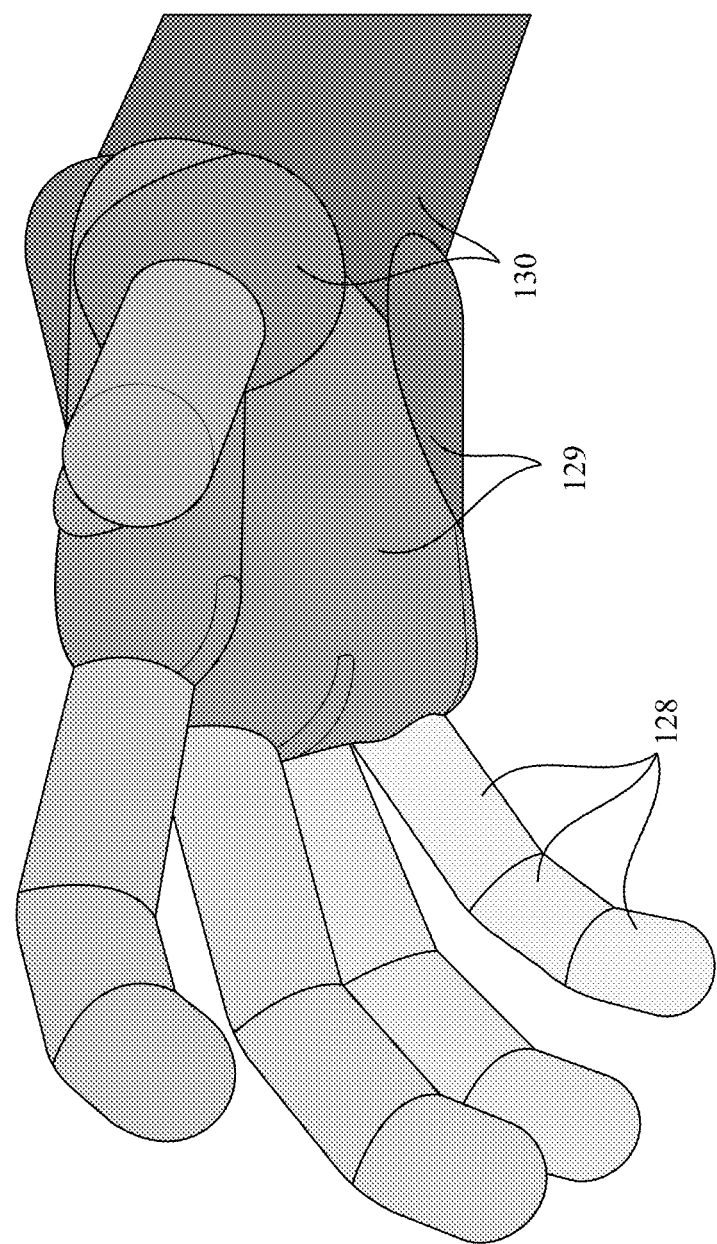
Figure 1E:
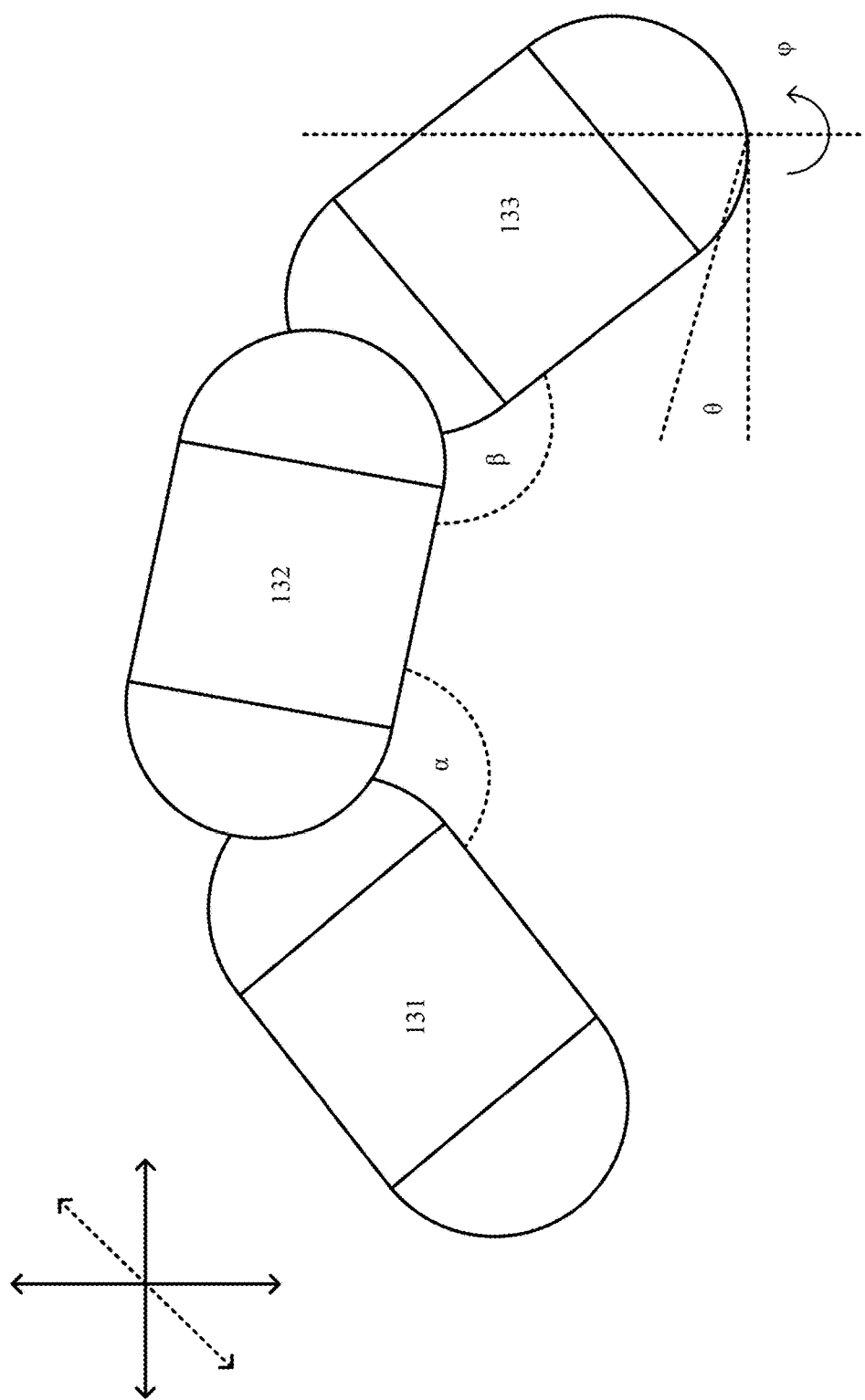
FIG. 1E depicts one implementation of generating a 3D finger capsuloid of a hand with different joint angles.
Figure 3A:
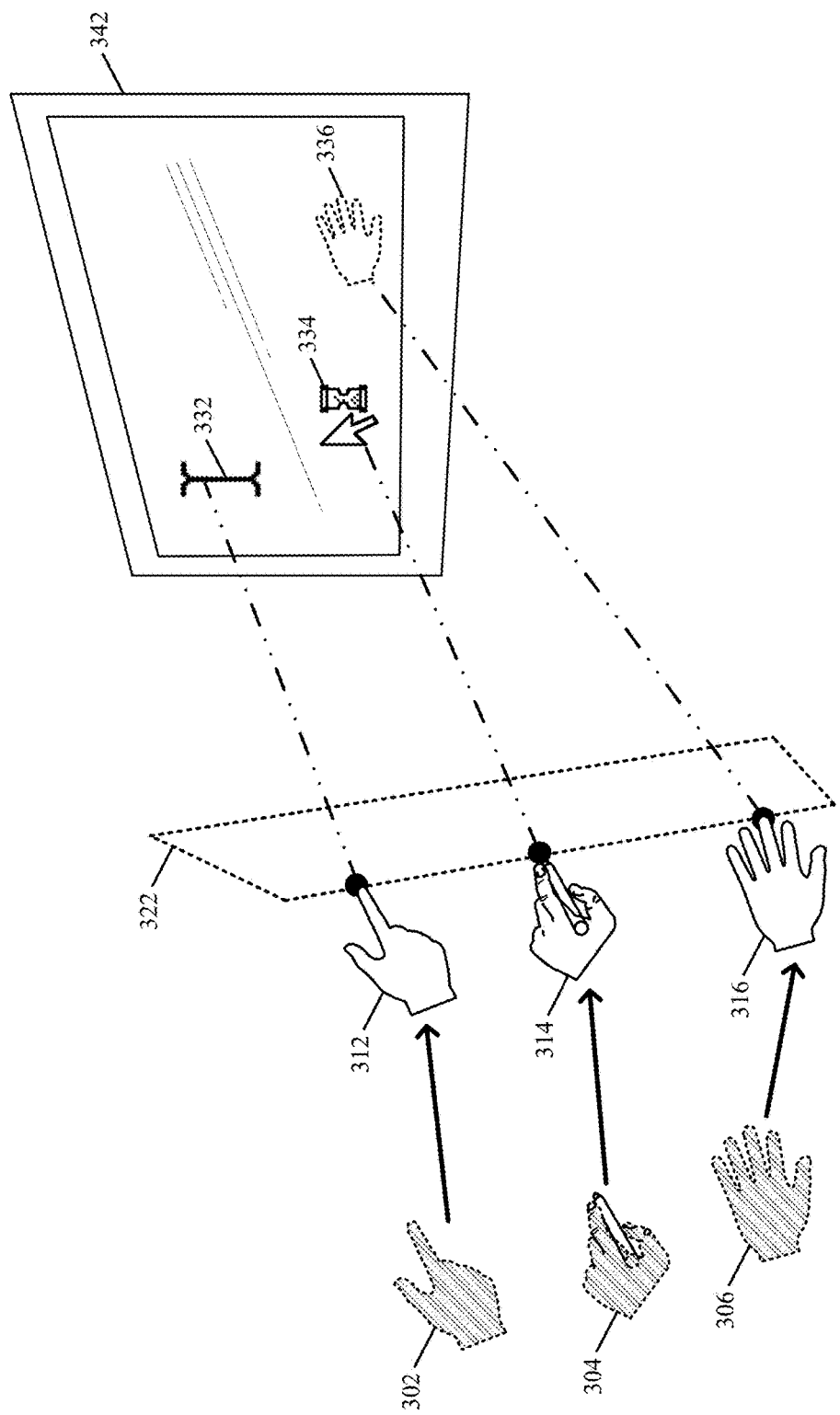
FIGS. 3A-3C depict controls displayed on a user-interface manipulated by one or more objects.
Figure 3B:
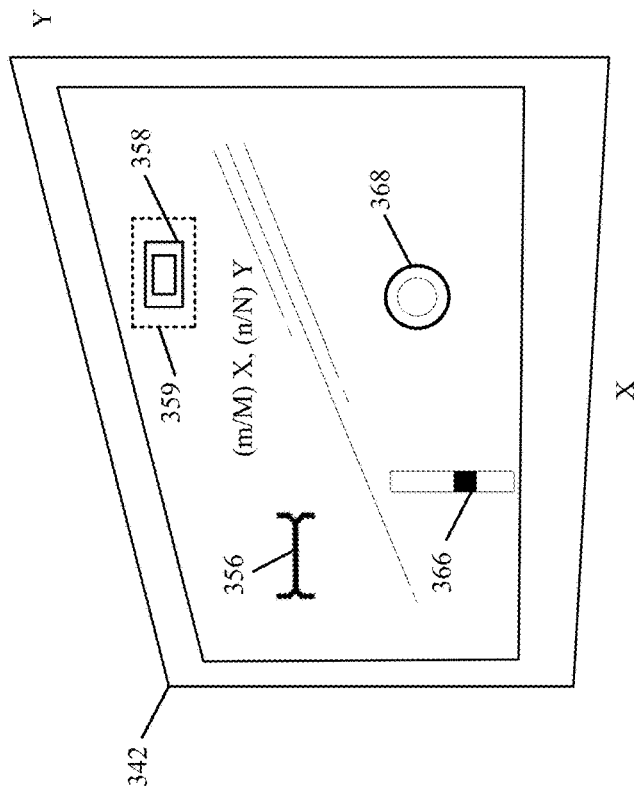
Figure 3B:
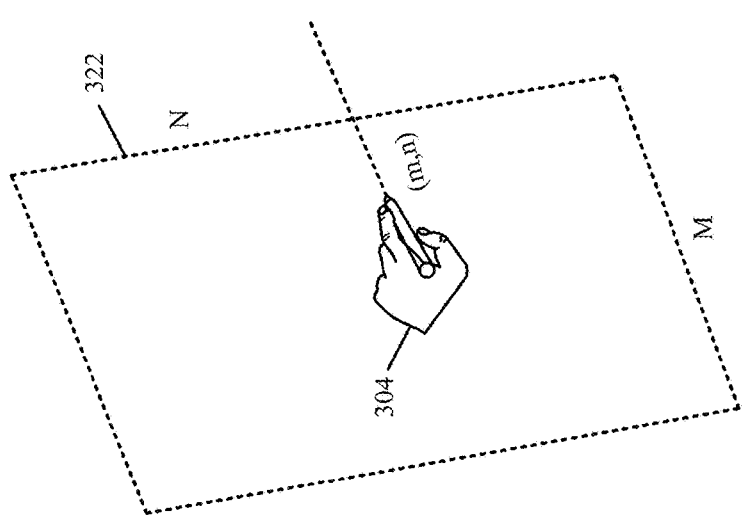
Figure 3C:
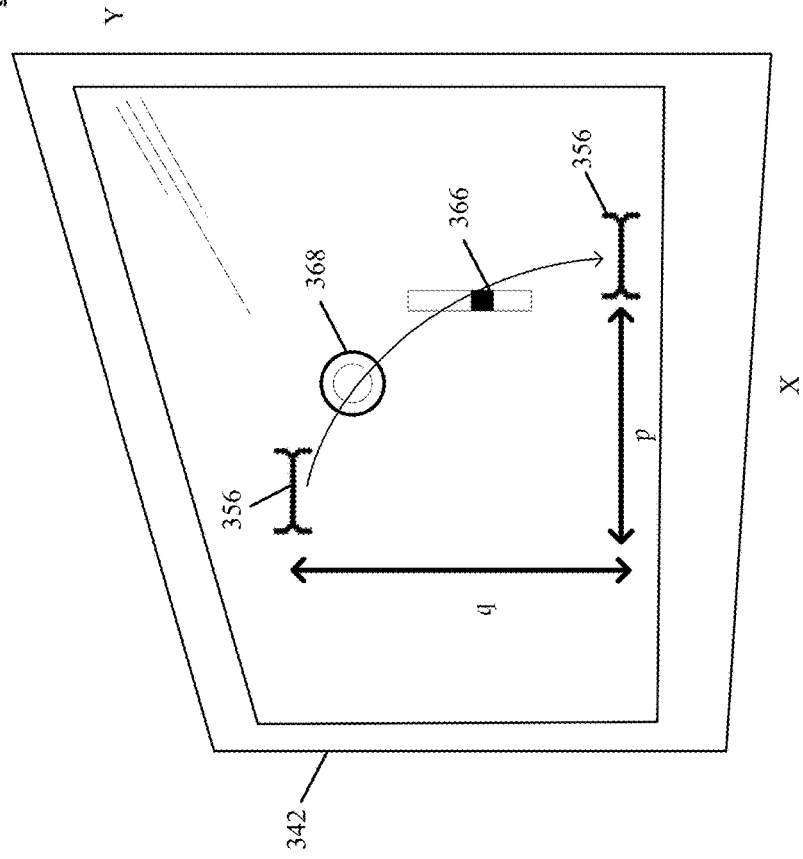
Figure 3C:
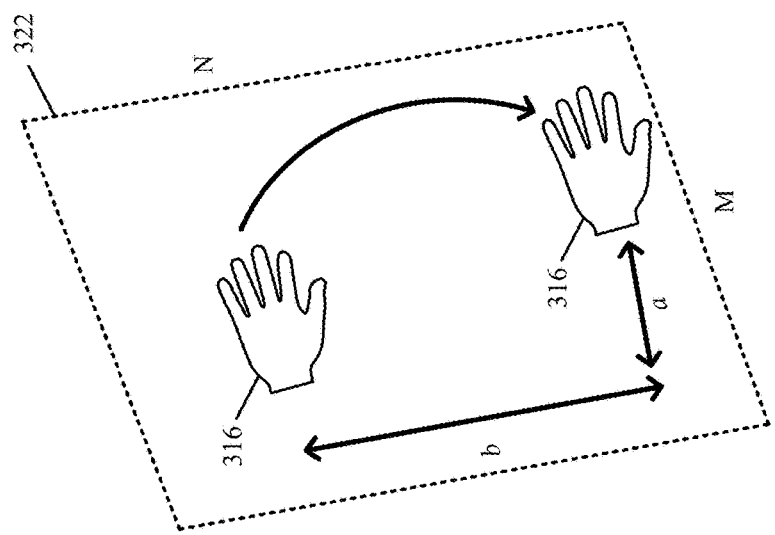

In one implementation and with reference to FIGS. 1C and 1D, a collection of radial solids and/or capsuloids can be considered a "capsule hand." In particular, FIGS. 3B and 3C illustrate different views 100C and 100D of a 3D capsule hand. A number of capsuloids 128, e.g. 5, are used to represent fingers on a hand while a number of radial solids 129 are used to represent the shapes of the palm and wrist. With reference to FIG. 1E, a finger capsuloid 100E with radial solids 131, 132, and 133 can be represented by its two joint angles ($\alpha$, $\beta$), pitch ($\theta$), and yaw ($\varphi$). In an implementation, the angle $\beta$ can be represented as a function of joint angle $\alpha$, pitch $\theta$, and yaw $\varphi$. Allowing angle $\beta$ to be represented this way can allow for faster representation of the finger capsuloid with fewer variables; see, e.g., U.S. Serial Nos. 61/871,790, filed 28 Aug. 2013 and 61/873,758, filed 4 Sep. 2013. For example, one capsule hand can include 5 capsules for each finger, a radial polygon defining a base of the hand, and a plurality of definitional capsules that define fleshy portions of the hand. In some implementations, the capsule hand 100D is created using stereo matching, depth maps, or by finding contours and/or feature points reduced to certain finite number of degrees of freedom so as to enable simplification of problems of inverse kinematics (IK), sampling sizes, pose determination, etc.

Figure 1F:
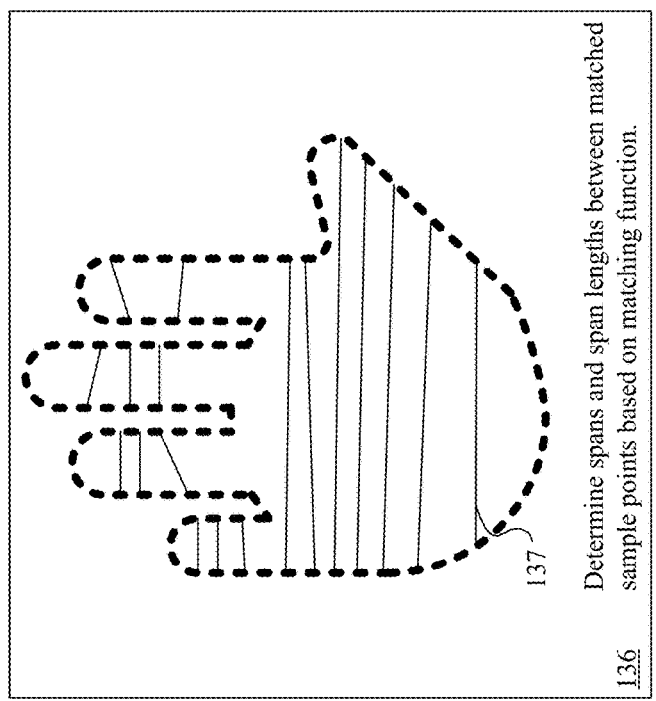
FIG. 1F is one implementation of determining spans and span lengths of a control object.
Figure 1F:
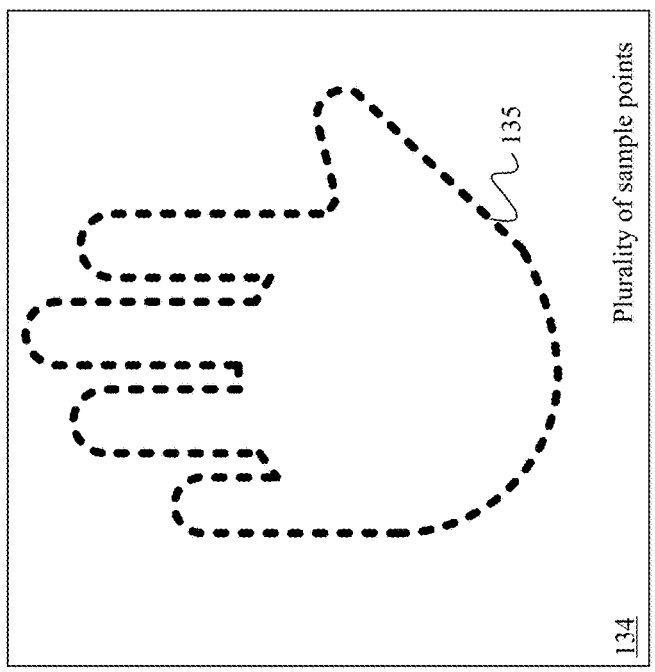
Figure 1F:
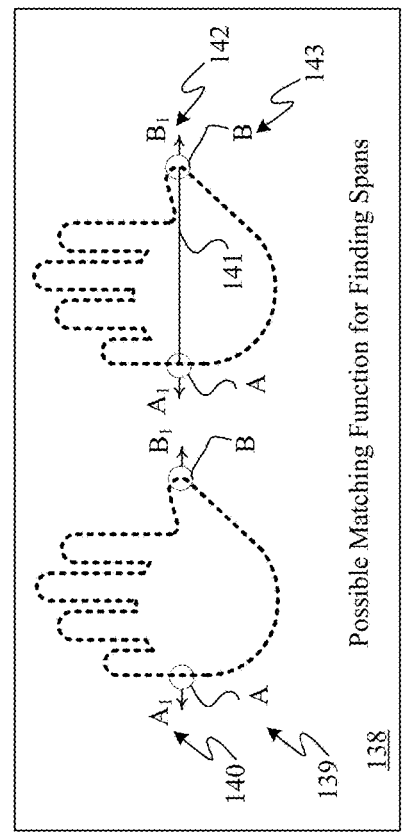

FIG. 1F depicts determination of spans and span lengths 100E in the observed information about the hand 114 in which one or more point pairings are selected from a surface portion as represented in the observed information. As illustrated by block 134 of FIG. 1F, an observed surface portion 135 (i.e., of observed information) can include a plurality of sample points from which one or more point pairings can be selected. In a block 138 of FIG. 1F, a point pairing between point A and point B of observed surface portion 135 are selected by application of a matching function such as for example the matching function. One method for determining a point pairing using a matching function is illustrated by FIG. 1F, in which a first unmatched (arbitrary) point A on a contour (of block 138 of FIG. 1F) representing a surface portion of interest in the observed information is selected as a starting point 139. A normal $A_1$ 140 (of block 138 of FIG. 1F) is determined for the point A. A wide variety of techniques for determining a normal can be used in implementations, but in one example implementation, a set of points proximate to the first unmatched point, at least two of which are not co-linear, is determined. Then, a normal for the first unmatched point can be determined using the other points in the set by determining a normal perpendicular to the plane. For example, given points $P_1$, $P_2$, $P_3$, the normal n is given by the cross product:

$n=(p_2-p_1)\times(p_3-p_1)$,

Another technique that can be used: (i) start with the set of points; (ii) form a first vector from $P_2-P_1$, (iii) apply rotation matrix to rotate the first vector 90 degrees away from the center of mass of the set of points. (The center of mass of the set of points can be determined by an average of the points). A yet further technique that can be used includes: (i) determine a first vector tangent to a point on a contour in a first image; (ii) determine from the point on the contour a second vector from that point to a virtual camera object in space; (iii) determine a cross product of the first vector and the second vector. The cross product is a normal vector to the contour.

Again with reference to FIG. 1E, the closest second unmatched point B 143 (of block 136 of FIG. 1E) reachable by a convex curve (line 137) having the most opposite normal $B_1$ 142 is found. Accordingly, points A and B form a point pairing. In FIG. 1E, a span length is determined for at least one of the one or more point pairings selected. Now with reference to block 136 of FIG. 1E, one or more spans and span lengths are determined for the one or more point pairings. In a representative implementation, a span can be found by determining a shortest convex curve for the point pairings A and B. It is determined whether the convex curve passes through any other points of the model. If so, then another convex curve is determined for paired points A and B. Otherwise, the span comprises the shortest continuous segment found through paired points A and B that only intersects the model surface at paired points A and B. In an implementation, the span can comprise a convex geodesic segment that only intersects the model at two points. A span can be determined from any two points using the equation of a line fitted to the paired points A and B for example.

Figure 1G:
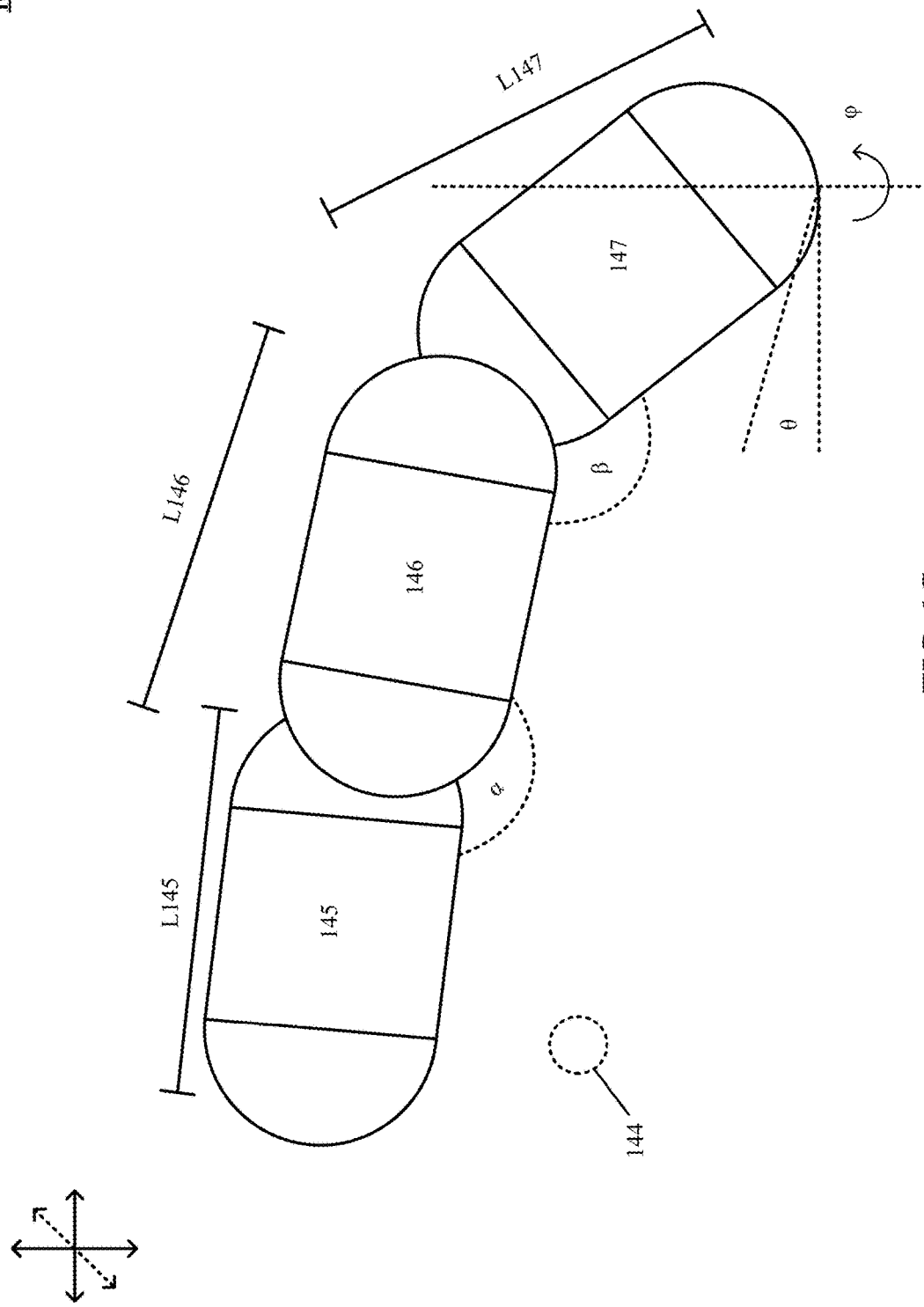
FIGS. 1G-1H are one implementation of determination and reconstruction of fingertip position of a hand.
Figure 1H:
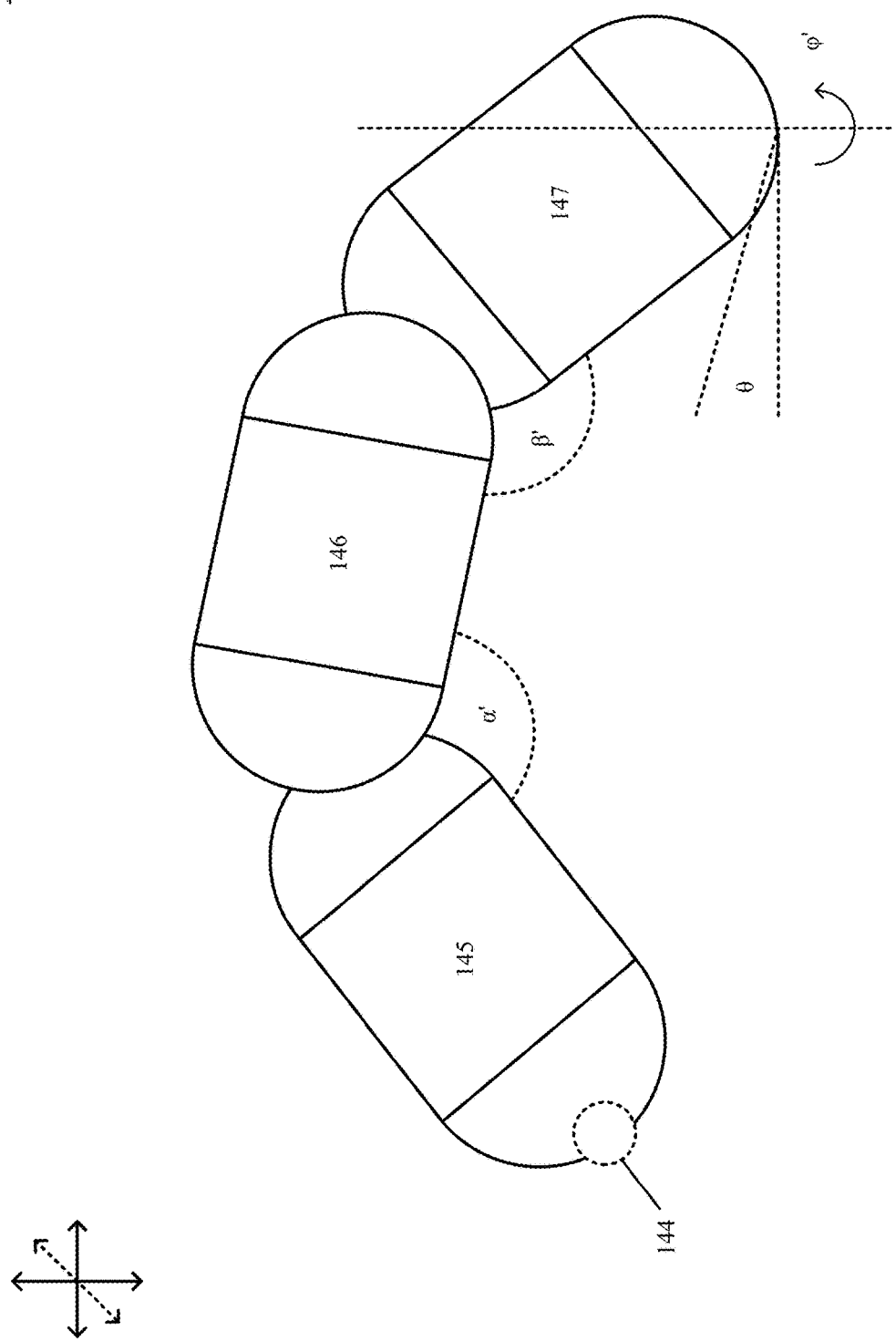

In one implementation, as illustrated by FIGS. 1G-1H, a fingertip position 100G-H can be determined from an image and can be reconstructed in 3D space. In FIG. 1G, a point 144 is an observed fingertip. Model 145, 146, and 147 are aligned such that the tip of 145 is coincident with the location in space of point 144 determined from the observed information. In one technique, angle α and angle β are allowed to be set equal, which enables a closed form solution for θ and φ as well as angle α and angle β.

$s^2=2ac(-2a^2-2c^2+b^2-2a-2b-2c+4ac)+-2b^2(a^2+c^2)$ $a=\beta=\tan 2^{-1}s-(a+c)b$ $\varphi=x_1/\text{norm}(x)$ $\theta=x_2/\text{norm}(x)$ Wherein norm(x) can be described as the norm of a 3D point x (144 in FIG. 1H) with a, b and c being capsule lengths L145, L146, L147 in FIG. 1G.

Figure 1I:
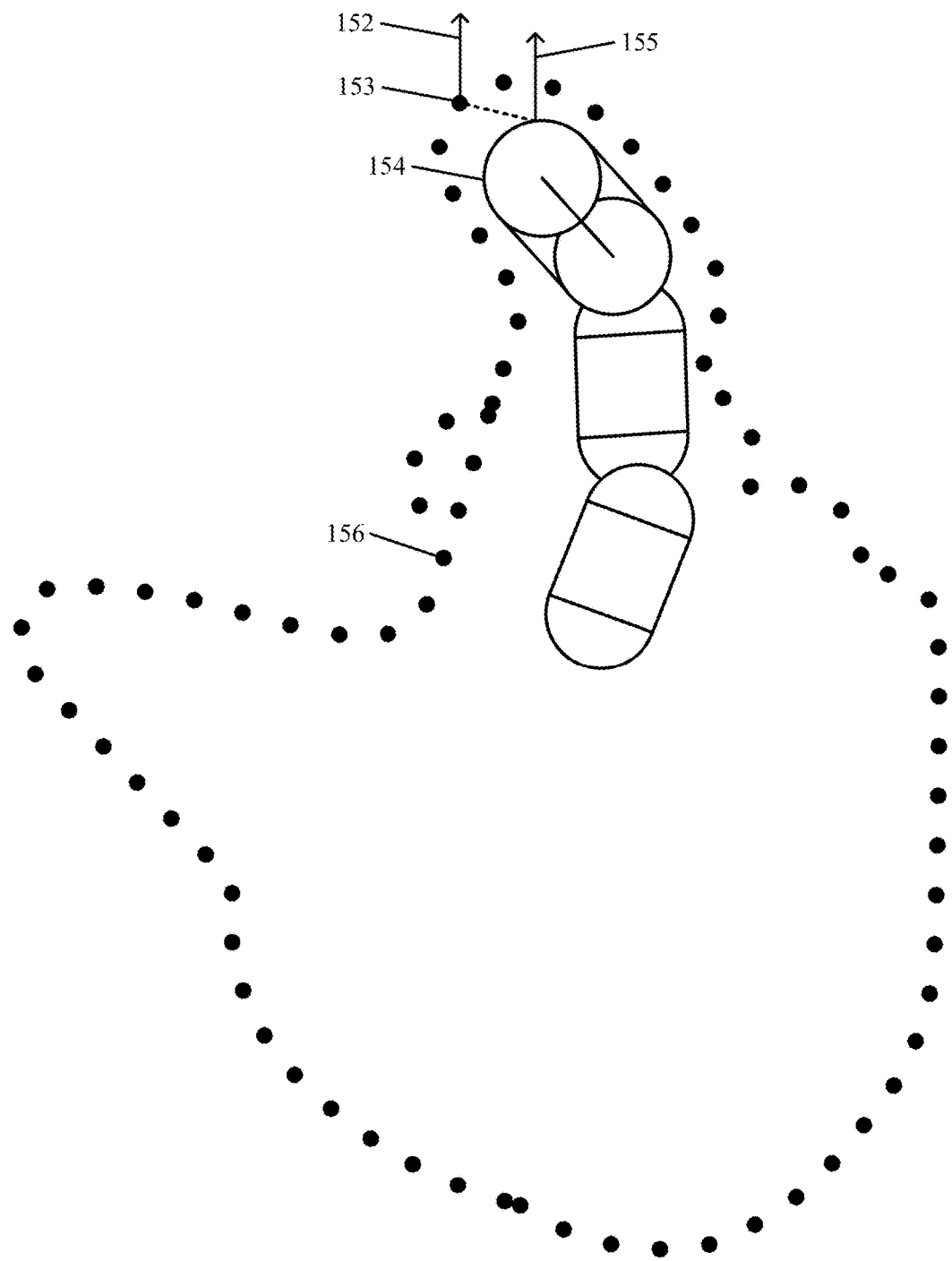
FIG. 1I shows one implementation of improving capsule representation of predictive information.

FIG. 1I illustrates one implementation of improving 100I capsule representation of predictive information. In one implementation, observation information 156 including observation of the control object (such as hand 114) can be compared against the 3D solid hand model at least one of periodically, randomly or substantially continuously (i.e., in real-time). Observational information 156 can include without limitation observed values of attributes of the control object corresponding to the attributes of one or more model subcomponents in the predictive information for the control object. In another implementation, comparison of the model 154 with the observation information 156 provides an error indication 153. In an implementation, an error indication 153 can be computed by first associating a set A of 3D points with a corresponding normal direction 152 to a set B of 3D points with a corresponding normal direction 155 on the subcomponents surface. The association can be done in a manner that assures that each paired point in set A and B has the same associated normal. An error can then be computed by summing the distances between each point in set A and B. This error is here on referred to the association error; see, e.g., U.S. Ser. No. 61/873,758, filed Sep. 4, 2013.

Predictive information of the 3D hand model can be aligned to the observed information using any of a variety of techniques. Aligning techniques bring model portions (e.g., capsules, capsuloids, capsoodles) into alignment with the information from the image source (e.g., edge samples, edge rays, interior points, 3D depth maps, and so forth). In one implementation, the model is rigidly aligned to the observed information using iterative closest point (ICP) technique. The model can be non-rigidly aligned to the observed information by sampling techniques.

One ICP implementation includes finding an optimal rotation R and translation T from one set of points A to another set of points B. First each point from A is matched to a point in set B. A mean square error is computed by adding the error of each match:

$MSE=\text{sqrt}(\Sigma(R^*x_i+T-y_i)^{t^*}(R^*x_i+T-y_i))$

An optimal R and T can be computed and applied to the set of points A or B, in some implementations.

In order to enable the ICP to match points to points on the model, a capsule matching technique can be employed. One implementation of the capsule matcher includes a class that "grabs" the set of data and computes the closest point on each tracked hand (using information like the normal). Then the minimum of those closest points is associated to the corresponding hand and saved in a structure called "Hand Data." Other points that don't meet a minimal distance threshold can be marked as unmatched.

In some implementations, rigid transformations and/or non-rigid transformations can be composed. One example composition implementation includes applying a rigid transformation to predictive information. Then an error indication can be determined, and an error minimization technique such as described herein above can be applied. In an implementation, determining a transformation can include calculating a rotation matrix that provides a reduced RMSD (root mean squared deviation) between two paired sets of points. One implementation can include using Kabsch Algorithm to produce a rotation matrix. The Kabsch algorithm can be used to find an optimal rotation R and translation T that minimizes the error:

$RMS=\text{sqrt}(\Sigma(R^*x_i+T-y_i)^{t^*}(R^*x_i+T-y_i))w_i$

The transformation (both R and T) are applied rigidly to the model, according to one implementation. The capsule matching and rigid alignment can be repeated until convergence. In one implementation, the Kabsch can be extended to ray or co-variances by the following minimizing:

$\Sigma(R^*x_i+T-y_i)^{t^*}M_i^*(R^*x_i+T-y_i)$

In the equation above, $M_i$ is a positive definite symmetric matrix. In other implementations and by way of example, one or more force lines can be determined from one or more portions of a virtual surface.

One implementation applies non-rigidly alignment to the observed by sampling the parameters of each finger. A finger is represented by a 3D vector where the entry of each vector is Pitch, Yaw and Bend of the finger. The Pitch and Yaw can be defined trivially. The bend is the angle between the first and second Capsule and the second and third Capsule which are set to be equal. The mean of the samples weighted by the RMS is taken to be the new finger parameter. After Rigid Alignment all data that has not been assigned to a hand, can be used to initialize a new object (hand or tool).

In another implementation, predictive information can include collision information concerning two or more capsuloids. By means of illustration, several possible fits of predicted information to observed information can be removed from consideration based upon a determination that these potential solutions would result in collisions of capsuloids.

In some implementations, a relationship between neighboring capsuloids, each having one or more attributes (e.g., determined minima and/or maxima of intersection angles between capsuloids) can be determined. In an implementation, determining a relationship between a first capsuloid having a first set of attributes and a second capsuloid having a second set of attributes includes detecting and resolving conflicts between first attribute and second attributes. For example, a conflict can include a capsuloid having one type of angle value with a neighbor having a second type of angle value incompatible with the first type of angle value. Attempts to combine a capsuloid with a neighboring capsuloid having attributes, such that the combination can exceed what is allowed in the observed information or to pair incompatible angles, lengths, shapes, or other such attributes, can be removed from the predicted information without further consideration, according to one implementation.

In one implementation, raw image information and fast lookup table can be used to find a look up region that gives constant time of computation of the closest point on the contour given a position. Fingertip positions are used to compute point(s) on the contour which can be then determined whether the finger is extended or non-extended, according to some implementations. A signed distance function can be used to determine whether points lie outside or inside a hand region, in another implementation. An implementation includes checking to see if points are inside or outside the hand region.

In another implementation, a variety of information types can be abstracted from the 3D solid model of a hand. For example, velocities of a portion of a hand (e.g., velocity of one or more fingers, and a relative motion of a portion of the hand), state (e.g., position, an orientation, and a location of a portion of the hand), pose (e.g., whether one or more fingers are extended or non-extended, one or more angles of bend for one or more fingers, a direction to which one or more fingers point, a configuration indicating a pinch, a grab, an outside pinch, and a pointing finger), and whether a tool or object is present in the hand can be abstracted in various implementations.

Gesture Data Representation

Motion data representing free-form gestures performed using a control object can be stored as data units called frames. Frames include information necessary to capture the dynamic nature of the free-form gestures, referred to as "feature sets." Hands and pointables (fingers and tools) are examples of feature sets of a gesture that are described by features directly related to real attributes of the hands and pointables. For instance, a hand can be described by three dimensional values, like: position of center of hand, normal vector, and direction vector pointing from the center to the end of fingers. Similarly, fingers or tools (which are linger and thinner than fingers) can described by a set of features including a position of tip, pointing direction vector, length, and width.

Figure 1J:
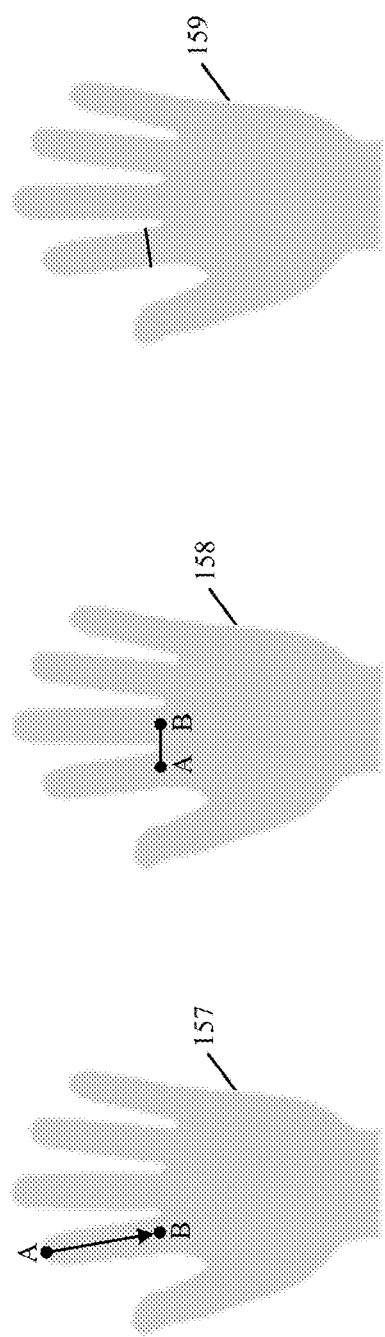
FIG. 1J depicts one implementation of feature sets of a free-form gesture that are described by features directly related to real attributes of a control object.

As illustrated in FIG. 1J, several different features of a hand can be determined such that a first feature set can include numbers of fingers in a frame, Euclidean distances between consecutive finger's tips, and absolute angles between consecutive fingers. In another implementation, a second feature can be the first feature set extended by the distances between consecutive finger tips and the position of the hand's palm. In yet another implementation, a third feature set can include features from the second feature set extended by the five angles between fingers and normal of hand's palm.

In one implementation, distance between two nearest base points of a finger is calculated by multiplying a reversed normalized direction vector designated to a finger base point with the length of the finger. Further, the beginning of this vector is placed in the fingertip position and the end of the vector identifies the finger base point, as shown in silhouette 157. Silhouette 158 is an example of distance between two nearest base points of fingers. Silhouette 159 is an implementation depicting the ration of a finger's thickness to the maximal finger's thickness.

According to an implementation presented as silhouette 160, angles between two nearest fingers are determined by calculating the angle between finger direction vectors of two consecutive fingers. In another implementation, angles between a particular finger and the first finger relative to palm position are calculated using two fingertip positions and a palm position. After this, the line segments between the palm position, fingertip positions, and the searched angle between two finger segments are identified, as shown in silhouette 161.

In some implementations, a feature set can include features encoding the information about the speed of the hand during a free-form gesture. In one implementation, a recorded displacement of the hand in a rectangular or curvilinear coordinate system can be determined. In one implementation, a gesture recognizer module 278 expresses the changing locations of the hand as it traverses a path through a monitored space in Cartesian/(x, y, z) coordinates. According to some implementations, a gestural path of a control object can be entirely defined by its angles in the relative curvilinear coordinates. In one example, if C is a vector representing the control object in the Cartesian coordinate system as C(x, y, z)=(initial point–final point) (x, y, z). Then, transformation to a curvilinear coordinate system can be denoted as C($\rho$, $\theta$, $\varphi$), where $\rho$ represents the radius of a curve, $\theta$ is the azimuth angle of the curve, and $\varphi$ is the inclination angle of the curve.

The gesture recognizer module 278 identifies these coordinates by analyzing the position of the object as captured in a sequence of images. A filtering module receives the Cartesian coordinates, converts the path of the object into a Frenet-Serret space, and filters the path in that space. In one implementation, the filtering module then converts the filtered Frenet-Serret path back into Cartesian coordinates for downstream processing by other programs, applications, modules, or systems.

Frenet-Serret formulas describe the kinematic properties of a particle moving along a continuous, differentiable curve in 3D space. A Frenet-Serret frame is based on a set of orthonormal vectors, which illustrates a path of an object (e.g., a user's hand, a stylus, or any other object) through the monitored space; points are the (x, y, z) locations of the object as identified by the gesture recognizer module 278.

The filtering module attaches a Frenet-Serret frame of reference to a plurality of locations (which can or may not correspond to the points) on the path. The Frenet-Serret frame consists of (i) a tangent unit vector (T) that is tangent to the path (e.g., the vector T points in the direction of motion), (ii) a normal unit vector (N) that is the derivative of T with respect to an arclength parameter of the path divided by its length, and (iii) a binormal unit vector (B) that is the cross-product of T and N. Alternatively, the tangent vector can be determined by normalizing a velocity vector (as explained in greater detail below) if it is known at a given location on the path. These unit vectors T, N, B collectively form the orthonormal basis in 3D space known as a TNB frame or Frenet-Serret frame. The Frenet-Serret frame unit vectors T, N, B at a given location can be calculated based on a minimum of at least one point before and one point after the given location to determine the direction of movement, the tangent vector, and the normal vector. The binormal vector is calculated as the cross-product of the tangent and normal vectors. Any method of converting the path represented by the points to Frenet-Serret frames is within the scope of the technology disclosed.

Once a reference Frenet-Serret frame has been associated with various points along the object's path, the rotation between consecutive frames can be determined using the Frenet-Serret formulas describing curvature and torsion. The total rotation of the Frenet-Serret frame is the combination of the rotations of each of the three Frenet vectors described by the formulas $$\frac{dT}{ds} = \kappa N, \frac{dN}{ds} = -\kappa T + \tau B,$$

and $$\frac{dB}{ds} = -\tau N,$$

where d/ds is the derivative with respect to arclength, κ is the curvature, and τ is the torsion of the curve. The two scalars κ and τ can define the curvature and torsion of a 3D curve, in that the curvature measures how sharply a curve is turning while torsion measures the extent of its twist in 3D space. Alternatively, the curvature and torsion parameters can be calculated directly from the derivative of best-fit curve functions (i.e., velocity) using, for example, the equations $$\kappa = \frac{|\vec{v} \times \vec{a}|}{|\vec{v}|^3}$$

and $$\tau = \frac{(\vec{v} \times \vec{a}) \cdot \vec{a}'}{|\vec{v} \times \vec{a}|^2}.$$

The sequence shown in FIG. 1K is an example representation of gestural data captured for one or more free-form gestures performed using a hand. In the sequence 100K, each line represents a frame and each frame includes a timestamp and hand parameters such as hand id, palm position, stabilized palm position, palm normal, vector, palm direction vector, and detected fingers parameters. Further, the finger parameters include finger id, fingertip position, stabilized tip position, finger direction vector, finger length, and finger width. Again with reference to sequence 100K, underlined text depicts frame timestamp, the bold faced data highlights information about the hand, and the italicized alphanumeric characters identify information about the fingers.

Computer System

Figure 2:
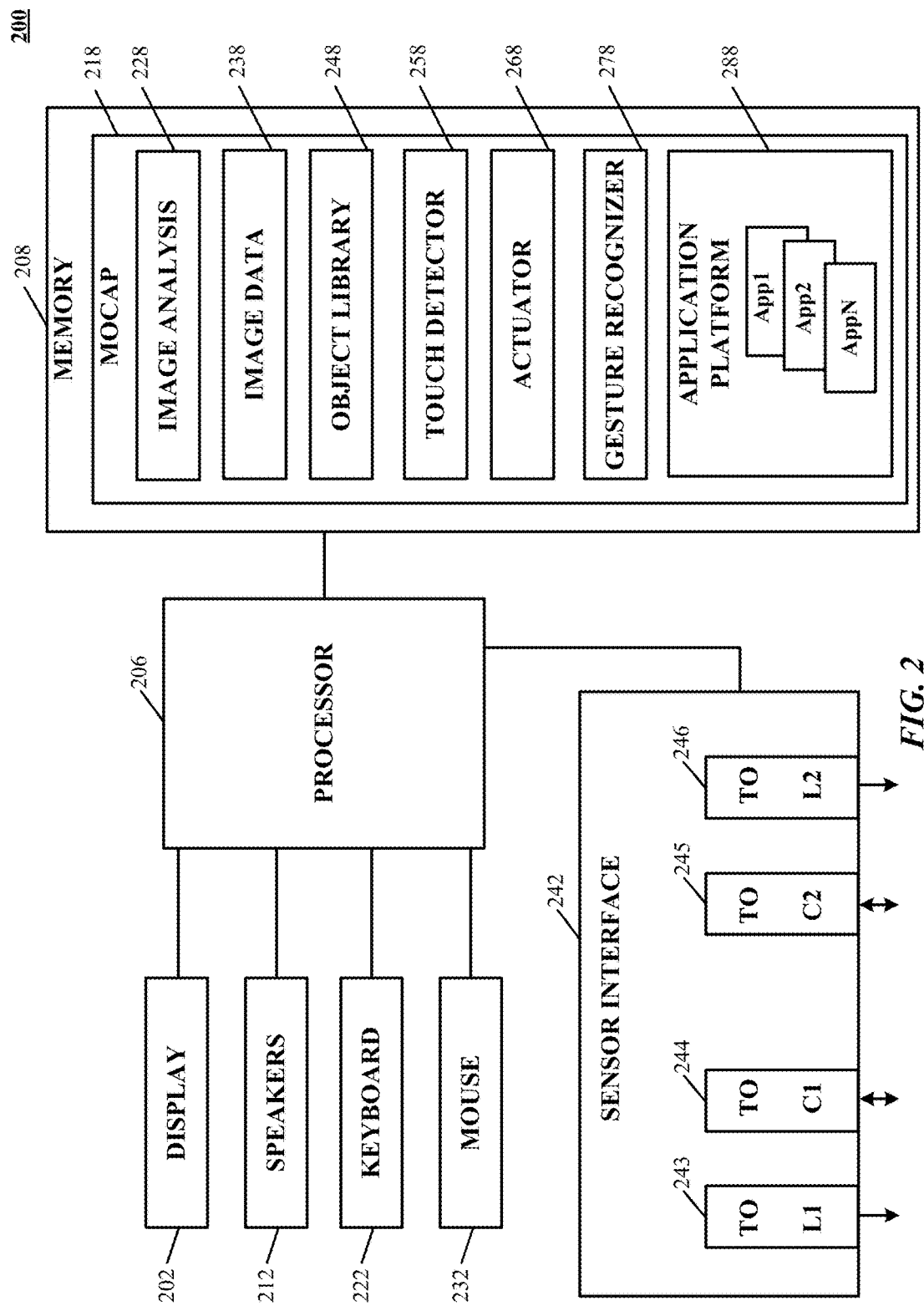
FIG. 2 is a simplified block diagram of a computer system implementing a gesture-recognition apparatus according to an implementation of the technology disclosed.

FIG. 2 is a simplified block diagram of a computer system 200, implementing all or portions of image analysis and motion capture system 106 according to an implementation of the technology disclosed. Image analysis and motion capture system 106 can include or consist of any device or device component that is capable of capturing and processing image data. In some implementations, computer system 200 includes a processor 206, memory 208, a sensor interface 242, a display 202 (or other presentation mechanism(s), e.g. holographic projection systems, wearable googles or other head mounted displays (HMDs), heads up displays (HUDs), other visual presentation mechanisms or combinations thereof, speakers 212, a keyboard 222, and a mouse 232. Memory 208 can be used to store instructions to be executed by processor 206 as well as input and/or output data associated with execution of the instructions. In particular, memory 208 contains instructions, conceptually illustrated as a group of modules described in greater detail below, that control the operation of processor 206 and its interaction with the other hardware components. An operating system directs the execution of low-level, basic system functions such as memory allocation, file management and operation of mass storage devices. The operating system can be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid physical arrangement RAM, solid physical arrangement ROM, and the like. The storage media are typically connected to the system bus through a removable or non-removable memory interface.

According to some implementations, cameras 102, 104 and/or light sources 108, 110 can connect to the computer 200 via a universal serial bus (USB), FireWire, or other cable, or wirelessly via Bluetooth, Wi-Fi, etc. The computer 200 can include a camera interface 242, implemented in hardware (e.g., as part of a USB port) and/or software (e.g., executed by processor 206), that enables communication with the cameras 102, 104 and/or light sources 108, 110. The camera interface 242 can include one or more data ports and associated image buffers for receiving the image frames from the cameras 102, 104; hardware and/or software signal processors to modify the image data (e.g., to reduce noise or reformat data) prior to providing it as input to a motion-capture or other image-processing program; and/or control signal ports for transmit signals to the cameras 102, 104, e.g., to activate or deactivate the cameras, to control camera settings (frame rate, image quality, sensitivity, etc.), or the like.

Processor 206 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Camera and sensor interface 242 can include hardware and/or software that enables communication between computer system 200 and cameras such as cameras 102, 104 shown in FIG. 1, as well as associated light sources such as light sources 108, 110 of FIG. 1. Thus, for example, camera and sensor interface 242 can include one or more data ports 244, 245 to which cameras can be connected, as well as hardware and/or software signal processors to modify data signals received from the cameras (e.g., to reduce noise or reformat data) prior to providing the signals as inputs to a motion-capture ("mocap") program 218 executing on processor 206. In some implementations, camera and sensor interface 242 can also transmit signals to the cameras, e.g., to activate or deactivate the cameras, to control camera settings (frame rate, image quality, sensitivity, etc.), or the like. Such signals can be transmitted, e.g., in response to control signals from processor 206, which can in turn be generated in response to user input or other detected events.

Camera and sensor interface 242 can also include controllers 243, 246, to which light sources (e.g., light sources 108, 110) can be connected. In some implementations, controllers 243, 246 provide operating current to the light sources, e.g., in response to instructions from processor 206 executing mocap program 218. In other implementations, the light sources can draw operating current from an external power supply, and controllers 243, 246 can generate control signals for the light sources, e.g., instructing the light sources to be turned on or off or changing the brightness. In some implementations, a single controller can be used to control multiple light sources.

Instructions defining mocap program 218 are stored in memory 208, and these instructions, when executed, perform motion-capture analysis on images supplied from cameras connected to sensor interface 242. In one implementation, mocap program 218 includes various modules, such as an object detection module 228, an image and/or object and path analysis module 238, and gesture-recognition module 248. Object detection module 228 can analyze images (e.g., images captured via sensor interface 242) to detect edges and/or features of an object therein and/or other information about the object's location. Object and path analysis module 238 can analyze the object information provided by object detection module 228 to determine the 3D position and/or motion of the object (e.g., a user's hand). Examples of operations that can be implemented in code modules of mocap program 218 are described below.

The memory 208 can further store input and/or output data associated with execution of the instructions (including, e.g., input and output image data 238) as well as additional information used by the various software applications; for example, in some implementations, the memory 208 stores an object library 248 of canonical models of various objects of interest. As described below, an object detected in the camera images can be identified by matching its shape to a model in the object library 248, and the model can then inform further image analysis, motion prediction, etc. The memory 208 can include a touch-detection module or "touch detector" 258 that receives tracking data about the object from the image-analysis module 228 (optionally in conjunction with the object library 248), and use that data to determine, for each frame, whether the object touches or pierces the virtual touch plane (or other virtual surface). In some implementations, the virtual surface moves along with, as if tethered to, the object; in this case, the touch-detection module 258 can further compute a representation of the virtual touch plane, i.e., define and/or update the position and orientation of the virtual plane relative to the object (and/or the screen) before determining whether the object touches or pierces the virtual plane. In addition, the memory 208 can include an activation/actuation-detection module or actuator 268 that can, based on tracking data from the image-analysis module 228, determine whether a control displayed on the screen is actuated by a particular recognizable motion of an object and/or the presence and/or the motion of a second detected object. Further, the memory can include a gesture-recognition module or "gesture recognizer" 278, which allows the user to remotely manipulate the actuated control based on motions performed by the object (s), such as a finger, a hand, a thumb, a stylus, or other pointer, portions of any of the forgoing, and/or combinations thereof.

The memory 208 can further store input and/or output data associated with execution of the instructions (including, e.g., input and output image data 238) as well as additional information used by the various software applications. In addition, the memory 208 can also include other information and/or code modules used by mocap program 218 such as an application platform 288, which allows a user to interact with the mocap program 218 using different applications like application 1 (App1), application 2 (App2), and application N (AppN).

Display 202, speakers 212, keyboard 222, and mouse 232 can be used to facilitate user interaction with computer system 200. In some implementations, results of motion capture using sensor interface 242 and mocap program 218 can be interpreted as user input. For example, a user can perform hand gestures that are analyzed using mocap program 218, and the results of this analysis can be interpreted as an instruction to some other program executing on processor 206 (e.g., a web browser, word processor, or other application). Thus, by way of illustration, a user might use upward or downward swiping gestures to "scroll" a webpage currently displayed on display 202, to use rotating gestures to increase or decrease the volume of audio output from speakers 212, and so on.

It will be appreciated that computer system 200 is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, heads up displays (HUDs) for vehicles, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

In another example, in some implementations, the cameras 102, 104 are connected to or integrated with a special-purpose processing unit that, in turn, communicates with a general-purpose computer, e.g., via direct memory access ("DMA"). The processing unit can include one or more image buffers for storing the image data read out from the camera sensors, a GPU or other processor and associated memory implementing at least part of the motion-capture algorithm, and a DMA controller. The processing unit can provide processed images or other data derived from the camera images to the computer for further processing. In some implementations, the processing unit sends display control signals generated based on the captured motion (e.g., of a user's hand) to the computer, and the computer uses these control signals to adjust the on-screen display of documents and images that are otherwise unrelated to the camera images (e.g., text documents or maps) by, for example, shifting or rotating the images.

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 1 and 2, the user performs a gesture that is captured by the cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by the mocap 218, which provides input to an electronic device, allowing a user to remotely control the electronic device and/or manipulate virtual objects, such as prototypes/models, blocks, spheres, or other shapes, buttons, levers, or other controls, in a virtual environment displayed on display 202. The user can perform the gesture using any part of her body, such as a finger, a hand, or an arm. As part of gesture recognition or independently, the image analysis and motion capture system 106 can determine the shapes and positions of the user's hand in 3D space and in real time; see, e.g., U.S. Ser. Nos. 61/587,554, 13/414,485, 61/724,091, and Ser. No. 13/724,357 filed on Jan. 17, 2012, Mar. 7, 2012, Nov. 8, 2012, and Dec. 21, 2012 respectively, the entire disclosures of which are hereby incorporated by reference. As a result, the image analysis and motion capture system processor 206 may not only recognize gestures for purposes of providing input to the electronic device, but can also capture the position and shape of the user's hand in consecutive video images in order to characterize the hand gesture in 3D space and reproduce it on the display screen 202.

In one implementation, the mocap 218 compares the detected gesture to a library of gestures electronically stored as records in a database, which is implemented in the image analysis and motion capture system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently. Typically, the trajectory of a sensed gesture is mathematically compared against the stored trajectories to find a best match, and the gesture is recognized as corresponding to the located database entry only if the degree of match exceeds a threshold. The vector can be scaled so that, for example, large and small arcs traced by a user's hand will be recognized as the same gesture (i.e., corresponding to the same database record) but the gesture recognition module will return both the identity and a value, reflecting the scaling, for the gesture. The scale can correspond to an actual gesture distance traversed in performance of the gesture, or can be normalized to some canonical distance.

In various implementations, the motion captured in a series of camera images is used to compute a corresponding series of output images for presentation on the display 202. For example, camera images of a moving hand can be translated by the processor 206 into a wire-frame or other graphical representations of motion of the hand. In any case, the output images can be stored in the form of pixel data in a frame buffer, which can, but need not be, implemented, in main memory 208. A video display controller reads out the frame buffer to generate a data stream and associated control signals to output the images to the display 202. The video display controller can be provided along with the processor 206 and memory 208 on-board the motherboard of the computer 200, and can be integrated with the processor 206 or implemented as a co-processor that manipulates a separate video memory.

In some implementations, the computer 200 is equipped with a separate graphics or video card that aids with generating the feed of output images for the display 202. The video card generally includes a graphical processing unit ("GPU") and video memory, and is useful, in particular, for complex and computationally expensive image processing and rendering. The graphics card can implement the frame buffer and the functionality of the video display controller (and the on-board video display controller can be disabled). In general, the image-processing and motion-capture functionality of the system 200 can be distributed between the GPU and the main processor 206.

In some implementations, the gesture-recognition module 278 detects more than one gesture. The user can perform an arm-waving gesture while flexing his or her fingers. The gesture-recognition module 278 detects the waving and flexing gestures and records a waving trajectory and five flexing trajectories for the five fingers. Each trajectory can be converted into a vector along, for example, six Euler degrees of freedom in Euler space. The vector with the largest magnitude can represent the dominant component of the motion (e.g., waving in this case) and the rest of vectors can be ignored. In one implementation, a vector filter that can be implemented using conventional filtering techniques is applied to the multiple vectors to filter the small vectors out and identify the dominant vector. This process can be repetitive, iterating until one vector—the dominant component of the motion—is identified. In some implementations, a new filter is generated every time new gestures are detected.

If the gesture-recognition module 278 is implemented as part of a specific application (such as a game or controller logic for a television), the database gesture record can also contain an input parameter corresponding to the gesture (which can be scaled using the scaling value); in generic systems where the gesture-recognition module 278 is implemented as a utility available to multiple applications, this application-specific parameter is omitted: when an application invokes the gesture-recognition module 278, it interprets the identified gesture according in accordance with its own programming.

In one implementation, the gesture-recognition module 278 breaks up and classifies one or more gestures into a plurality of gesture primitives. Each gesture can include or correspond to the path traversed by an object, such as user's hand or any other object (e.g., an implement such as a pen or paintbrush that the user holds), through 3D space. The path of the gesture can be captured by the cameras 102, 104 in conjunction with mocap 218, and represented in the memory 208 as a set of coordinate (x, y, z) points that lie on the path, as a set of vectors, as a set of specified curves, lines, shapes, or by any other coordinate system or data structure. Any method for representing a 3D path of a gesture on a computer system is within the scope of the technology disclosed.

Of course, the system 100 under control need not be a desktop computer. FIG. 1C-In other implementations, free-space gestures can be used to operate a handheld tablet or smart phone. The tablet can be connected, e.g., via a USB cable (or any other wired or wireless connection), to a motion-capture device (such as for example, a dual-camera motion controller as provided by Leap Motion, Inc., San Francisco, Calif. or other interfacing mechanisms and/or combinations thereof) that is positioned and oriented so as to monitor a region where hand motions normally take place. For example, the motion-capture device can be placed onto a desk or other working surface, and the tablet can be held at an angle to that working surface to facilitate easy viewing of the displayed content. The tablet can be propped up on a tablet stand or against a wall or other suitable vertical surface to free up the second hand, facilitating two-hand gestures. In a modified tablet implementation, the motion-capture device can be integrated into the frame of the tablet or smart phone.

Referring to FIG. 3A, components or controls displayed on a user-interface 342 of an electronic device and/or a computing application can be manipulated based on the presence of one or more objects 302, 304, 306 (such as a user's finger 302, stylus 304, hand 306 or other pointer) and/or motion of the object(s) relative to a virtual touch plane 322. In one implementation, the position and/or orientation of one of the objects is tracked and mapped to a screen location, where a cursor 332 or 334 or any other interface element such as projection 336 representing the detected object (hereafter both referred to as a "cursor") is then displayed. The virtual touch plane 322 can be computationally defined based on the position and/or orientation of the object and/or the screen, depending, e.g., on the user's preference. Typically, the virtual touch plane 322 is located at a certain distance, e.g., 3-4 mm, in front of the object and follows the movement of the object such that the user is not required to interact with the user-interface at a specific location. Referring to FIG. 3B, upon detecting that the object touches or comes in contact with at least a portion of the virtual plane (i.e., the actual spatial position of the object coincides with the computationally defined spatial position of the virtual plane) at 312, 314, or 316, the object then operates in an "tentative selection" mode with the user-interface, i.e., a projection of the object is reflected on the displayed screen, which is responsive to the motion of the control object. Determination of the virtual touch plane and suitable algorithms for determining when the object touches the virtual touch plane are described in more detail in U.S. patent application Ser. No. 14/154,730, filed 20 Feb. 2014, which is hereby incorporated herein by reference in its entirety.

Free-Space Gestural Interpretation

FIGS. 3A-3C depict controls displayed on a user-interface manipulated 300A, 300B, 300C by one or more objects in accordance with various implementations of the technology disclosed. In various implementations, once the object touches the virtual plane, the location thereon of the virtual touch is determined and mapped to the screen display. For example, the defined virtual touch plane can have a size corresponding to a matrix of M×N pixels and the display screen can have X×Y pixels. When the object touches a pixel (m, n) in a middle portion of the virtual plane (thereby actuating the engaged mode) is detected, the cursor is displayed on the corresponding middle portion, pixel (m/M× X, n/N×Y), of the screen. In one implementation, the virtual control (e.g., a button 358, a rotatable knob 368, or a movable slider 366) that is closest, for example, to the virtual touch on the display screen 342 (in this case, the pressable button 358) can tentatively selected—i.e., the selection can still be changed and the function corresponding to the control is not yet activated. The selected control can be identified on the display screen using, e.g., a visual boundary 359 that surrounds the selected control, an increased brightness, and/or a color distinct from the background color and colors of unselected objects. In some implementations, the tentative selection is indicated by changing the shape, color or brightness of the cursor 356 pointing thereto.

Because the selection is transient, which display control is selected can change based on the movement of the object. The displayed cursor 356 and the selection of any of the controls can continuously follow the motion of the object. Referring to FIG. 3C, for example, when the user makes a hand-waving gesture 316 that results in an horizontal displacement by a pixels and a vertical displacement by b pixels in the virtual plane 322, the relative horizontal and vertical hand movements are set as a/M and b/N, respectively, for scaling purposes. In response to the hand-waving gesture, the cursor 332 displayed on the screen 342 can be moved (p, q) pixels, where p and q are determined as p=a/M×X, q=b/N×Y, respectively, in the simplest case. As a result, the displayed controls 368, 366 located on the path of movement can be sequentially selected and unselected on the screen 342 as the hand moves first towards and then away from each of them. The scaling relationship between the object's actual motion and the resulting movement taking place on the display screen 342 can be determined using other approaches. For example, the cursor displacement of (p, q) pixels can be the quantities that multiply a and b, respectively, by a constant that results in an essentially affine mapping from virtual plane 322 to the rendered image. This constant can be adjusted to amplify or decrease the responsiveness of on-screen movement. In some implementations, relationships more complex than a constant can be employed to scale between virtual touch plane and display, to enable changing of the relationship around the periphery of the work area/screen or in various portions of the work area/screen, i.e., greater accuracy toward the center, or any side, in a selectable zone, or the like.

The displayed control can be selected and manipulated by multi-part gestures. In one implementation, the displayed control is selected based on motion of the control object. For the sake of brevity, this disclosure often refers to the "control object" simply as the "object." For example, to select a movable slider displayed on the screen, the object can be required to touch the virtual plane at any place and subsequently perform a specific action (e.g., a swipe movement 316). Alternatively, the selection of the virtual control can be determined based on a combination of the location of the virtual touch and motion of the object. In one implementation, the object touches the virtual plane 322 and moves therein so as to move the cursor 356 displayed on the screen 342 to a place proximate to a control (e.g., a rotatable knob 368); the object then performs a second movement (e.g., a swirl movement) to select the rotatable knob 368. Performing a specific motion (e.g., a swipe 402 or a swirl 422) thus allows the object to operatively communicate with the displayed control associated with the performed motion. Employing a specific movement of the object, in addition to its locational proximity, can provide greater accuracy in selecting a desired control displayed on the screen 342 using the object.

Figure 4A:
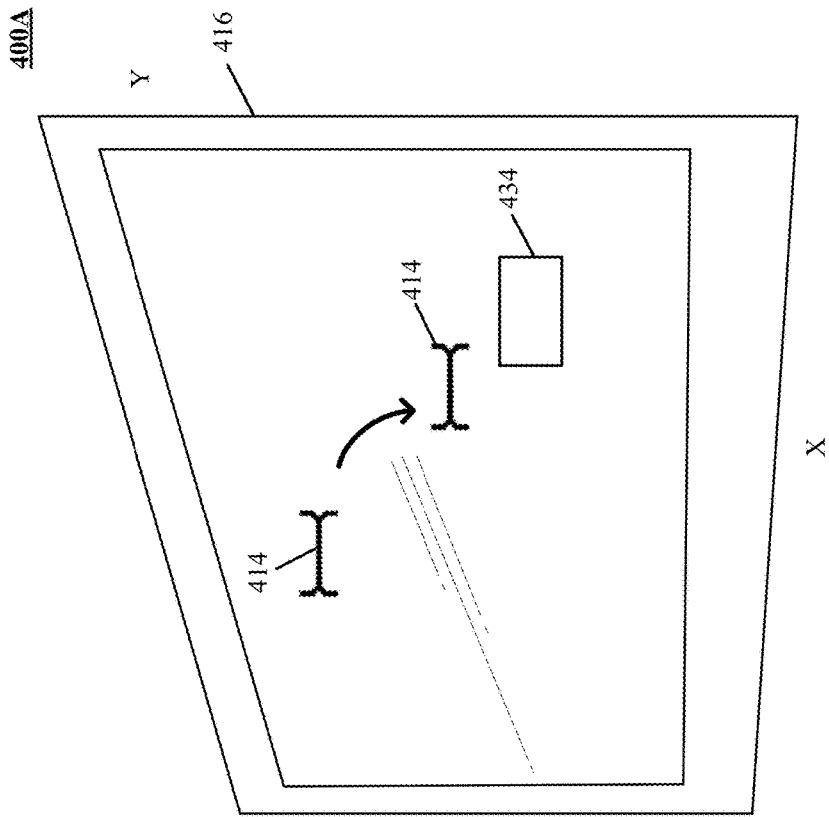
FIG. 4A depicts a user-interface control displayed on a screen manipulated by a single object.
Figure 4A:
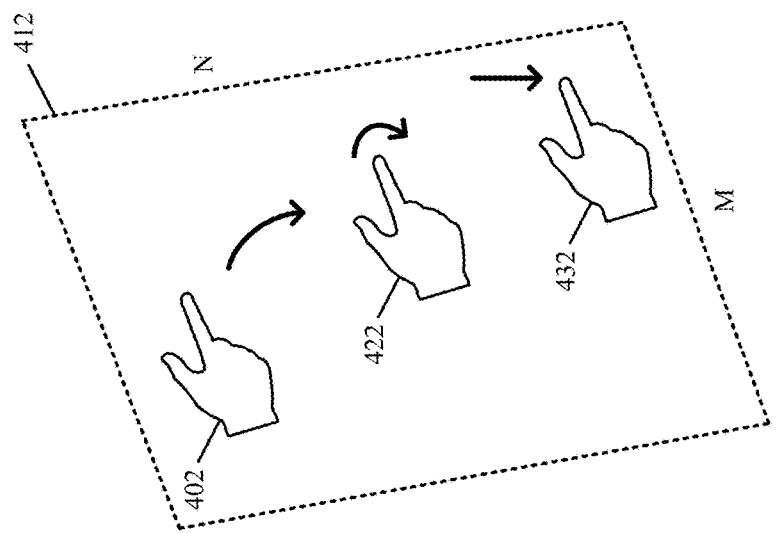

FIG. 4A depicts a user-interface control displayed on a screen manipulated 400A by a single object in accordance with an implementation of the technology disclosed. In some implementations, the selection of the displayed controls is "locked in" and the control is actuated upon detection of a particular recognizable motion of the object. (Note that while a control is "activated" when it is locked in, i.e., put in an active state in which it can be operated via subsequent movements of the object, it is "actuated" when it is actually operated. Thus, a control cannot be actuated before its activation.) Referring to FIG. 4A, the object 402 can first move the displayed cursor 414 to a location proximate to a displayed virtual control of interest (e.g., a toggle switch) 434, thereby temporarily selecting it. The object 402 then performs a distinct action to lock in the selection and actuate the control 434 in accordance with its function. For example, a user's finger can first hover over a toggle switch control 434 to tentatively select the control; a subsequent finger swipe can then be used to move the switch. Similarly, the finger can first perform a touch gesture to select a button control and then perform a second swipe gesture 432 to indicate a pressing of the button. This approach thus provides the user with a means to accurately select and operate the virtual controls 434 in real time without touching the display 416.

Figure 4B:
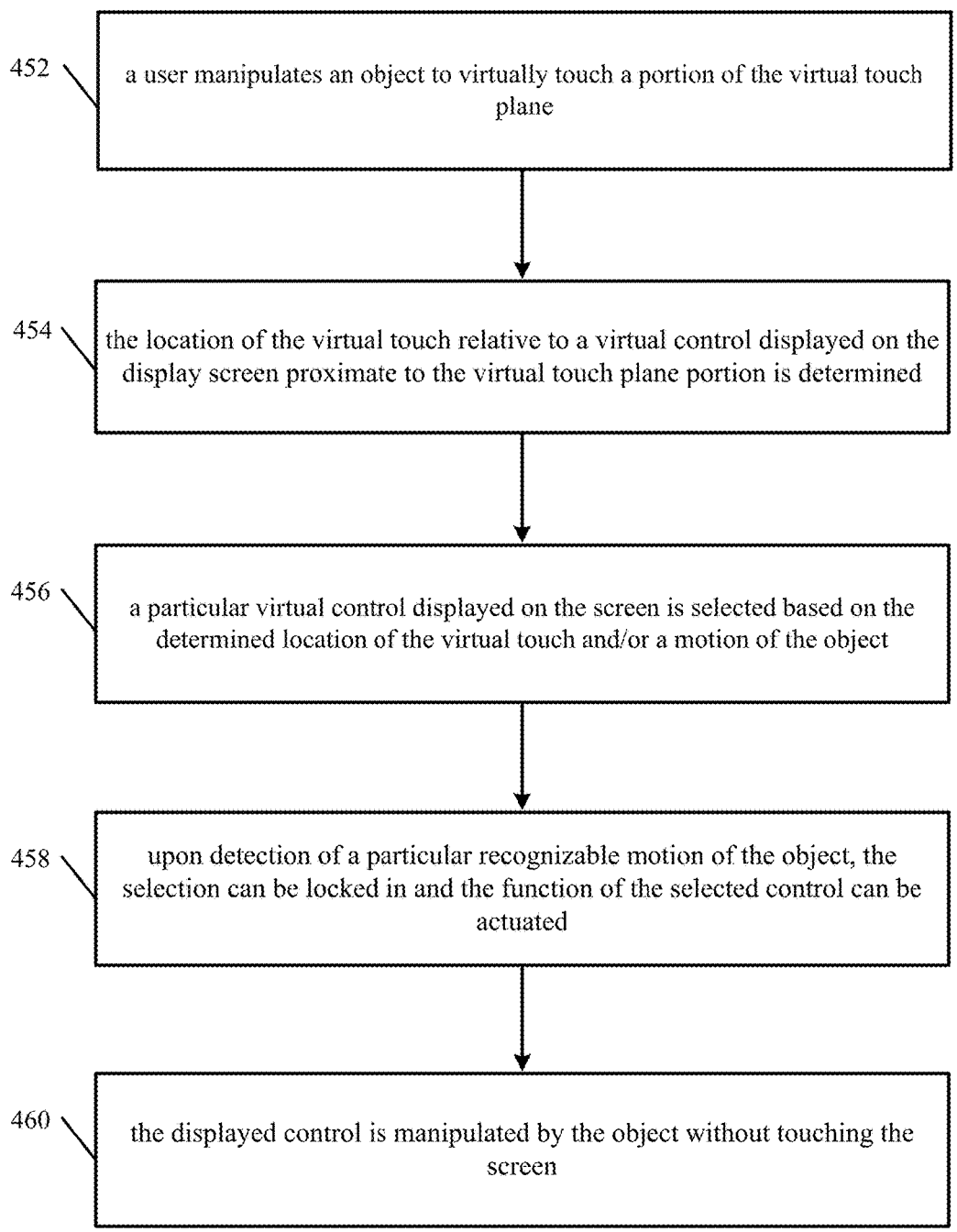
FIG. 4B illustrates an example method of interacting with display controls based on the presence and/or movements of a single object without touching the display in accordance with an implementation of the technology disclosed.

A representative method 400A for interacting with displayed controls based on the presence and/or movements of the object without touching the display is shown in FIG. 4B. FIG. 4B shows an example interaction with a virtual touch plane, in which the user manipulates an object to virtually touch a portion of the virtual touch plane (action 452). The location of the virtual touch relative to a virtual control displayed on the display screen proximate to the virtual touch plane portion is determined (action 454). A particular virtual control displayed on the screen is selected based on the determined location of the virtual touch and/or a motion of the object (action 456); this selection can be temporary— i.e., the selection can change with the motion of the object. Upon detection of a particular recognizable motion of the object, the selection can be locked in and the function of the selected control can be activated (action 458). As a result, the displayed control can then be manipulated by the object without touching the screen (action 460). Alternatively, for simple controls such as, e.g., switches, the recognizable motion of the object can by itself actuate, i.e., operate, the control (rather than merely turning it into an active state in which it is responsive to additional movements). Additionally, in some implementations, upon a second particular recognizable motion of the object, the selection can be unlocked and/or the control be deactivated; the second motion can be the same motion as that used to lock in the selection in the first place, or a different motion. Upon this de-selection, movements of the object once again result in tentative selections of controls. Alternatively, the control can be deactivated by disengagement of the object from the virtual touch plane (as accomplished, e.g., by rapidly pulling the object away from the plane). In this case, movements of the object do not affect any selection (even tentatively) until the object pierces the virtual touch plane again.

Figure 5A:
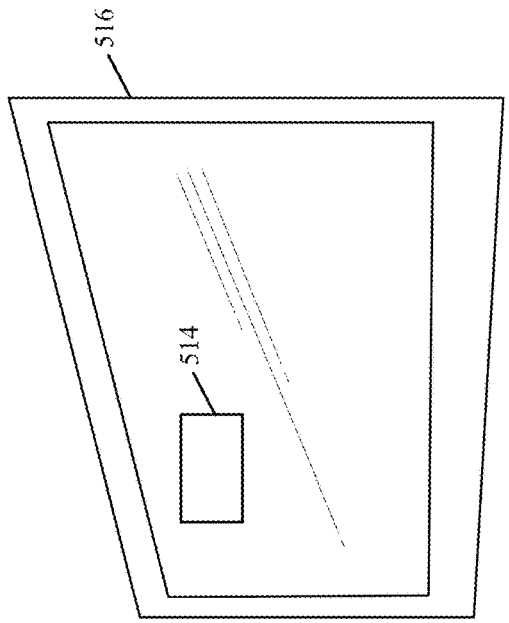
FIG. 5A depicts a user-interface control displayed on a screen manipulated by two objects.
Figure 5A:
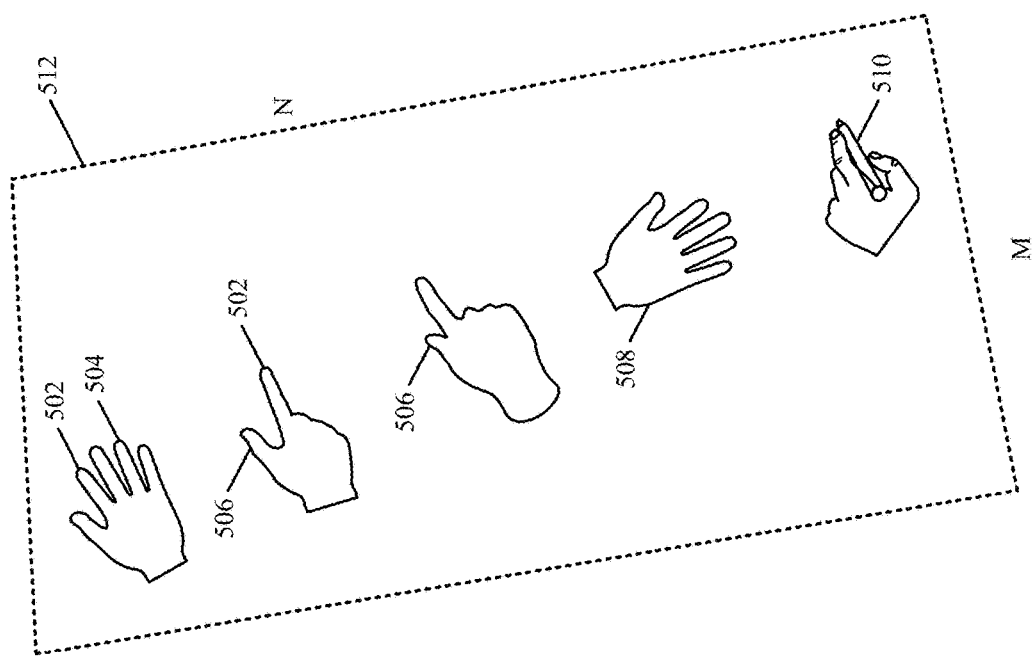

FIG. 5A depicts a user-interface control displayed on a screen manipulated 500A by two objects in accordance with an implementation of the technology disclosed. Referring to FIG. 5A, in one implementation, the presence and/or motion of a second object (e.g., a second finger 504, a thumb 506, a second hand 508, or a second stylus 510) locks in the control 512 selected by the object and activates the function thereof. As a result, the manipulation of the selected control 512 can be achieved by either one of the objects, or both. For example, a user's index finger 502 can be used to tentatively select the control 512, e.g., a scroll bar, and the presence of a thumb 506 can activate the function of the scroll bar such that the scroll bar can move with the movement of the index finger 502 and/or the thumb 506. The "presence" of the second object can herein be defined as the presence within a fixed spatial region, e.g., anywhere within the camera field of view. Alternatively, the "presence" of the second object can be defined spatially relative to the first object; for instance, in some implementations, the second object is deemed "present" if and only if it is within a certain distance from the first object, or even only if it touches the first object. Thus, selection of a screen control with index finger and thumb can be accomplished when the index finger points at the control and the thumb simultaneously touches the index finger. The touch between thumb and index finger in effect functions like clicking on an object in conventional user interfaces. In the context of user interface manipulations based on engagement with a virtual plane (as detected, e.g., using 3D motion tracking as described above), such a "thumb click" can, advantageously, be easier to recognize during image processing than a more traditional (although virtual) clicking action that involves quick forward and backward motions relative to the virtual touch plane.

Still referring to FIG. 5A, in another implementation, the selected control 514 is locked in and, at the same time, actuated by motion of the second object. For example, a scroll wheel can first be selected by being pointed at using the first object, i.e., the index finger 502; the scroll wheel can then be rotated in accordance with thumb motions relative to the index finger 502, whereas the index finger's motion may not turn the wheel. Additional examples of using a second object to manipulate the control 514 after selection thereof by, say, the index finger, include the following: the squeezing of a thumb 506 against the index finger can perform a click on a pressable button, thereby actuating the button; a swipe of the hand 508 can move a movable slider and thereby actuate the slider; and the swirl of a second finger 504 can manipulate operations (e.g., rotation) of a rotatable knob. In some implementations, operations of the controls displayed on the screen can be actuated and manipulated by a combination of the presence and the motion of the second object. Again, these approaches allow the user to accurately select and operate the virtual controls in real time without touching the display. It should be noted that the technology disclosed is not limited to the implementations as described above, but rather the intention is that additions and modifications to what is expressly described herein are also included within the scope of the technology disclosed.

Figure 5B:
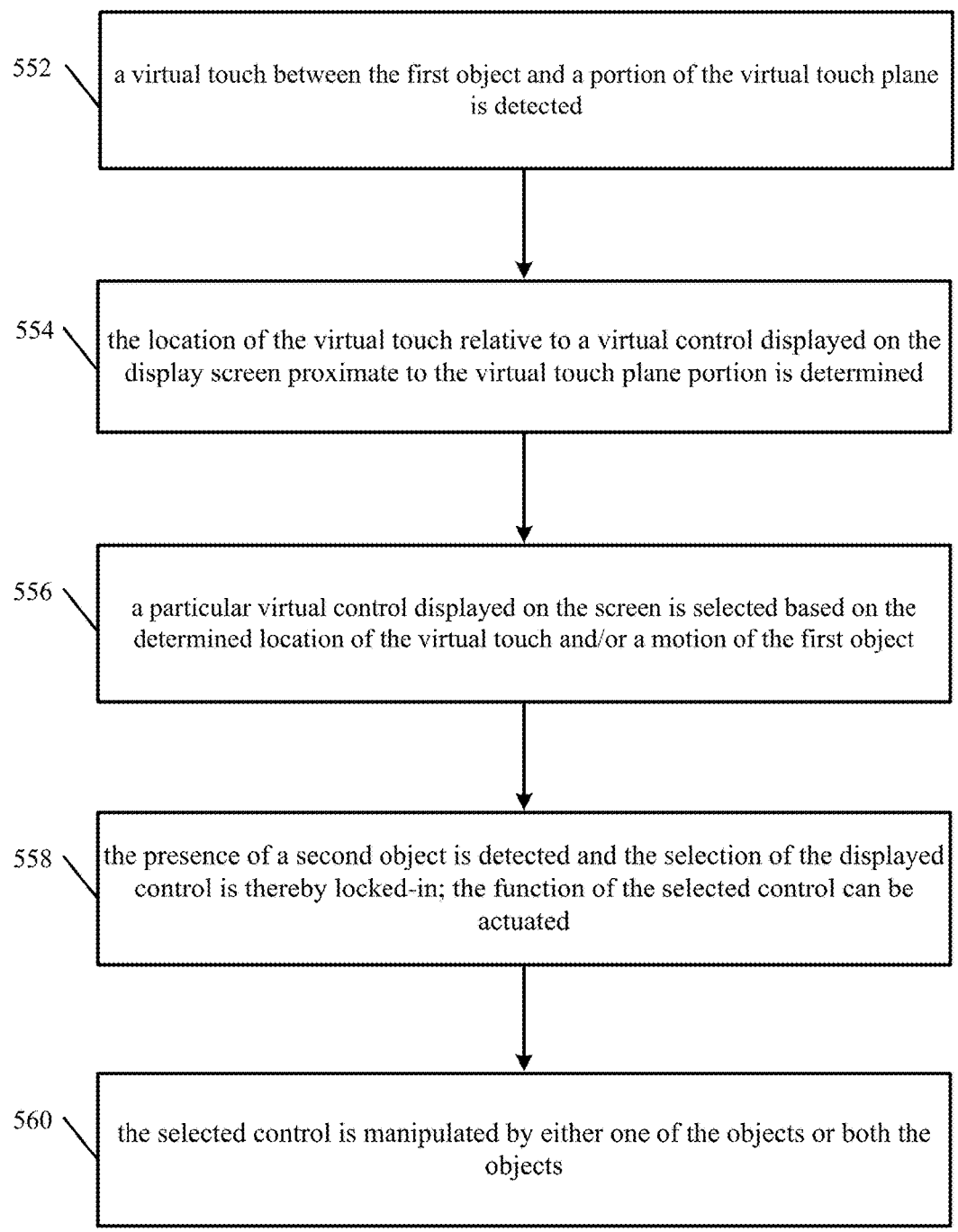
FIG. 5B illustrates an example method of interacting with display controls based on the presence and/or movements of two objects without touching the display in accordance with an implementation of the technology disclosed.

A representative method 500B for interacting with display controls based on the presence and/or movements of two objects without touching the display is shown in FIG. 5B. In an example method illustrated by FIG. 5B, a virtual touch between the first object and a portion of the virtual touch plane is detected (action 552). The location of the virtual touch relative to a virtual control displayed on the display screen proximate to the virtual touch plane portion is determined (action 554). A particular virtual control displayed on the screen is selected based on the determined location of the virtual touch and/or a motion of the first object (action 556); again, this selection can be tentative or temporary—i.e., the selection can still change with motion of the first object. After this, the presence of a second object is detected and the selection of the displayed control is thereby locked in (action 558). In addition, the function of the selected control can be activated. As a result, the selected control can be manipulated by either one of the objects or both (action 560).

Referring again to FIGS. 2, 4A, and 5A, in various implementations, the gesture-recognition module 278 is responsive to the activation/actuation-detection module 268 and evaluates movement of the object(s) that are detected within the field of view—i.e., once a displayed control is activated, the gesture-recognition module 278 recognizes movements of the object(s) through a series of temporally sequential images captured by the light-capturing device(s). The detected movements then facilitate control over the actuated control displayed on the user-interface. For example, the gesture-recognition module 278 can first convert the detected movements to vectors, i.e., mathematically specified spatial trajectories, and mathematically compare the trajectory of movements against a library of movement trajectories electronically stored in the memory 208, processor 206, or an external storage system to identify the movement of the object(s). As used herein, the term "electronically stored" includes storage in volatile or non-volatile storage, the latter including disks, Flash memory, etc., and extends to any computationally addressable storage media including, for example, optical storage. Electronically stored does not include transitive waveforms or radio waves. In one implementation, the movement is recognized as corresponding to the located database entry only if the degree of similarity exceeds a threshold. The library of movement trajectories can also contain input parameters associated with the stored movements. As a result, when the sensed movements of the object(s) are identified, the input parameters corresponding to the identified movements can be utilized to manipulate the activated control.

Augmented Reality

Augmented reality (AR) generation system 106 includes a number of components for generating AR environments such as 700B, 900B, and 1000B of FIGS. 7, 9, and 10 respectively. The first component is a camera such as cameras 102 or 104 or other video input to generate a digitized video image of the real world or user-interaction region. The camera can be any digital device that is dimensioned and configured to capture still or motion pictures of the real world and to convert those images to a digital stream of information that can be manipulated by a computer. For example, cameras 102 or 104 can be digital still cameras, digital video cameras, web cams, head-mounted displays, phone cameras, tablet personal computers, ultra-mobile personal computers, and the like.

The second component is a transparent, partially transparent, or semi-transparent user interface, referred to as a "virtual modality." Examples of a virtual modality include display 202 (embedded in a user computing device like a wearable goggle 904 or a smartphone like 903) that combines rendered 3D virtual imagery with a view of the real world, so that both are visible at the same time to a user. In some implementations, the rendered 3D virtual imagery can projected using holographic, laser, stereoscopic, auto-stereoscopic, or volumetric 3D displays.

FIGS. 7, 9, and 10 shows examples of rendered 3D virtual imagery that is superimposed, as free-floating virtual modalities 724, 926, and 1008, in the real world physical environments depicted in FIGS. 7, 9, and 10. Virtual modalities 724, 926, and 1008 can include virtual counterparts of traditional interface elements or controls such as a widget, toggle, cursor, sliders, scroll bars, virtual joysticks, and oppositional buttons (up/down, left/right, plus/minus, next/previous, etc.) In some implementations, the Virtual modalities 724, 926, and 1008 can be created on the fly or can be retrieved from a repository.

FIGS. 7, 9, and 10 illustrate different implementations of an AR environment created by instantiation of free-floating virtual modalities 724, 926, and 1008 in a real world physical space. In one implementation, computer-generated imagery, presented as free-floating virtual modalities 724, 926, and 1008, can be rendered in front of a user as reflections using real-time rendering techniques such as orthographic or perspective projection, clipping, screen mapping, rasterizing and transformed into the field of view or current view space of a live camera embedded in a video projector, holographic projection system, smartphone 903, wearable goggle 904 or other head mounted display (HMD), or heads up display (HUD). In some other implementations, transforming models into the current view space can be accomplished using sensor output from onboard sensors. For example, gyroscopes, magnetometers and other motion sensors can provide angular displacements, angular rates and magnetic readings with respect to a reference coordinate frame, and that data can be used by a real-time onboard rendering engine to generate 3D imagery of virtual items 716, 718, 720, 916, 920, 924, 1010, 1014, or 1016. If the user physically moves a user computing device, resulting in a change of view of the embedded camera, the virtual modalities 724, 926, and 1008 and computer-generated imagery can be updated accordingly using the sensor data.

In some implementations, virtual modalities 724, 926, and 1008 can include a variety of information from a variety of local or network information sources. Some examples of information include specifications, directions, recipes, data sheets, images, video clips, audio files, schemas, user interface elements, thumbnails, text, references or links, telephone numbers, blog or journal entries, notes, part numbers, dictionary definitions, catalog data, serial numbers, order forms, marketing or advertising, icons associated with objects managed by an OS, and any other information that may be useful to a user. Some examples of information resources include local databases or cache memory, network databases, Websites, online technical libraries, other devices, or any other information resource that can be accessed by user computing devices either locally or remotely through a communication link.

Virtual items 716, 718, 720, 916, 920, 924, 1010, 1014, or 1016 can include text, images, or references to other information (e.g., links). In one implementation, interactive virtual items 716, 718, 720, 916, 920, 924, 1010, 1014, or 1016 can be displayed proximate to their corresponding real-world objects. In another implementation, interactive virtual items 716, 718, 720, 916, 920, 924, 1010, 1014, or 1016 can describe or otherwise provide useful information about the objects to a user.

Some other implementations include the interactive virtual items representing other and/or different real world products such as furniture (chairs, couches, tables, etc.), kitchen appliances (stoves, refrigerators, dishwashers, etc.), office appliances (copy machines, fax machines, computers), consumer and business electronic devices (telephones, scanners, etc.), furnishings (pictures, wall hangings, sculpture, knick knacks, plants), fixtures (chandeliers and the like), cabinetry, shelving, floor coverings (tile, wood, carpets, rugs), wall coverings, paint colors, surface textures, countertops (laminate, granite, synthetic countertops), electrical and telecommunication jacks, audio-visual equipment, speakers, hardware (hinges, locks, door pulls, door knobs, etc.), exterior siding, decking, windows, shutters, shingles, banisters, newels, hand rails, stair steps, landscaping plants (trees, shrubs, etc.), and the like, and qualities of all of these (e.g. color, texture, finish, etc.).

Virtual modalities 724, 926, and 1008 can generate for display virtual items 716, 718, 720, 916, 920, 924, 1010, 1014, or 1016 automatically or in response to trigger events. In other implementations, virtual modality 724, 926, and 1008 can be generated using a series of unique real world markers. The markers can be of any design, including a circular, linear, matrix, variable bit length matrix, multi-level matrix, black/white (binary), gray scale patterns, and combinations thereof. The markers can be two-dimensional or three-dimensional. The markers can be two- or three-dimensional barcodes, or two- or three-dimensional renderings of real world, three-dimensional objects. For example, the markers can be thumbnail images of the virtual images that are matched to the markers. The marker can also be an image of a real world item which the software has been programmed to recognize. So, for example, the software can be programmed to recognize a real-world object or other item. The software then superimposes interactive virtual items 716, 718, 720, 916, 920, 924, 1010, 1014, or 1016 in place of the real world object. Each unique real world marker corresponds to at least one interactive virtual item such as 716, 718, 720, 916, 920, 924, 1010, 1014, or 1016, or a quality of the interactive virtual item (e.g. the object's color, texture, opacity, adhesiveness, etc.) or both the interactive virtual item itself and all (or a subset) of the qualities of the interactive virtual item.

The AR generation system 106 further uses an AR library that serves as an image repository or database of interactive virtual items, a computer 200 that can selectively search and access the library, and a display 202 (embedded within a smartphone 902 or a virtual reality headset 904) or a projector, which are dimensioned and configured to display the real world digital image captured by the camera, as well as interactive virtual items retrieved from the AR library. In some implementations, computer 200 includes a search and return engine that links each unique real world marker to a corresponding interactive virtual item in the AR library.

In operation, the camera returns a digital video stream of the real world, including images of one or more of the markers described previously. Image samples are taken from the video stream and passed to the computer 200 for processing. The search and return engine then searches the AR library for the interactive virtual items that correspond to the marker images contained in the digital video stream of the real world. Once a match is made between a real world marker contained in the digital video stream and the AR library, the AR library returns one or more interactive virtual items, their qualities, and their orientation to the display 202 of one of the user computing devices. The interactive virtual items are then superimposed upon the real world image. After this, the interactive virtual items are placed into the real world image registration with its corresponding marker. In other implementations, multiple markers can be used to position and orient a single interactive virtual item. For example, nine unique markers could be used to construct the interface elements 716, 718, 720, 916, 920, 924, 1010, 1014, and 1016. In yet other implementations, a "markerless" AR experience can be generated by identifying features of the surrounding real-world physical environment via sensors such as gyroscopes, accelerometers, compasses, and GPS data such as coordinates.

Projected AR allows users to simultaneously view the real word physical space and the interactive virtual items (superimposed in the space. In one implementation, these interactive virtual items can be projected on to the real word physical space using micro-projectors embedded in wearable goggle 904 or other head mounted display (HMD) that cast a perspective view of a stereoscopic 3D imagery onto the real world space. In such an implementation, a camera, in-between the micro-projectors can scan for infrared identification markers placed in the real world space. The camera can use these markers to precisely track the user's head position and orientation in the real word physical space, according to another implementation. Yet another implementation includes using retro-reflectors in the real word physical space to prevent scattering of light emitted by the micro-projectors and to provision multi-user participation by maintaining distinct and private user views. In such an implementation, multiple users can simultaneously interact with the same virtual modality, such that they both view the same virtual objects and manipulations to virtual objects by one user are seen by the other user.

In other implementations, projected AR obviates the need of using wearable hardware such as goggles and other hardware like displays to create an AR experience. In such implementations, a video projector, volumetric display device, holographic projector, and/or heads-up display can be used to create a "glasses-free" AR environment. See e.g., holographic chip projectors available from Ostendo, a company headquartered in Carlsbad, Calif. In one implementation, such projectors can be electronically coupled to user computing devices such as smartphones 904 or a laptop and configured to produce and magnify virtual items that are perceived as being overlaid on the real word physical space.

The third component is a control and image-processing system 106, which captures a series of sequentially temporal images of a region of interest. It further identifies any gestures performed in the region of interest and controls responsiveness of the rendered 3D virtual imagery to the performed gestures by updating the 3D virtual imagery based on the corresponding gestures.

These free-space gestures allow a user to manipulate the computer-generated virtual objects superimposed in the real world space. In one implementation, the user can move his or her hand underneath a virtual object to scoop it up in the palm of their hand and move the virtual object from one location to another. In another implementation, the user can use a tool to enhance the graphics of the virtual object. In yet another implementation, manipulations can be based on physical-simulated virtual forces (e.g., virtual gravity, virtual electromagnetism, virtual impulses, virtual friction, virtual charisma, virtual stacking (placing virtual objects inside one another), etc.) enabling interactions with virtual objects over distances. For example, a "gravity grab" interaction in an astronomy genre gaming engine or physics teaching implementations includes emulating the force of gravity by selecting a function in which the strength is proportional to a "virtual mass" of the virtual object but declines with the square of the distance between the hand and the virtual object. In implementations employing strength to emulate virtual properties of objects, virtual flexibility/rigidity enable interactions with virtual objects emulating one type of material to have different interactions than virtual objects emulating another type of material. For example, a virtual steel sphere can behave differently to a "squeeze" gesture than a virtual rubber sphere. Virtual properties (e.g., virtual mass, virtual distance, virtual flexibility/rigidity, etc.) and virtual forces (e.g., virtual gravity, virtual electromagnetism, virtual charisma, etc.), like virtual objects, can be created (i.e., having no analog in the physical world) or modeled (i.e., having an analog in the physical world). Normal vectors or gradients can be used in some other implementations. In yet other implementations, the virtual objects can be rendered around the user's hand such that the computer-generated imagery moves in conjunction with and synchronously with the performance of the gestures.

Figure 6A:
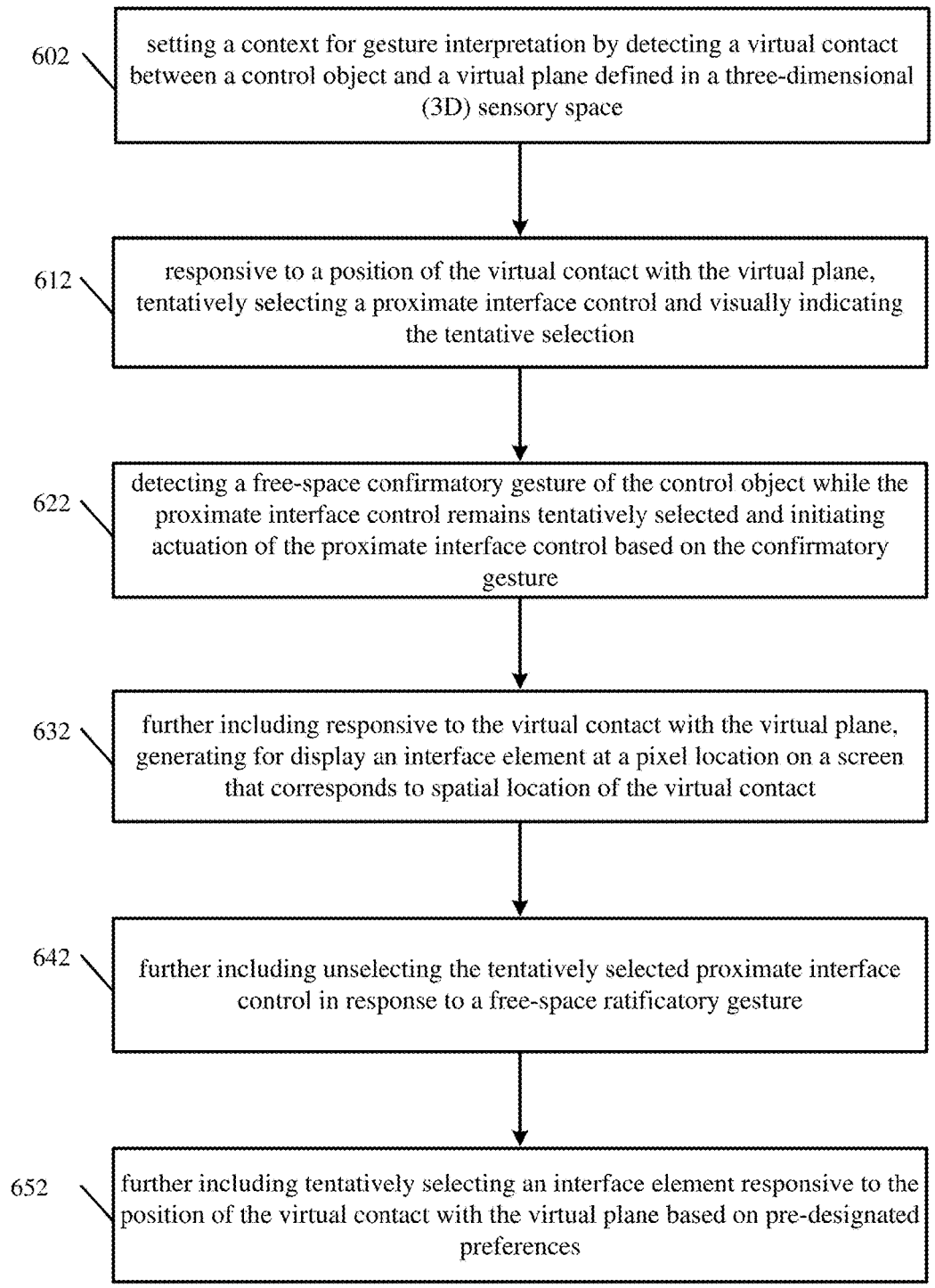
FIGS. 6A-6B are one implementation of interpreting free-space gestures.
Figure 6B:
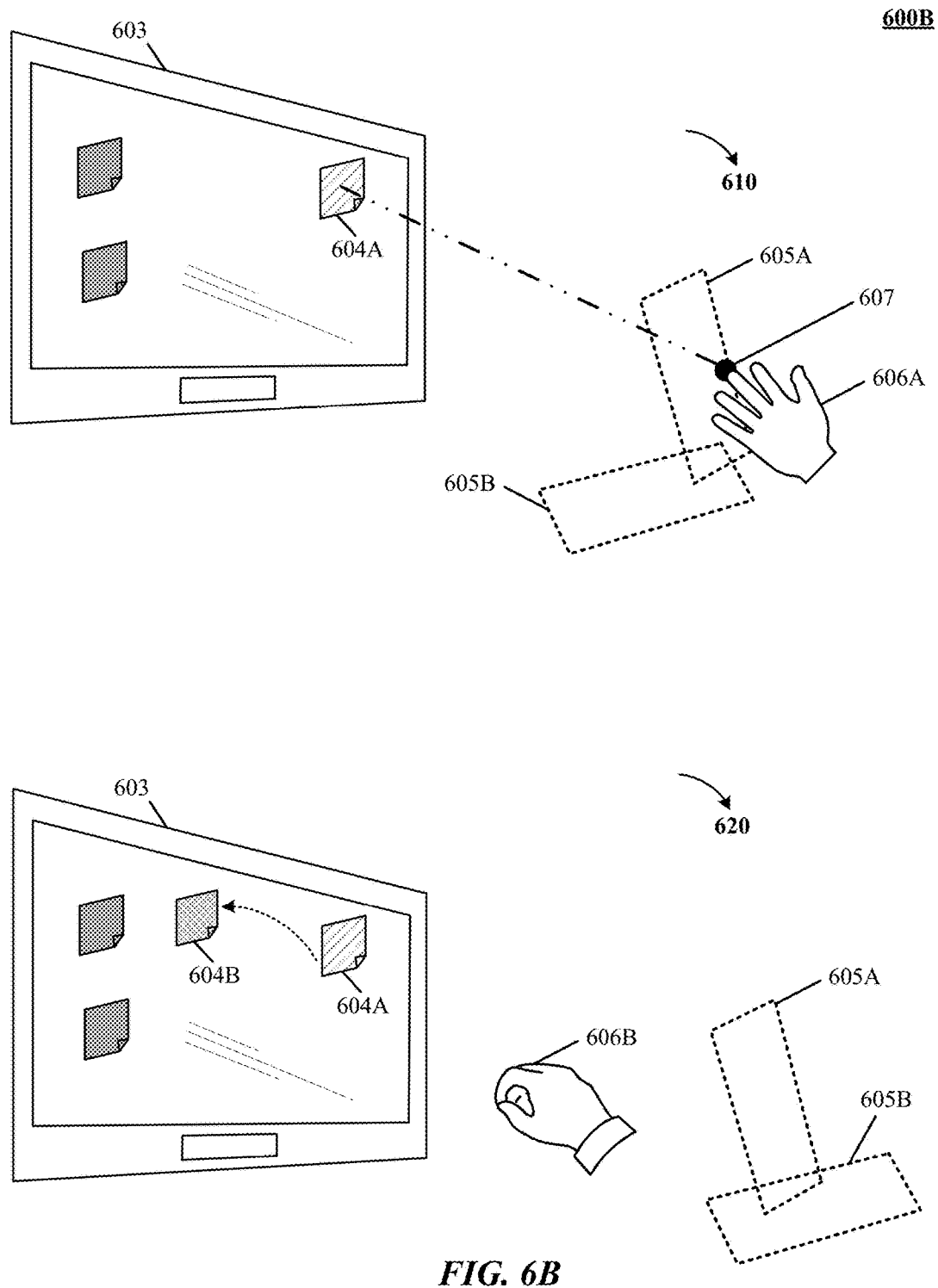

FIGS. 6A-6B are one implementation of interpreting free-space gestures. Flowchart 600A can be implemented at least partially with a database system, e.g., by one or more processors configured to receive or retrieve information, process the information, store results, and transmit the results. Other implementations may perform the actions in different orders and/or with different, varying, alternative, modified, fewer or additional actions than those illustrated in FIG. 6A. Multiple actions can be combined in some implementations. For convenience, this flowchart is described with reference to the system that carries out a method. The system is not necessarily part of the method.

At action 602, a context is set for gesture interpretation by detecting a virtual contact 607 between a control object 606A and a virtual plane 605 defined in a three-dimensional (3D) sensory space 600B. In one implementation, the virtual plane 605 is oriented vertically 605A in the 3D sensory space 600B. In another implementation, the virtual plane 605 is oriented horizontally 605B in the 3D sensory space 600B.

At action 612, responsive to a position of the virtual contact 607 with the virtual plane 605, a proximate interface control 604A (virtual slip) is tentatively selected, at action 610 and the tentative selection is visually indicated. Examples of other interface controls include a real-world or virtual widget, toggle, cursor, sliders, scroll bars, virtual joysticks, and oppositional buttons (up/down, left/right, plus/minus, next/previous, etc.). In one implementation, tentatively selecting the proximate interface control responsive to the position of the virtual contact with the virtual plane further includes selecting a particular interface control positioned at a normal from a point of the virtual contact to a screen that includes the particular interface control.

At action 622, a free-space confirmatory gesture 606B (curling of fingers and/or thumb) of the control object 606 is detected while the proximate interface control 604A remains tentatively selected and actuation of the proximate interface control is initiated based on the confirmatory gesture 606B. In the example shown in FIG. 6B, the virtual slip 604 moves from an initial position 604A to 604B in response to the curling of fingers 606B, at action 620. In one implementation, the free-space confirmatory gesture is specific to the tentatively selected proximate interface control. Examples of confirmatory gesture include raising an arm, or making different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact. In other implementations, a point and grasp gesture can be used to move a cursor on a display of a device. In yet other implementations, a confirmatory gesture can be a grip-and-extend-again motion of two fingers of a hand, grip-and-extend-again motion of a finger of a hand, holding a first finger down and extending a second finger, a flick of a whole hand, flick of one of individual fingers or thumb of a hand, flick of a set of bunched fingers or bunched fingers and thumb of a hand, horizontal sweep, vertical sweep, diagonal sweep, a flat hand with thumb parallel to fingers, closed, half-open, pinched, curled, fisted, mime gun, okay sign, thumbs-up, ILY sign, one-finger point, two-finger point, thumb point, pinkie point, flat-hand hovering (supine/prone), bunged-fingers hovering, or swirling or circular sweep of one or more fingers and/or thumb and/arm.

At action 632, responsive to the virtual contact with the virtual plane, an interface control is generated for display 603 at a pixel location on a screen that corresponds to spatial location of the virtual contact. In one implementation, the display 603 can be a traditional screen or a virtual screen.

At action 642, the tentatively selected proximate interface control is unselected in response to a free-space ratificatory gesture. In one implementation, the free-space ratificatory gesture is specific to the tentatively selected proximate interface control. In another implementation, the free-space ratificatory gesture represents another virtual contact between the control object and the virtual plane that is directionally opposite to the virtual contact that caused tentative selection of the proximate interface control. For instance, the tentative selection can result a forward intersection of the control object with the virtual plane, whereas the unselecting is caused by a backward intersection of the virtual plane.

Examples of ratificatory gesture include raising an arm, or making different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact. In other implementations, a point and grasp gesture can be used to move a cursor on a display of a device. In yet other implementations, a ratificatory gesture can be a grip-and-extend-again motion of two fingers of a hand, grip-and-extend-again motion of a finger of a hand, holding a first finger down and extending a second finger, a flick of a whole hand, flick of one of individual fingers or thumb of a hand, flick of a set of bunched fingers or bunched fingers and thumb of a hand, horizontal sweep, vertical sweep, diagonal sweep, a flat hand with thumb parallel to fingers, closed, half-open, pinched, curled, fisted, mime gun, okay sign, thumbs-up, ILY sign, one-finger point, two-finger point, thumb point, pinkie point, flat-hand hovering (supine/prone), bunged-fingers hovering, or swirling or circular sweep of one or more fingers and/or thumb and/arm.

At action 652, an interface control is tentatively selected responsive to the position of the virtual contact with the virtual plane based on pre-designated preferences. In one example, the pre-designated preferences can include a user or performer of a free-space gesture or a handler of the control object specifying which interface control should be selected, actuated, manipulated, and/or activated in response to free-space gestures, along with the degree of actuation, manipulation and/or activation. For instance, the user can specify that an extreme left interface control should be selected for a particular free-space gesture, or a particular interface control should be selected in response to a particular free-space gesture. In other examples, the user can set selection and actuation of multiple interface controls or automatic setting of values for the one or interface control based on specific free-space gestures.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application such as gesture-recognition system, 3D solid hand model, gesture data representation, computer system, free-space gesture interpretation, augmented reality, etc.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 7A:
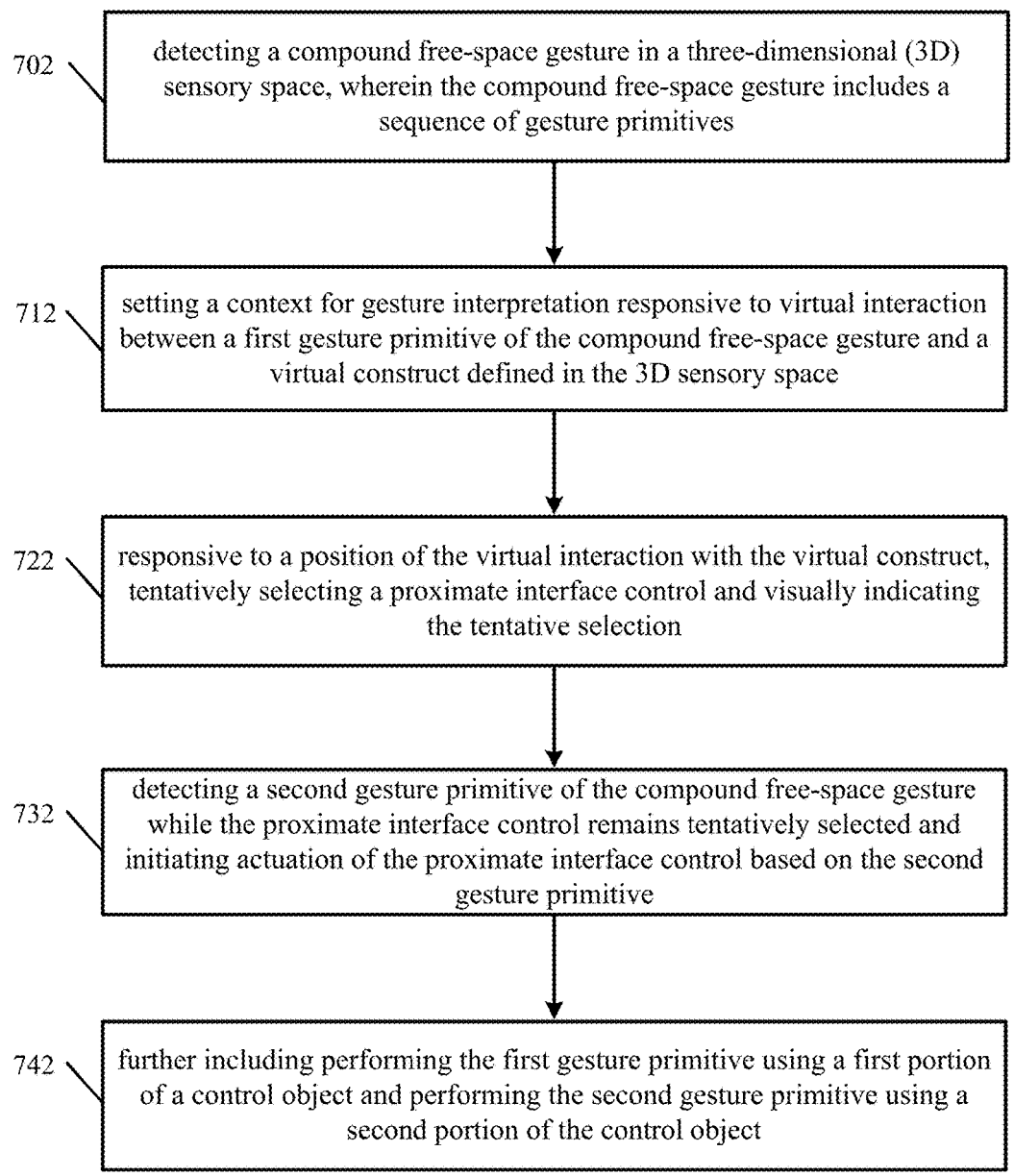
FIGS. 7A-7B depict one implementation of disambiguating among input commands generated by free-space gestures.
Figure 7B:
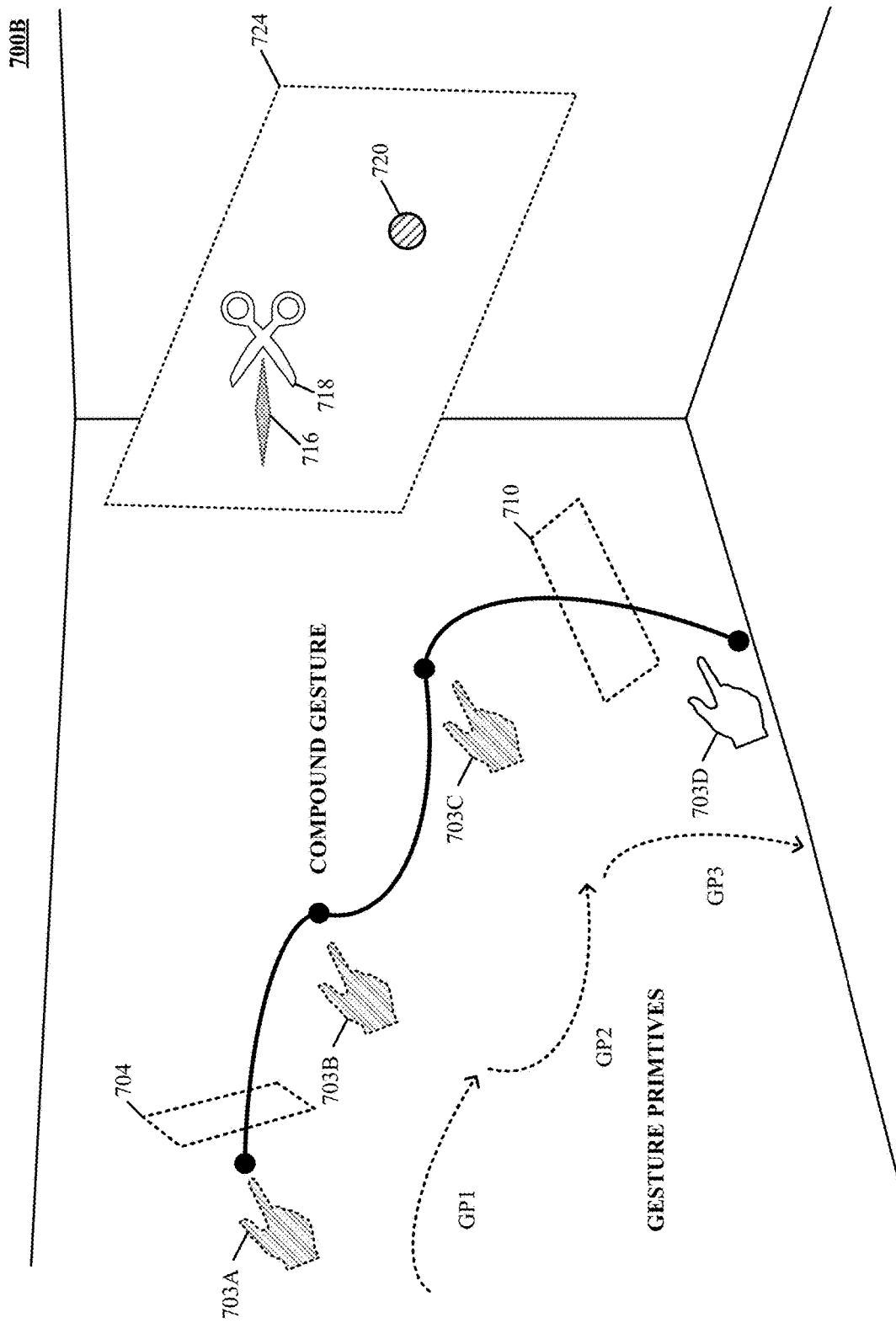

FIGS. 7A-7B depict one implementation of disambiguating among input commands generated by free-space gestures. Flowchart 700A can be implemented at least partially with a database system, e.g., by one or more processors configured to receive or retrieve information, process the information, store results, and transmit the results. Other implementations may perform the actions in different orders and/or with different, varying, alternative, modified, fewer or additional actions than those illustrated in FIG. 7A. Multiple actions can be combined in some implementations. For convenience, this flowchart is described with reference to the system that carries out a method. The system is not necessarily part of the method.

At action 702, a compound free-space gesture 703 is detected in a three-dimensional (3D) sensory space 700B, which includes a sequence of gesture primitives 703A, 703B, 703C, and 703D. Gesture primitives are gesture components rather than complete gestures. Each gesture can include or correspond to the path traversed by the control object making the compound free-space gesture 703, such as user's hand or any other object (e.g., such as a pen or paintbrush that the user holds), through 3D space 700B. The path of the gesture primitives can be captured by the cameras 102, 104 in conjunction with mocap 218, and represented in the memory 208 as a set of coordinate (x, y, z) points that lie on the path, as a set of vectors, as a set of specified curves, lines, shapes, or by any other coordinate system or data structure. Any method for representing a 3D path of a gesture on a computer system is within the scope of the technology disclosed.

Each gesture primitive 703A, 703B, 703C, 703D can be a curve, such as an arc, parabola, elliptic curve, or any other type of algebraic or other curve. The primitives can be two-dimensional curves and/or three-dimensional curves. In one implementation, a gesture-primitive module includes a library of gesture primitives and/or parameters describing gesture primitives. The gesture-recognition module 278 can search, query, or otherwise access the gesture primitives by applying one or more parameters (e.g., curve size, shape, and/or orientation) of the detected path (or segment thereof) to the gesture-primitives module, which can respond with one or more closest-matching gesture primitives.

At action 712, a context is set for gesture interpretation responsive to virtual interaction 703A between a first gesture primitive GP1 of the compound free-space gesture 703 and a vertical virtual construct 704 defined in the 3D sensory space 700B.

At action 722, responsive to a position of the virtual interaction 703A with the virtual construct 704, a proximate interface control such as a virtual scissor 718 or a knob or puck 720 is tentatively selected and a visual indication of the tentative selection is generated for display.

At action 732, a second gesture primitive GP2 of the compound free-space gesture 703 is detected while the proximate interface control remains tentatively selected and an actuation of the proximate interface control is initiated based on the second gesture primitive. In the example shown in FIG. 7B, the actuation can be the virtual scissor 718 cutting the virtual paper 716 or the knob 720 moving. In one implementation, a downward gesture primitive GP3 interacts 703D with a horizontal virtual construct 710 to cause an actuation of the interface controls on the display 724. In one implementation, the display 724 can be a traditional screen or a virtual screen. In some implementations, affine mapping is produced between the gesture primitives 703A, 703B, 703C, 703D and resulting actuation of the proximate interface control by applying a scaling function that automatically proportions responsiveness of the proximate interface control to the gesture primitives 703A, 703B, 703C, 703D.

At action 742, in some implementations, the first gesture primitive is performed using a first portion of a control object such as index-finger of a right hand and the second gesture primitive is performed using a second portion of the control object such as a thumb of the same right hand.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 8B:
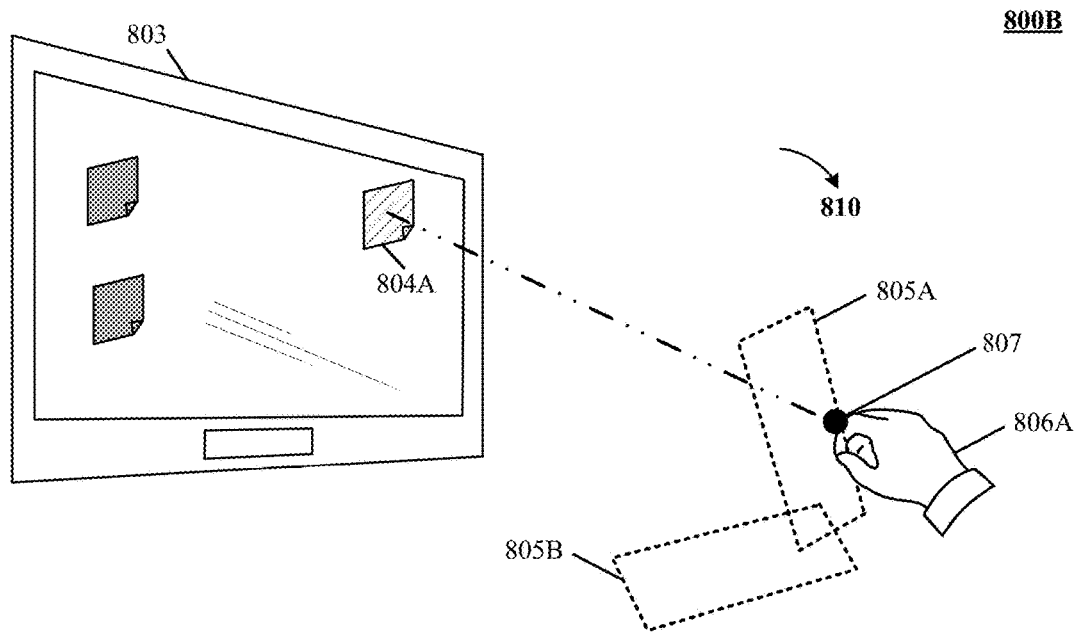
Figure 8B:
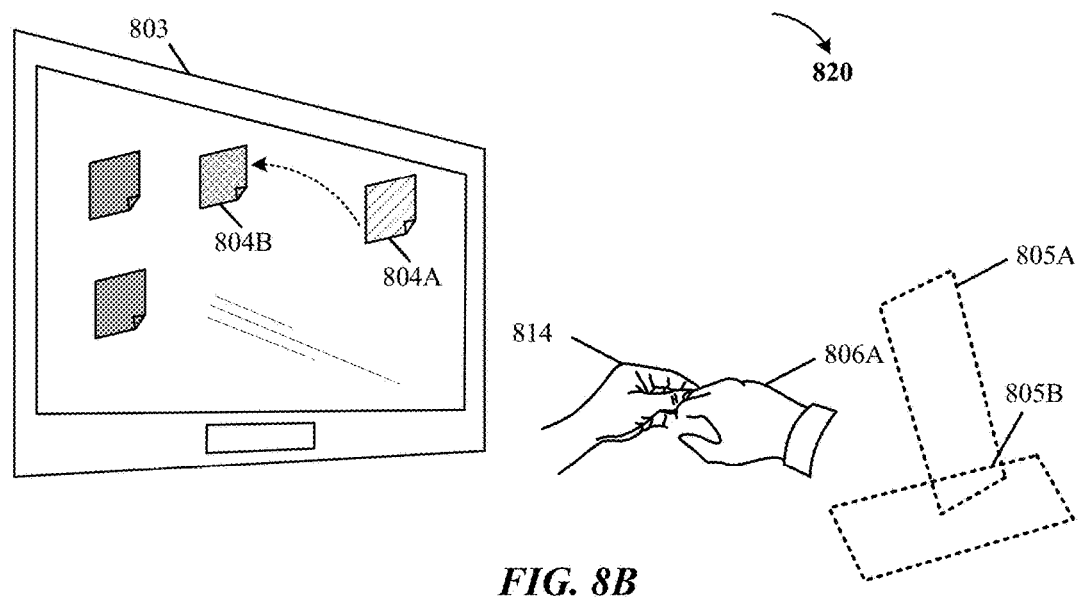

FIGS. 8A-8B shows one implementation of preventing false selections during free-space gestural interactions in a three-dimensional (3D) sensory space. Flowchart 800A can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 8A. Multiple actions can be combined in some implementations. For convenience, this flowchart is described with reference to the system that carries out a method. The system is not necessarily part of the method.

At action 802, a context is set for gesture interpretation by detecting a virtual contact 807 between a first control object 806A and a virtual plane 805 defined in a three-dimensional (3D) sensory space 800B. In one implementation, the virtual plane 805 is oriented vertically 805A in the 3D sensory space 800B. In another implementation, the virtual plane 805 is oriented horizontally 805B in the 3D sensory space 800B. In the example shown in FIG. 8B, the first control object is a right hand.

At action 812, responsive to a position of the virtual contact 807 with the virtual plane 805, a proximate interface control 804A (virtual slip) is tentatively selected, at action 810 and the tentative selection is visually indicated. Examples of other interface controls include a real-world or virtual widget, toggle, cursor, sliders, scroll bars, virtual joysticks, and oppositional buttons (up/down, left/right, plus/minus, next/previous, etc.). In one implementation, tentatively selecting the proximate interface control responsive to the position of the virtual contact with the virtual plane further includes selecting a particular interface control positioned at a normal from a point of the virtual contact to a screen that includes the particular interface control.

At action 822, a free-space confirmatory gesture (curling of fingers and/or thumb) of a second control object 814 is detected while the proximate interface control 804A remains tentatively selected and actuation of the proximate interface control is initiated based on the confirmatory gesture. In the example shown in FIG. 8B, the second control object 814 is a left hand and the confirmatory gesture is pinching of the right hand fingers by the left hand fingers. Further in the example shown in FIG. 8B, the virtual slip 804 moves from an initial position 804A to 804B in response to the pinching, at action 820. In one implementation, the free-space confirmatory gesture is specific to the tentatively selected proximate interface control. Examples of confirmatory gesture include raising an arm, or making different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact. In other implementations, a point and grasp gesture can be used to move a cursor on a display of a device. In yet other implementations, a confirmatory gesture can be a grip-and-extend-again motion of two fingers of a hand, grip-and-extend-again motion of a finger of a hand, holding a first finger down and extending a second finger, a flick of a whole hand, flick of one of individual fingers or thumb of a hand, flick of a set of bunched fingers or bunched fingers and thumb of a hand, horizontal sweep, vertical sweep, diagonal sweep, a flat hand with thumb parallel to fingers, closed, half-open, pinched, curled, fisted, mime gun, okay sign, thumbs-up, ILY sign, one-finger point, two-finger point, thumb point, pinkie point, flat-hand hovering (supine/prone), bunged-fingers hovering, or swirling or circular sweep of one or more fingers and/or thumb and/arm.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 9A:
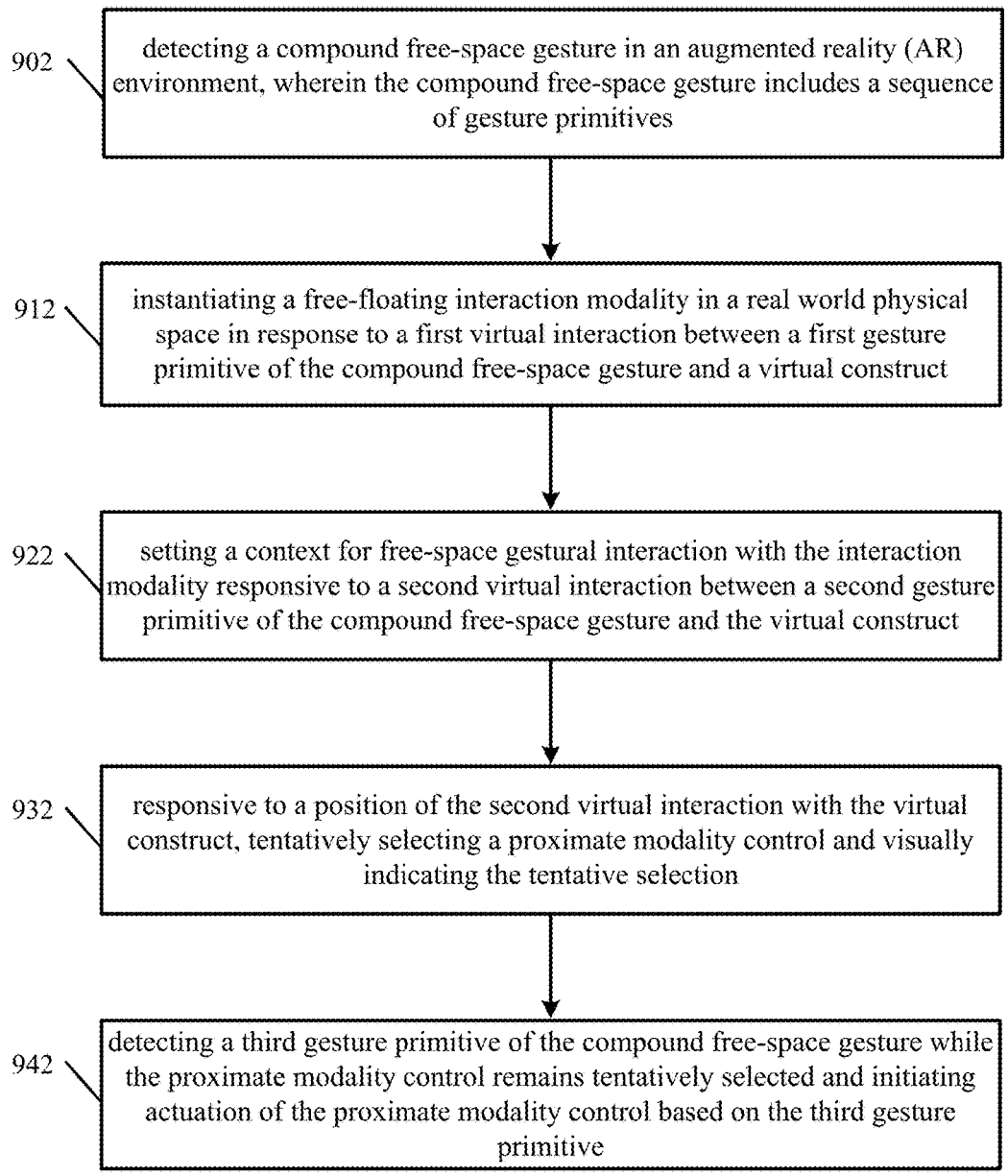
FIGS. 9A-9B illustrate one implementation of interpreting free-space gestures in an augmented reality environment.
Figure 9B:
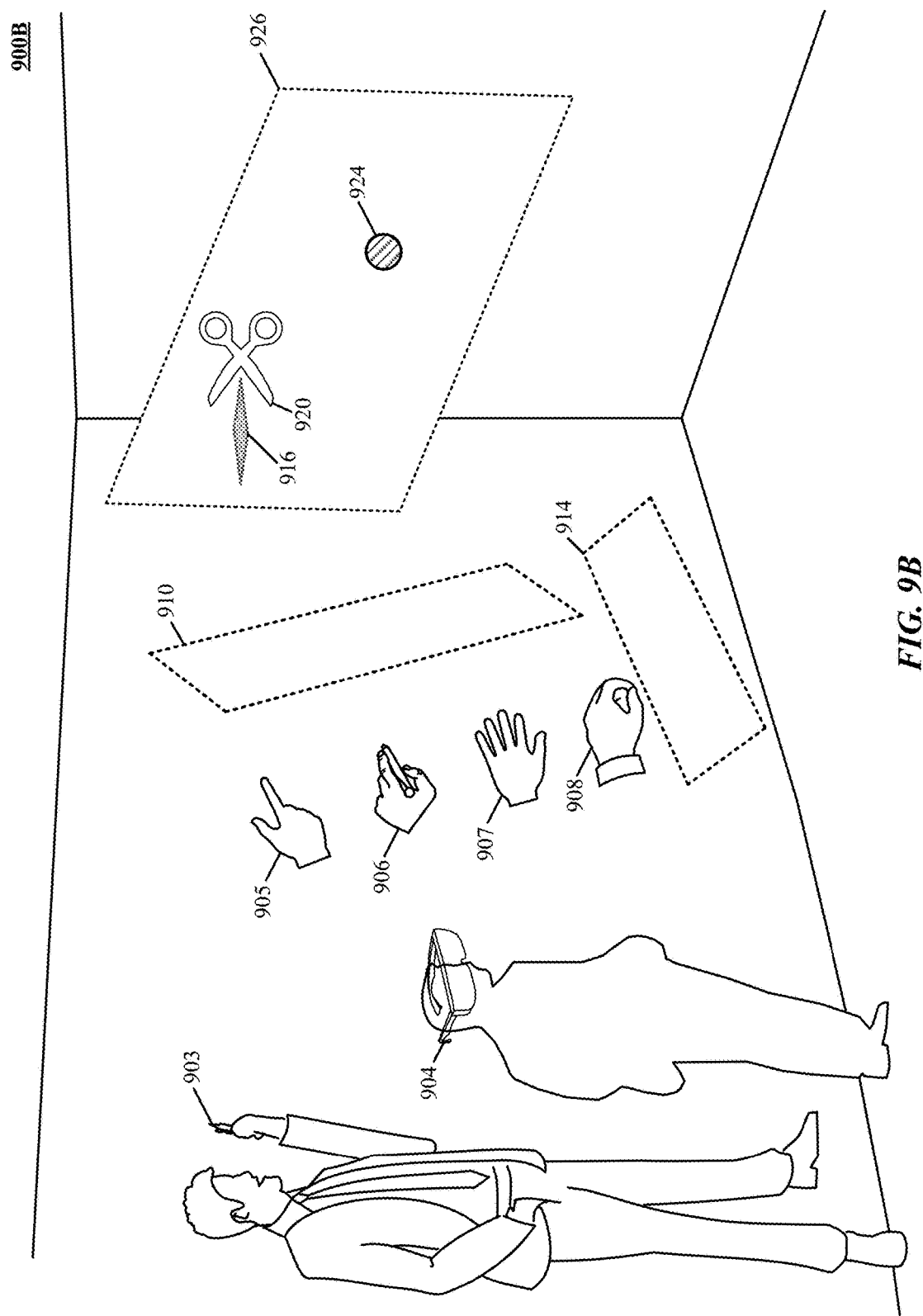

FIGS. 9A-9B illustrate one implementation of interpreting free-space gestures in an augmented reality environment. Flowchart 900A can be implemented at least partially with a database system, e.g., by one or more processors configured to receive or retrieve information, process the information, store results, and transmit the results. Other implementations may perform the actions in different orders and/or with different, varying, alternative, modified, fewer or additional actions than those illustrated in FIG. 9A. Multiple actions can be combined in some implementations. For convenience, this flowchart is described with reference to the system that carries out a method. The system is not necessarily part of the method.

At action 902, a compound free-space gesture of a control object (hand 907 or stylus 906) is detected in an augmented reality (AR) environment 900B, that includes a sequence of gesture primitives 905, 906, 907, and 908.

At action 912, a free-floating interaction modality 926 is instantiated in a real world physical space responsive to a first virtual interaction between a first gesture primitive (such as a pointing gesture 905) of the compound free-space gesture and a vertical virtual construct 910 and/or horizontal virtual construct 914. In one implementation, the first virtual interaction is a sweeping intersection of the virtual construct by the first gesture primitive.

At action 922, a context is set for free-space gestural interaction with the interaction modality 926 responsive to a second virtual interaction between a second gesture primitive (such as a flat hovering gesture 907) of the compound free-space gesture and the virtual construct 926. In one implementation, the second virtual interaction is a normal intersection of the virtual construct by the first gesture primitive.

At action 932, responsive to a position of the second virtual interaction with the virtual construct, a proximate modality control such as a virtual scissor 920 or a knob or puck 924 is tentatively selected and the tentative selection is visually indicated.

At action 942, a third gesture primitive (such as a curling gesture 908) of the compound free-space gesture is detected while the proximate modality control remains tentatively selected and an actuation of the proximate modality control is initiated based on the third gesture primitive. In one implementation, the third gesture primitive represents a confirmatory gesture. In the example shown in FIG. 9B, the actuation can be the virtual scissor 920 cutting the virtual paper 916 or the knob 924 moving.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 10A:
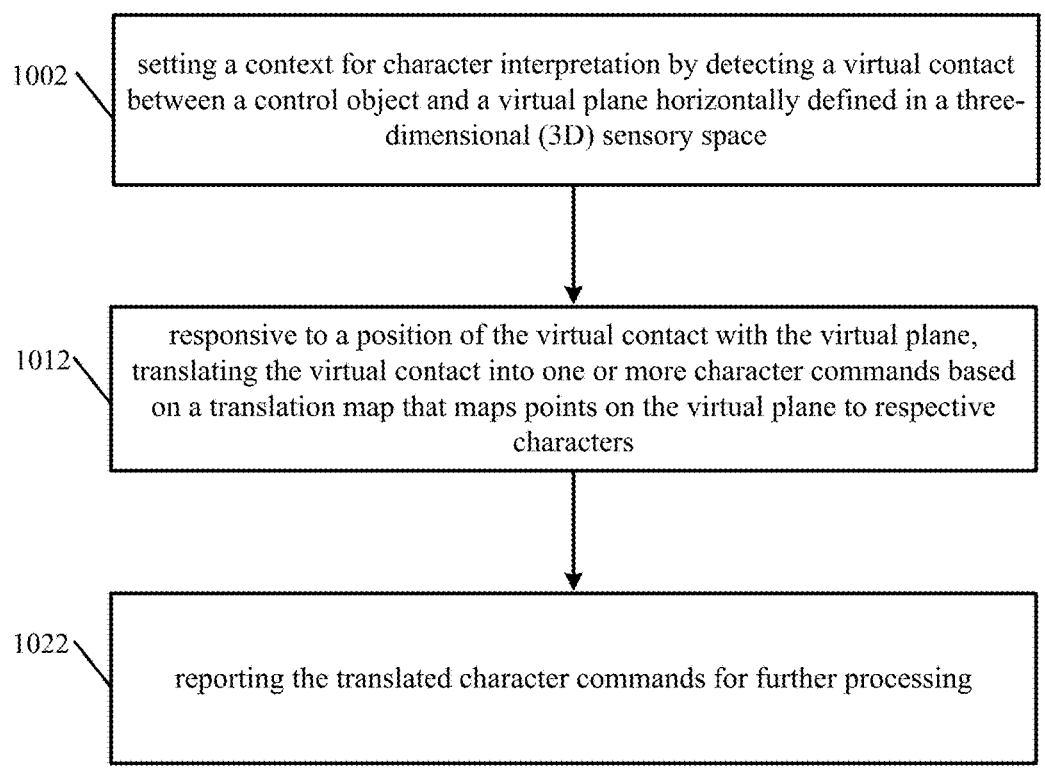
FIGS. 10A-10B are one implementation of recognizing free-space typing commands in a three-dimensional (3D) sensory space.
Figure 10B:
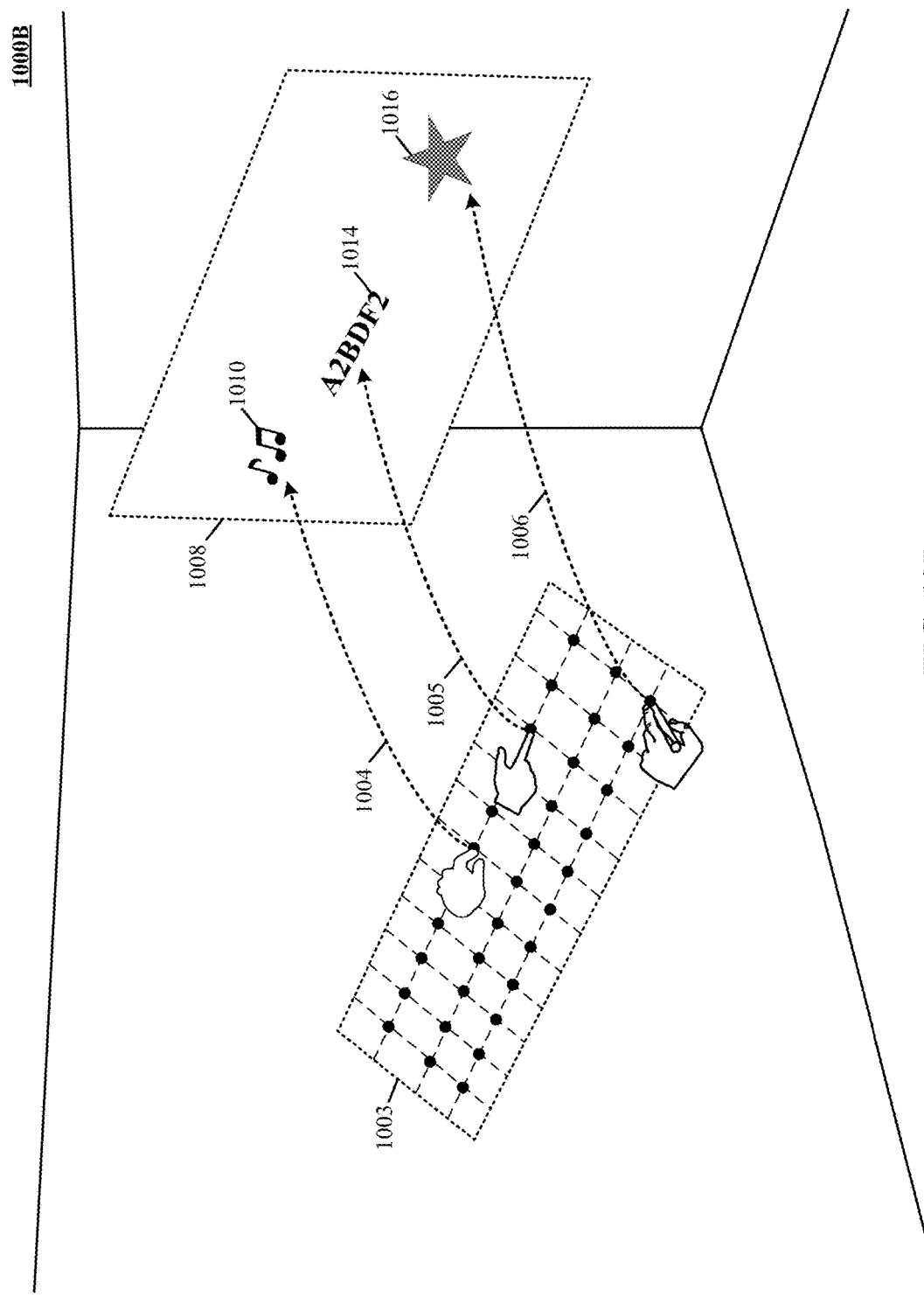

FIGS. 10A-10B are one implementation of recognizing free-space typing commands in a three-dimensional (3D) sensory space. Flowchart 1000A can be implemented at least partially with a database system, e.g., by one or more processors configured to receive or retrieve information, process the information, store results, and transmit the results. Other implementations may perform the actions in different orders and/or with different, varying, alternative, modified, fewer or additional actions than those illustrated in FIG. 10A. Multiple actions can be combined in some implementations. For convenience, this flowchart is described with reference to the system that carries out a method. The system is not necessarily part of the method.

At action 1002, a context is set for character interpretation 1000B by detecting one or more virtual contacts between one or more control objects and a virtual plane 1003 horizontally defined in a three-dimensional (3D) sensory space. In one implementation, the virtual plane 1003 is generated using at least holographic chip projects.

At action 1012, responsive to a position of the virtual contact with the virtual plane, the virtual contact is translated into one or more character commands (1004, 1005, 1006) based on a translation map that maps points on the virtual plane 1003 to respective characters 1010, 1014, and 1016 such as a string of alphanumeric characters, symbols, musical codes, programming language, graphics, videos, pictures, text, or icons.

At action 1022, the translated character commands are reported for further processing such as presenting for display corresponding characters 1010, 1014, and 1016 on a traditional or virtual interface 1008.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Implementations of the technology disclosed can be employed in a variety of application areas, such as for example and without limitation consumer applications including interfaces for computer systems, laptops, tablets, television, game consoles, set top boxes, telephone devices and/or interfaces to other devices; medical applications including controlling devices for performing robotic surgery, medical imaging systems and applications such as CT, ultrasound, x-ray, MRI or the like, laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigations systems control, on-board entertainment systems control and/or environmental systems control; automotive applications including interfaces to automobile operational systems control, navigation systems control, on-board entertainment systems control and/or environmental systems control; security applications including, monitoring secure areas for suspicious activity or unauthorized personnel; manufacturing and/or process applications including interfaces to assembly robots, automated test apparatus, work conveyance devices such as conveyors, and/or other factory floor systems and devices, genetic sequencing machines, semiconductor fabrication related machinery, chemical process machinery and/or the like; and/or combinations thereof.

Implementations of the technology disclosed can further be mounted on automobiles or other mobile platforms to provide information to systems therein as to the outside environment (e.g., the positions of other automobiles). Further implementations of the technology disclosed can be used to track the motion of objects in a field of view or used in conjunction with other mobile-tracking systems. Object tracking can be employed, for example, to recognize gestures or to allow the user to interact with a computationally rendered environment; see, e.g., U.S. Patent Application Ser. Nos. 61/752,725 (filed on Jan. 15, 2013) and Ser. No. 13/742,953 (filed on Jan. 16, 2013), the entire disclosures of which are hereby incorporated by reference.

It should also be noted that implementations of the technology disclosed can be provided as one or more computer-readable programs embodied on or in one or more articles of manufacture. The article of manufacture can be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs can be implemented in any programming language. Some examples of languages that can be used include C, C++, or JAVA. The software programs can be further translated into machine language or virtual machine instructions and stored in a program file in that form. The program file can then be stored on or in one or more of the articles of manufacture.

Certain implementations of the technology disclosed were described above. It is, however, expressly noted that the technology disclosed is not limited to those implementations, but rather the intention is that additions and modifications to what was expressly described herein are also included within the scope of the technology disclosed. For example, it can be appreciated that the techniques, devices and systems described herein with reference to examples employing light waves are equally applicable to methods and systems employing other types of radiant energy waves, such as acoustical energy or the like. Moreover, it is to be understood that the features of the various implementations described herein were not mutually exclusive and can exist in various combinations and permutations, even if such combinations or permutations were not made express herein, without departing from the spirit and scope of the technology disclosed. In fact, variations, modifications, and other implementations of what was described herein will occur to those of ordinary skill in the art without departing from the spirit and the scope of the technology disclosed. As such, the technology disclosed is not to be defined only by the preceding illustrative description.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of interpreting free-space gestures, the method including:
providing, by a camera, a three-dimensional (3D) field of view that includes a 3D sensory space;
setting a context for gesture interpretation by detecting a virtual contact between a control object and a virtual plane computationally defined as substantially perpendicular to an orientation of a pointing direction of the control object extending along a length of the control object in the 3D sensory space that is within the 3D field of view, wherein an orientation and location of the virtual plane is dependent upon a location and a tracked orientation of the pointing direction of the control object extending along the length of a single tip of the control object without being dependent upon an orientation of a physical screen for displaying a proximate interface control, wherein the orientation and location of the virtual plane are updated in response to the single tip of the control object being at rest or moving with constant velocity;

responsive to a position of the virtual contact with the virtual plane, tentatively selecting the proximate interface control displayed on the physical screen and visually indicating, on the physical screen, the tentative selection of the proximate interface control, the tentative selection of the proximate interface control representing a selection of the proximate interface control without activating a function corresponding to the proximate interface control;

detecting a free-space confirmatory gesture of the control object (i) anywhere in the 3D field of view, (ii) without maintaining the virtual contact between the control object and the virtual plane and (iii) while the proximate interface control remains tentatively selected; and initiating the function corresponding to the proximate interface control based on the free-space confirmatory gesture.

2. The method of claim 1, wherein the virtual plane is oriented vertically in the 3D sensory space.

3. The method of claim 1, wherein the virtual plane is oriented horizontally in the 3D sensory space.

4. The method of claim 1, further including responsive to the virtual contact with the virtual plane, generating for display on the physical screen an interface control at a pixel location on the physical screen that corresponds to spatial location of the virtual contact.

5. The method of claim 1, wherein the free-space confirmatory gesture is specific to the tentatively selected proximate interface control.

6. The method of claim 1, further including unselecting the tentatively selected proximate interface control in response to a free-space ratificatory gesture.

7. The method of claim 6, wherein the free-space ratificatory gesture is specific to the tentatively selected proximate interface control.

8. The method of claim 6, wherein the free-space ratificatory gesture represents another virtual contact between the control object and the virtual plane that is directionally opposite to the virtual contact that caused the tentative selection of the proximate interface control.

9. The method of claim 1, wherein the tentative selection of the proximate interface control responsive to the position of the virtual contact with the virtual plane further includes selecting a particular interface control positioned at a normal from a point of the virtual contact to the physical screen displaying the particular interface control.

10. The method of claim 1, further including tentatively selecting an interface control responsive to the position of the virtual contact with the virtual plane based on pre-designated preferences.

* * * * *